US007784106B2

(12) United States Patent
Wheeler et al.

(10) Patent No.: US 7,784,106 B2
(45) Date of Patent: Aug. 24, 2010

(54) MANUFACTURING UNIQUE DEVICES THAT GENERATE DIGITAL SIGNATURES

(75) Inventors: Lynn Henry Wheeler, Greenwood Village, CO (US); Anne M. Wheeler, Greenwood Village, CO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 12/355,712

(22) Filed: Jan. 16, 2009

(65) Prior Publication Data

US 2009/0158029 A1 Jun. 18, 2009

Related U.S. Application Data

(62) Division of application No. 09/923,213, filed on Aug. 6, 2001, now Pat. No. 7,500,272.

(60) Provisional application No. 60/223,016, filed on Aug. 4, 2000.

(51) Int. Cl.
*G08B 29/00* (2006.01)
*G06F 15/16* (2006.01)
*H04L 9/00* (2006.01)
(52) U.S. Cl. .............................. 726/34; 726/4; 713/171
(58) Field of Classification Search .................. 726/34, 726/4; 713/171
See application file for complete search history.

(56) References Cited

U.S. PATENT DOCUMENTS

| | | |
|---|---|---|
| 3,962,539 A | 6/1976 | Ehrsam et al. |
| 4,200,770 A | 4/1980 | Hellman et al. |
| 4,218,582 A | 8/1980 | Hellman et al. |
| 4,405,829 A | 9/1983 | Rivest et al. |
| 4,408,203 A | 10/1983 | Campbell |

(Continued)

FOREIGN PATENT DOCUMENTS

CA  2271178 A1  5/1999

(Continued)

OTHER PUBLICATIONS

Disclosure Statement Under 37 C.F.R. § 1.56 for U.S. Appl. No. 12/355,712, filed Jan. 16, 2009.

(Continued)

*Primary Examiner*—Michael Pyzocha
(74) *Attorney, Agent, or Firm*—Sutherland Asbill & Brennan LLP

(57) ABSTRACT

A method of manufacturing devices that generate digital signatures such that each device may be reliably and uniquely identified includes creating a public-private key pair within each device during manufacture; exporting only the public key from the device; retaining the private key within the device against the possibility of divulgement thereof by the device; and securely linking said exported public key with other information within the environment of the manufacture of the device, whereby each device is securely bound with its respective public key. A database of PuK-linked account information of users is maintained. The PuK-linked account information for each user includes a public key of such a device; information securely linked with the public key during manufacture; and third-party account identifiers, each of which identifies an account to a third-party of the user maintained with the third-party that has been associated with the user's public key by the third-party.

16 Claims, 30 Drawing Sheets

U.S. PATENT DOCUMENTS

| | | |
|---|---|---|
| 4,424,414 A | 1/1984 | Hellman et al. |
| 4,734,564 A | 3/1988 | Boston et al. |
| 4,748,668 A | 5/1988 | Shamir et al. |
| 4,797,920 A | 1/1989 | Stein |
| 4,798,668 A | 1/1989 | Ho |
| 4,823,388 A | 4/1989 | Mizutani et al. |
| 4,825,050 A | 4/1989 | Griffith et al. |
| 4,850,017 A | 7/1989 | Matyas, Jr. et al. |
| 4,868,877 A | 9/1989 | Fischer |
| 4,879,747 A | 11/1989 | Leighton et al. |
| 4,885,788 A | 12/1989 | Takaragi et al. |
| 4,928,298 A | 5/1990 | Tanaka |
| 5,001,752 A | 3/1991 | Fischer |
| 5,018,196 A | 5/1991 | Takaragi et al. |
| 5,025,373 A | 6/1991 | Keyser, Jr. et al. |
| 5,097,504 A | 3/1992 | Camion et al. |
| 5,140,634 A | 8/1992 | Guillou et al. |
| 5,209,208 A | 5/1993 | Siebert et al. |
| 5,214,703 A | 5/1993 | Massey et al. |
| 5,225,978 A | 7/1993 | Petersen et al. |
| 5,231,668 A | 7/1993 | Kravitz |
| 5,280,527 A | 1/1994 | Gullman et al. |
| 5,412,703 A | 5/1995 | Goodenough et al. |
| 5,422,953 A | 6/1995 | Fischer |
| 5,453,601 A | 9/1995 | Rosen |
| 5,455,865 A | 10/1995 | Perlman |
| 5,473,143 A | 12/1995 | Vak et al. |
| 5,502,766 A | 3/1996 | Boebert et al. |
| 5,509,071 A | 4/1996 | Petrie, Jr. et al. |
| 5,534,855 A | 7/1996 | Shockley et al. |
| 5,539,828 A | 7/1996 | Davis |
| 5,557,518 A | 9/1996 | Rosen |
| 5,563,946 A | 10/1996 | Cooper et al. |
| 5,568,552 A | 10/1996 | Davis |
| 5,577,120 A | 11/1996 | Penzias |
| 5,586,036 A | 12/1996 | Pintsov |
| 5,590,197 A | 12/1996 | Chen et al. |
| 5,604,801 A | 2/1997 | Dolan et al. |
| 5,606,609 A | 2/1997 | Houser et al. |
| 5,615,266 A | 3/1997 | Altschuler et al. |
| 5,615,268 A | 3/1997 | Bisbee et al. |
| 5,619,177 A | 4/1997 | Johnson et al. |
| 5,619,574 A | 4/1997 | Johnson et al. |
| 5,623,637 A | 4/1997 | Jones et al. |
| 5,625,690 A | 4/1997 | Michel et al. |
| 5,636,280 A | 6/1997 | Kelly |
| 5,659,616 A | 8/1997 | Sudia |
| 5,666,420 A | 9/1997 | Micali |
| 5,671,258 A | 9/1997 | Burns et al. |
| 5,671,279 A | 9/1997 | Elgamal |
| 5,671,285 A | 9/1997 | Newman |
| 5,677,120 A | 10/1997 | Lushington et al. |
| 5,677,953 A | 10/1997 | Dolphin |
| 5,677,955 A | 10/1997 | Doggett et al. |
| 5,687,322 A | 11/1997 | Deaton et al. |
| 5,692,047 A | 11/1997 | McManis |
| 5,694,471 A | 12/1997 | Chen et al. |
| 5,708,780 A | 1/1998 | Levergood et al. |
| 5,715,314 A | 2/1998 | Payne et al. |
| 5,721,779 A | 2/1998 | Funk |
| 5,724,424 A | 3/1998 | Gifford |
| 5,745,886 A | 4/1998 | Rosen |
| 5,751,813 A | 5/1998 | Dorenbos |
| 5,774,525 A | 6/1998 | Kanevsky et al. |
| 5,778,072 A | 7/1998 | Samar |
| 5,781,123 A | 7/1998 | Koenig et al. |
| 5,781,723 A | 7/1998 | Yee et al. |
| 5,787,172 A | 7/1998 | Arnold |
| 5,790,677 A | 8/1998 | Fox et al. |
| 5,796,840 A | 8/1998 | Davis |
| 5,798,640 A | 8/1998 | Gier et al. |
| 5,802,592 A | 9/1998 | Chess et al. |
| 5,809,144 A | 9/1998 | Sirbu et al. |
| 5,812,666 A | 9/1998 | Baker et al. |
| 5,817,123 A | 10/1998 | Kieturakis et al. |
| 5,825,884 A | 10/1998 | Zdepski et al. |
| 5,848,161 A | 12/1998 | Luneau et al. |
| 5,862,327 A | 1/1999 | Kwang et al. |
| 5,870,475 A | 2/1999 | Allan et al. |
| 5,878,142 A | 3/1999 | Capute et al. |
| 5,878,143 A | 3/1999 | Moore |
| 5,878,172 A | 3/1999 | Go |
| 5,883,810 A | 3/1999 | Franklin et al. |
| 5,884,270 A | 3/1999 | Walker et al. |
| 5,884,272 A | 3/1999 | Walker et al. |
| 5,887,131 A | 3/1999 | Angelo |
| 5,903,882 A | 5/1999 | Asay et al. |
| 5,907,147 A | 5/1999 | La |
| 5,910,988 A | 6/1999 | Ballard |
| 5,910,989 A | 6/1999 | Naccache |
| 5,917,913 A | 6/1999 | Wang |
| 5,919,574 A | 7/1999 | Hoagland |
| 5,928,298 A | 7/1999 | Matsuoka et al. |
| 5,943,423 A | 8/1999 | Muftic |
| 5,949,881 A | 9/1999 | Davis |
| 5,956,404 A | 9/1999 | Schneier |
| 5,963,648 A | 10/1999 | Rosen |
| 5,970,147 A | 10/1999 | Davis |
| 5,982,502 A | 11/1999 | Jinnai |
| 5,991,292 A | 11/1999 | Foscaneanu et al. |
| 5,991,399 A | 11/1999 | Graunke et al. |
| 5,999,629 A | 12/1999 | Heer et al. |
| 6,000,522 A | 12/1999 | Johnson |
| 6,000,832 A | 12/1999 | Franklin et al. |
| 6,009,177 A | 12/1999 | Sudia |
| 6,021,202 A | 2/2000 | Anderson et al. |
| 6,023,509 A | 2/2000 | Herbert et al. |
| 6,029,150 A | 2/2000 | Kravitz |
| 6,044,154 A | 3/2000 | Kelly |
| 6,047,051 A | 4/2000 | Ginzboorg et al. |
| 6,049,874 A | 4/2000 | McClain et al. |
| 6,061,794 A | 5/2000 | Angelo et al. |
| 6,061,799 A | 5/2000 | Eldridge et al. |
| 6,070,154 A | 5/2000 | Tavor et al. |
| 6,073,237 A | 6/2000 | Ellison |
| 6,073,242 A | 6/2000 | Hardy et al. |
| 6,084,969 A | 7/2000 | Wright et al. |
| 6,092,202 A | 7/2000 | Veil et al. |
| 6,102,287 A | 8/2000 | Matyas, Jr. |
| 6,104,815 A | 8/2000 | Alcorn et al. |
| 6,105,012 A | 8/2000 | Chang et al. |
| 6,108,644 A | 8/2000 | Goldschlag et al. |
| 6,111,956 A | 8/2000 | Field et al. |
| 6,125,349 A | 9/2000 | Maher |
| 6,134,325 A | 10/2000 | Vanstone et al. |
| 6,144,949 A | 11/2000 | Harris |
| 6,154,543 A | 11/2000 | Baltzley |
| 6,161,180 A | 12/2000 | Matyas et al. |
| 6,161,181 A | 12/2000 | Haynes, III et al. |
| 6,167,518 A | 12/2000 | Padgett et al. |
| 6,189,096 B1 | 2/2001 | Haverty |
| 6,192,130 B1 | 2/2001 | Otway |
| 6,192,405 B1 | 2/2001 | Bunnell |
| 6,199,052 B1 | 3/2001 | Mitty et al. |
| 6,202,151 B1 | 3/2001 | Musgrave et al. |
| 6,205,437 B1 | 3/2001 | Gifford |
| 6,213,391 B1 | 4/2001 | Lewis |
| 6,230,269 B1 | 5/2001 | Spies et al. |
| 6,233,565 B1 | 5/2001 | Lewis et al. |
| 6,233,577 B1 | 5/2001 | Ramasubramani et al. |
| 6,240,091 B1 | 5/2001 | Ginzboorg et al. |
| 6,243,812 B1 | 6/2001 | Matyas et al. |
| 6,253,027 B1 | 6/2001 | Weber et al. |
| 6,253,322 B1 | 6/2001 | Susaki et al. |

| | | | |
|---|---|---|---|
| 6,263,447 B1 | 7/2001 | French et al. |
| 6,279,112 B1 | 8/2001 | O'Toole, Jr. et al. |
| 6,282,522 B1 | 8/2001 | Davis et al. |
| 6,285,991 B1 | 9/2001 | Powar |
| 6,292,897 B1 | 9/2001 | Gennaro et al. |
| 6,299,062 B1 | 10/2001 | Hwang |
| 6,314,519 B1 | 11/2001 | Davis et al. |
| 6,324,525 B1 | 11/2001 | Kramer et al. |
| 6,373,950 B1 | 4/2002 | Rowney |
| 6,385,728 B1 | 5/2002 | DeBry |
| 6,484,260 B1 | 11/2002 | Scott et al. |
| 6,510,516 B1 | 1/2003 | Benson et al. |
| 6,523,067 B2 | 2/2003 | Mi et al. |
| 6,532,451 B1 | 3/2003 | Schell et al. |
| 6,565,000 B2 | 5/2003 | Sehr |
| 6,567,913 B1 | 5/2003 | Ryan, Jr. et al. |
| 6,571,339 B1 | 5/2003 | Danneels et al. |
| 6,587,837 B1 | 7/2003 | Spagna et al. |
| 6,594,633 B1 | 7/2003 | Broerman |
| 6,594,759 B1 | 7/2003 | Wang |
| 6,609,198 B1 | 8/2003 | Wood et al. |
| 6,671,805 B1 | 12/2003 | Brown et al. |
| 6,751,729 B1 | 6/2004 | Giniger et al. |
| 6,757,832 B1 | 6/2004 | Silverbrook et al. |
| 6,775,772 B1 | 8/2004 | Binding et al. |
| 2001/0000535 A1 | 4/2001 | Lapsley et al. |
| 2002/0120846 A1 | 8/2002 | Stewart et al. |

FOREIGN PATENT DOCUMENTS

| | | |
|---|---|---|
| EP | 0214609 A2 | 3/1987 |
| FR | 2592502 A1 | 7/1987 |
| WO | 96/24997 A1 | 8/1996 |
| WO | 97/29567 A1 | 8/1997 |
| WO | 98/09227 A1 | 3/1998 |
| WO | 98/15924 A2 | 4/1998 |
| WO | 98/50875 A2 | 11/1998 |
| WO | 99/28452 A1 | 10/1999 |
| WO | 99/57835 A1 | 11/1999 |
| WO | 00/28493 A1 | 5/2000 |
| WO | 00/67143 A2 | 11/2000 |

OTHER PUBLICATIONS

Account Authority Digital Signature Model (http://www.garlic.com/~ lynn/aadsover.htm) believed at website after Nov. 8, 1997, date of capture Oct. 2, 2001, pp. 5.

An Introduction to Cryptography, Network Associates, Inc. PGP, Version 6.5.1, Jun. 1999, pp. 1-88.

Announcing the Standard for Digital Signature Standard (DSS), Federal Information Processing Standards Publication 186, May 19, 1994, pp. 1-18.

Answers to Frequently Asked Questions about Today's Cryptography, RSA Data Security, Inc., Oct. 5, 1993, Revision 2.0, pp. 1-44.

Apostolopoulos, et al. Securing Electronic Commerce: Reducing the SSL Overhead, IEEE Network, Jul./Aug. 2000, vol. 14, Issue 4, pp. 1-16.

Arthur, Dwight. AADS Option for Buyer Authentication, Response to NACHA/IC ANT 2 RFI, Sep. 14, 1998. pp. 1-3.

BAL's PGP Public Key Server; The Computer Law Resource 1996; (website at http://www.complaw.com/pgp/webkeyserver.html) date of capture Feb. 18, 2003, pp. 1-2.

Baltimore; Solutions; A new Era in Secure and Trusted E-Business; (website at http://www.baltimore.com/solutions/index.asp) date of capture Feb. 18, 2003, p. 1.

Boeyen, Sharon. Certificate Policies and Certification Practice Statements, Entrust Technologies White Paper, Feb. 1997, Version 1.0, pp. 1-7.

Building a Foundation of Trust in the PC, The Trusted Computing Platform Alliance, allegedly dated Jan. 2000 (website at http://www.trustedpc.org), pp. 1-9.

Chan, Siu-cheung Charles. An Overview of Smart Card Security, allegedly dated Aug. 17, 1997, available at http://home.hkstar.com/~ alanchan/papers/smartCardSecurity, date of capture Jan. 27, 2001, pp. 1-7.

Common Criteria for Information Technology Security Evaluation, Smart Card Security User Group, Smart Card Protection Profile, draft Version 2.1d, allegedly dated Mar. 21, 2001, pp. 1-194.

Computer Data Authentication , FIPS Publication 113, May 30, 1985, available at www.itl.nist.gov/fipspubs/fip113.htm, date of capture Jan. 16, 2001, pp. 1-7.

Cox, Peter. Bench-Marketing SmartGate, Establishing the Scaleability of V-ONE's SmartGate Security System, Internet SmartWare, Ltd., Jul. 24, 1997, pp. 1-7.

Cylink atm encryptor (website at http://securitytools.hypermart.net/security_1/cylink_atm_encryptor.html), date of capture Feb. 18, 2003, p. 1.

Denny, Stephanie. The Electric Commerce Challenge, Journal of Internet Banking and Commerce, Array Development, Mar. 31, 1999, website at http://www.arraydev.com/commerce/JIBC/9811-06.htm, pp. 1-2.

Digital Signature Guidelines Tutorial; ABA Network (website at http://www.abanet.org/scietech/ec/isc-dsg-tutorial.html), date of capture Feb. 18, 2003, pp. 1-7.

Digital Signature Standard (DSS), FIPS Publication 186-2, Jan. 27, 2000, pp. 1-72.

Entity Authentication Using Public Key Cryptography, FIPS Publication 196, Feb. 18, 1997, pp. 1-52.

Federal Information Processing Standards Publication 140-1, Security Requirements for Cryptographic Modules; US DOC/NBS, Jan. 11, 1994.

Federal Information Processing Standards Publication 140-2, Security Requirements for Cryptographic Modules, US DOC/NBS, May 25, 2001.

Federal Information Processing Standards Publication 180-1, Digital Signature Standard, US DOC/NBS, Apr. 17, 1995.

Federal Information Processing Standards Publication 186-2, Digital Signature Standard, US DOC/NBS, Jan. 11, 1994.

Federal Information Processing Standards Publication 196, Entity Authentication Using Public Key Cryptography, US DOC/NBS, Feb. 18, 1997.

FIPS 186 (Announcing the Standard for Digital Signature Standard (DSS), Federal Information Processing Standards Publication 186). May 18, 1994, pp. 1-18.

Gerck, Ed, Overview of Certification Systems: x.509, PKIX, CA, PGP & SKIP—Do you understand digital certificates? Do you want to know what they warrant? Jul. 18, 2000, pp. 1-18.

Guide to Internet Security, Public Key Cryptography (website at http://www.e-certify.com/library/pkc_guide.htm) captured on Feb. 18, 2003.

Guideline for Implementing Cryptography in the Federal Government, NIST Special Publication 800-21, Nov. 1999, pp. 1-138.

Guideline for the Use of Advanced Authentication Technology Alternatives, FIPS Publication 190, Sep. 28, 1994, available at http://csrc.nist.gov/publications/fips/fips190/fip190.txt, pp. 1-55.

Heroux, Mark. A Private Key Storage Sever for DCE-Functional Specification, Open Software Foundation Request for Comments: 94.1, allegedly dated Nov. 1996, (website found at http://www.opengroup.org/rfc/mirror-rfc/rfc94.1.txt), date of capture Jun. 13, 2001, pp. 1-73.

Hettinga, Bob. Hettinga's Best of the Month, Journal of Internet Banking and Commerce, Array Development, Mar. 31, 1999, website at http://arraydev.com/commerce/JIBC/9801-20.htm, pp. 1-4.

Hettinga's Best of the Month, Journal of Internet Banking and Commerce, Jan. 5, 1998, (website at wysiwyg://10/http://www.arraydev.com/commerce/JIBC/9801-20.htm), date of capture Jan. 11, 1999, 6 pp.

"How PGP Works," web pages from www.pgpi.org, containing basic information, 1999, captured on Jul. 24, 2008.

"Inside PGP Key Reconstruction: Technical Details," Revision by Will Price, dated Jul. 25, 2000, a PGP Security, Inc. White Paper.

International Search Report dated Mar. 21, 2002 in related International Application No. PCT/US01/24563 (3 pages).

International Search Report dated Nov. 16, 2001 in related International Application No. PCT/US01/24567 (4 pages).
International Search Report dated Apr. 15, 2002 in related International Application No. PCT/US01/24572 (7 pages).
International Search Report dated Nov. 5, 2001 in related International Application No. PCT/US01/41562 (3 pages).
International Search Report dated Dec. 14, 2001 in related International Application No. PCT/US01/41586 (3 pages).
International Search Report dated Jan. 14, 2002 in related International Application No. PCT/US01/41587 (7 pages).
Internet Counsel, Consumer Internet Purchases Using ATM Cards Successfully Processed by NACHA Pilot Participants, Feb. 23, 2003, pp. 1-4.
Internet Counsel, NACHA to Test ATM Card Payments for Consumer Internet Purchases, Feb. 23, 2003, pp. 1-3.
Jul. 1997 Meeting Report, Electronic Payments Forum (website at http://www.epf.net.PrevMtngs/July97Mtng/July97Report.htm), date of capture Jan. 11, 1999, 2 pp.
Kaliski, Jr., Burton S. A Layman's Guide to a Subset of ASN.1, BER, and DER, An RSA Laboratories Technical Note, Nov. 1, 1993, RSA Laboratories, Redwood City, CA, pp. 1-36.
Kaliski, Jr., Burton S. An Overview of the PKCS Standards, An RSA Laboratories Technical Note, Nov. 1, 1993, RSA Data Security, Inc. Public-Key Cryptography Standards (PKCS), pp. 1-27.
Kaliski, Jr., Burton S. Some Examples of the PKCS Standards, An RSA Laboratories Technical Note, Nov. 1, 1993, RSA Laboratories, Redwood City, CA, pp. 1-15.
Kutler, Jeffrey. Privacy Broker: Likely Internet Role for Banks? Digital Frontiers, Oct. 8, 1998, pp. 1-6.
Linn, John. Trust Models and Management in Public-Key Infrastructures; RSA Laboratories, Nov. 6, 2000, pp. 1-13.
List Serve Posting dated Apr. 2, 2000 regarding Biometrics and Electronic Signatures, Apr. 2, 2000.
Trusted Platform Module (TPM) Security Policy (A Part of the "TCPA Security Policy"), Version 0.45, Trusted Computing Platform Alliance allegedly dated Oct. 2, 2000, pp. 1-11.
Turnbill, Jim. "Cross-Certification and PKI Policy Networking," Entrust, Inc., Aug. 2000, pp. 1-10.
Understanding Public Key Infrastructure (PKI), Technology White Paper, by RSA Security, Inc., 1999, pp. 1-10.
Wiener, Michael J. Performance Comparison of Public-Key Cryptosystems, The Technical Newsletter of RSA Laboratories, a division of RSA Data Security, Inc., Summer 1998, vol. 4, No. 1, RSA Laboratories, San Mateo, CA, pp. 1-23.
"X9 Overview," American Bankers Association web page (website at http://www.x9.org/aboutX9.htm), allegedly dated 1998, date of capture Jan. 11, 1999, 3 pages.
"X9.59 Working Draft," American Bankers Association, American National Standard X9.59- 199X, For the Financial Services Industry: Account-Based Secure Payment Objects, Sep. 25, 1998, pp. 1-26.
X9.84-2000, Biometric Information Management and Security for the Financial Services Industry, draft version, allegedly dated Dec. 2000, pp. 25-129.
List Serve Posting dated Aug. 15, 1999 regarding Risk Management in AA/draft X9.59, Aug. 15, 1999.
List Serve Posting dated Dec. 3, 1998 regarding EU Digital Signature Initiative Stalled, Dec. 3, 1998.
List Serve Posting dated Dec. 11, 1998 regarding AADS Strawman, Dec. 11, 1998.
List Serve Posting dated Dec. 12, 1999 regarding QC Bio-Info Leak?, Dec. 12, 1999.
List Serve Posting dated Dec. 29, 1999 regarding Attacks on PKI, Dec. 29, 1999.
List Serve Posting dated Dec. 30, 1999 regarding Attacks on PKI, Dec. 30, 1999.
List Serve Posting dated Feb. 7, 2000 regarding Questions about PKI, Feb. 7, 2000.
List Serve Posting dated Feb. 14, 2000 regarding Real Names Hacked—Firewall Issues, Feb. 14, 2000.
List Serve Posting dated Jul. 16, 1999 regarding Common Misconceptions, was Re: KISS for PKIX, Jul. 16, 1999.
List Serve Posting dated May 24, 1999 regarding [ECARM] Cardtech/Securetech & CA PKI, May 24, 1999.
List Serve Posting dated May 25, 1999 regarding [ECARM] Cardtech/Securetech & CA PKI May 25, 1999.
List Serve Posting dated May 30, 1999 regarding [ECARM] Cardtech/Securetech & CA PKI May 30, 1999.
Maurer, Ueli. Modeling a Public-Key Infrastructure, Sep. 1996, Proc. 1996 European Symposium of Research in Computer Security, Lecture Notes in Computer Science, Berlin: Springer-Verlag, Rome, Italy, Department of Computer Science, Swiss Federal Institute of Technology, Zurich, Switzerland, pp. 1-25.
Menezes, Alfred J. Handbook of Applied Cryptography. CRC Press. 1997. pp. 25-32; 546-548; 572-577.
Moreau, Thierry. Thirteen Reasons to Say 'No' to Public Key Cryptography, Draft Paper, Mar. 4, 1998, CONNOTECH Experts-Coseils, Inc., Montréal, Québec, Canada, pp. 1-5.
News Release: Digital Signatures Can Secure ATM Card Payments on the Internet, NACHA Pilot Concludes, Jul. 23, 2001, pp. 1-2.
O'Mahony, Donal. Electronic Payment Systems, Artech House, Inc., pp. 51 and 77-80 (1961).
Pepe, Michel. Smart Cards Gaining Traction, CRN.com-Point of Sale: Trends, Markets and Technologies, Dec. 31, 2002, (website at http://www.crn.channelsupersearch.com/news/crn/39163.asp) captured on Feb. 18, 2003, pp. 1-2.
"PGP Desktop Security 9.7.0," PGP Security, 3965 Freedom Circle, Santa Clara, CA 95054-1203, dated Jul. 2000.
"PGP Enterprise Security Suite 6.5," PGP Certificate Server, Total Network Security, Network Associates, 3965 Freedom Circle, Santa Clara, CA 95054-1203.
PKCS #3: Diffie-Hellman Key-Agreement Standard, An RSA Laboratories Technical Note, Version 1.4, Nov. 1, 1993, RSA Laboratories, Redwood City, CA, pp. 1-8.
PKCS #5. v2.0: Password-Based Cryptography Standard, RSA Laboratories, Redwood City, CA, Mar. 25, 1999, pp. 1-30.
PKCS #6: Extended-Certificate Syntax Standard, An RSA Laboratories Technical Note, Nov. 1, 1993, Version 1.5, RSA Laboratories, Redwood City, CA, pp. 1-11.
PKCS #8: Private-Key Information Syntax Standard, An RSA Laboratories Technical Note, Nov. 1, 1993, Version 1.2, RSA Laboratories, Redwood City, CA, pp. 1-5.
PKCS #9: Selected Object Classes and Attribute Types Version 2.0, RSA Laboratories, Redwood City, CA, pp. 1-42, Nov. 2000.
PKCS #9, v2.0: Selected Object Classes and Attribute Types, RSA Laboratories, Redwood City, CA, Feb. 25, 2000, pp. 1-34.
PKCS #10, v1.7: Certificate Request Syntax Standard, RSA Laboratories, Redwood City, CA; May 26, 2000, pp. 1-10.
PKCS #12, v1.0: Personal Information Exchange Syntax, RSA Laboratories, Redwood City, CA; Jun. 24, 1999, pp. 1-23.
PKCS #15: Conformance Profile Specification, RSA Laboratories, Redwood City, CA, Aug. 1, 2000; pp. 1-8.
PKCS Editor, PKCS #1 v2.1: RSA Cryptography Standard, RSA Laboratories, Draft 2, Jan. 5, 2001, RSA Laboratories, Bedford, MA, pp. 1-60.
"PGP Policy Management Agent for SMTP," Network Associates, 3965 Freedom Circle, Santa Clara, CA 95054-1203, dated Dec. 1999.
Pretty Good Privacy (PGP); What's? com; Dec. 27, 2000 (website at http://www.whatis.techtarget.com/WhatIs_Definition_Page/ 0,4152,214292,00.html) date of capture Dec. 27, 2000, pp. 1-3.
Private Server Product Description, (website at http://www.bnn.com. tr.assets/cserver_prodesc.html) date of capture Feb. 18, 2003, pp. 1-11.
Public Key Cryptography, NIST Special Publication 800-2, Apr. 1991, available at http://csrc.nist.gov/publication/nist-pubs/800-2/ 800-2.txt, pp. 1-138.
Public Key Infrastructure, An NSS Group White Paper, by Bob Walder, undated, available at http://www.nss.co.uk/WhitePapers/ PublicKeyInfrastructure.htm on Jan. 25, 2001, pp. 1-18.
Public-Key Infrastructure (PKI)—The VeriSign Difference, Feb. 3, 2001, Copyright 1999, VeriSign, Inc., pp. 1-21.
Sales Brochure for APPROVEIT, electronic approval management software, by SilanisTechnology, Inc., allegedly dated Jul. 18, 2000, pp. 1-12.
Schneier, Bruce, Applied Cryptography, Second Edition. John Wiley & Sons, 1996. p. 185-187.

Schneier, Bruce. "Applied Cryptography," Second Edition, 1996, pp. 37-39.

Secure Hash Standard, FIPS Publication 180-1, Apr. 17, 1995, pp. 1-18.

Security Requirements for Cryptographic Modules, FIPS Publication 140-2, May 25, 2001, (62 pages).

Security Requirements of Cryptographic Modules, Federal Information Processing Standards Publication 140-1, Jan. 11, 1994, pp. 1-53.

Smart Card & Security Basics, Cardlogix, Inc. brochure, allegedly dated: Q1-Q2 2000, pp. 3-36.

Smart Cards: Enabling Smart Commerce in the Digital Age, CREC/KPMG White Paper (Draft), May 1998, pp. 1-22.

Some Suggestions for Automatic Encryption and Identity Verification in the IBM Internal Computing Network, Dec. 28, 1985, (13 pages).

Stewart, David C. "Account Authority Digital Signatures: Enabling Secure Internet Transactions via Existing Payment Processes & Infrastructure." Date unknown but believed to be subsequent to Apr. 1998.

Taschler, Scott. Technical Introduction to CIP 3.0, Sep. 30, 1997, available at http://www.datakey.com/cardpage/cip.htm, date of capture Jan. 25, 2001, pp. 1-6.

TCPA PC Specific Implementation Specification, Version 0.95, Trusted Computing Platform Alliance allegedly dated Jul. 4, 2001, pp. 1-70.

Trusted Platform Module Protection Profile (TPMPP) (A Part of the "TCPA Security Policy"), Verson 0.45, Trusted Computing Platform Alliance allegedly dated Sep. 14, 2000, pp. 1-151.

Supplemental Disclosure under 37 CFR 1.56 dated Feb. 25, 2010, filed for U.S. Appl. No. 12/355,712.

 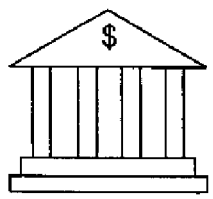 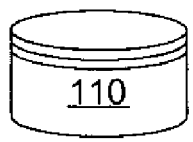
World 106          Recipient 108          Secure Entity 112
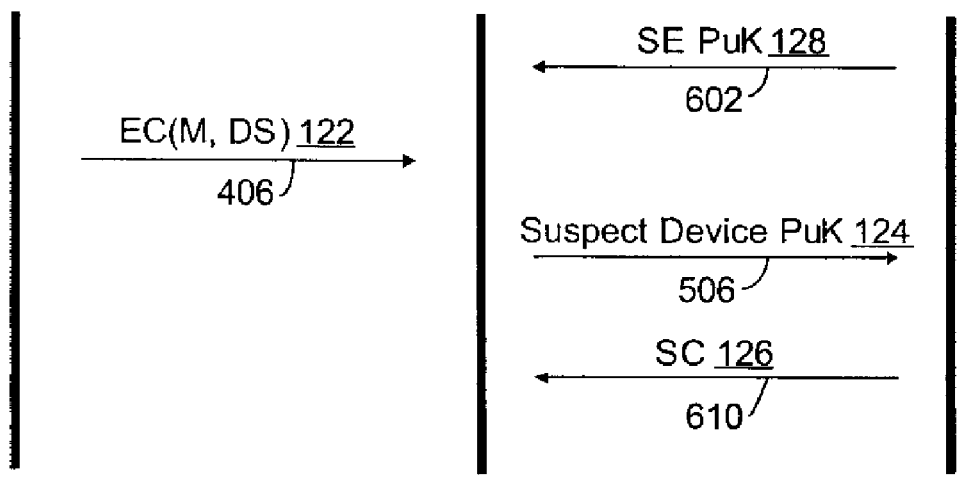
FIG. 3.

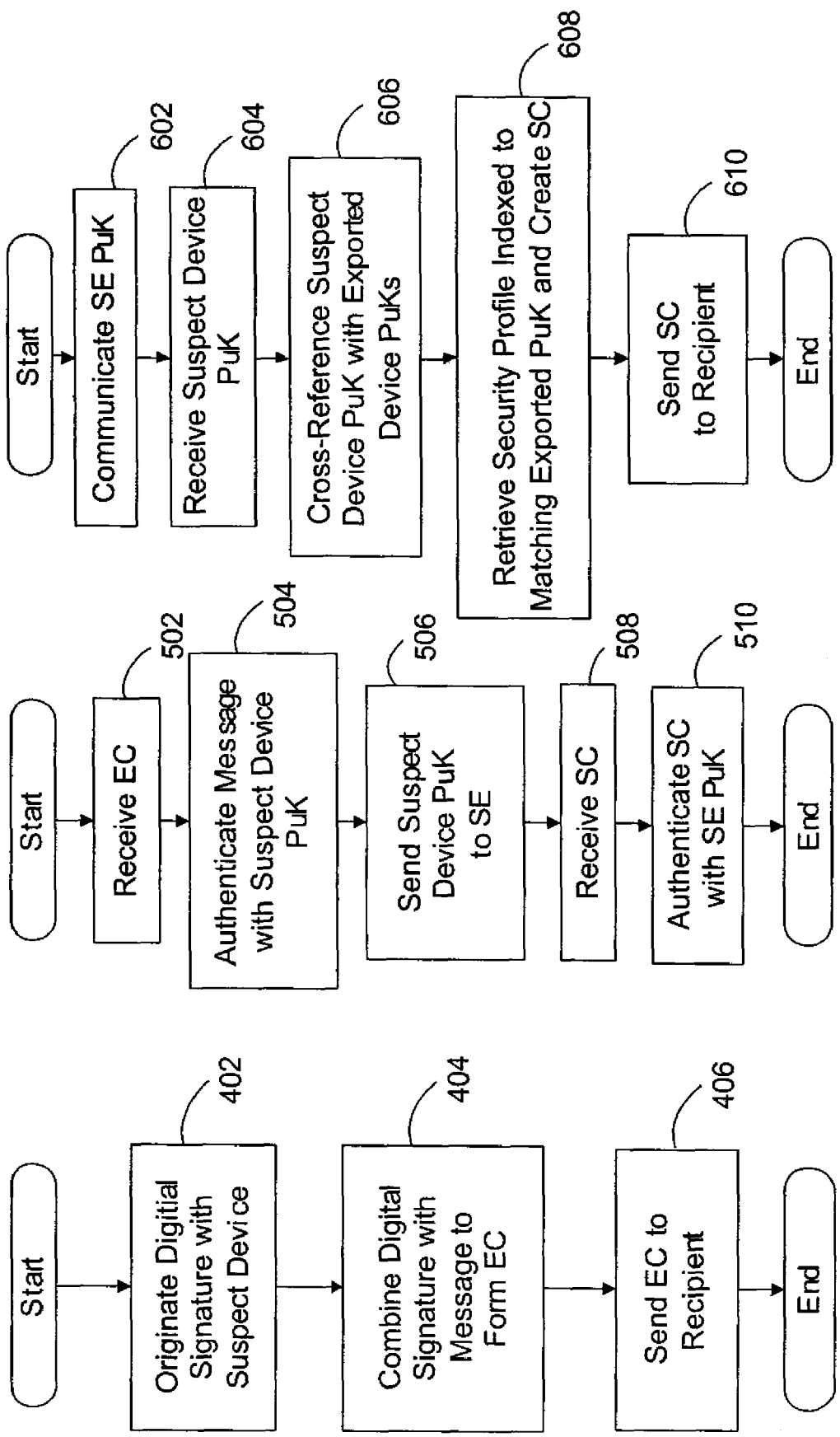

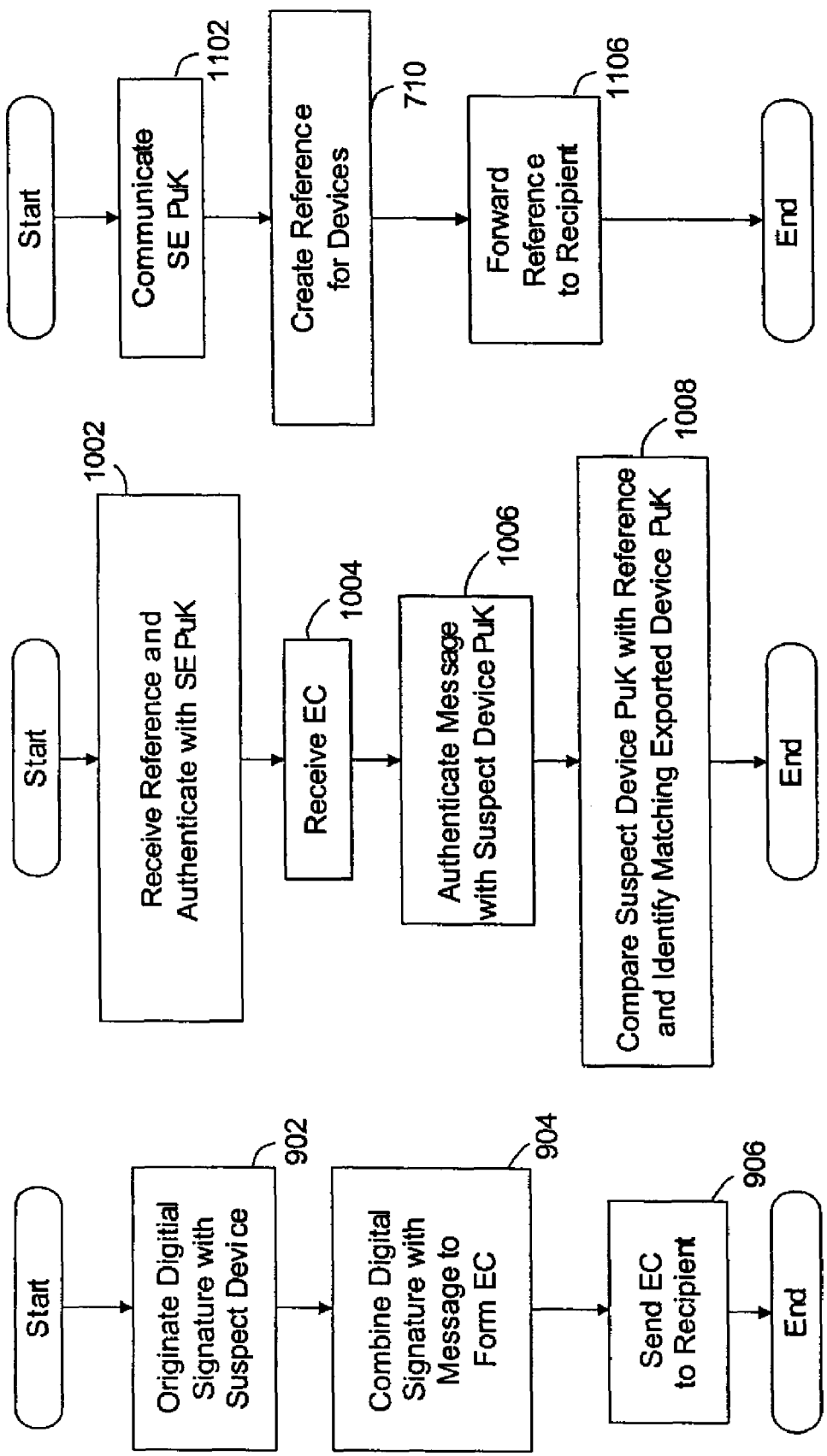

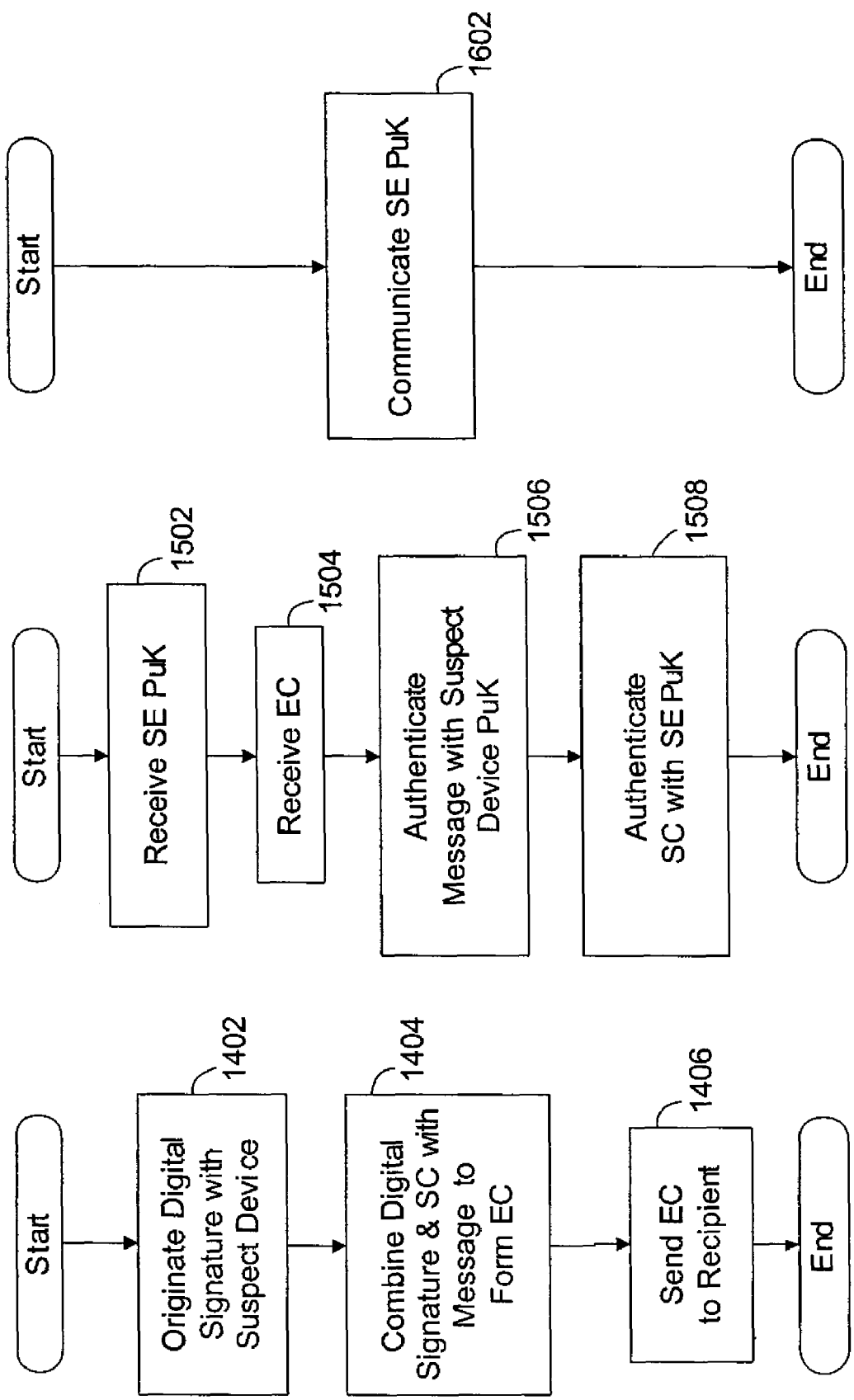

| Database Index | Security Profile |
|---|---|
| $PuK_1$ | - Security Features, including Security Characteristics and Authentication Capabilities<br>- Manufacturing History |
| $PuK_2$ | - Security Features, including Security Characteristics and Authentication Capabilities<br>- Manufacturing History |
| $PuK_3$ | - Security Features, including Security Characteristics and Authentication Capabilities<br>- Manufacturing History |
| ... | ... |
| $PuK_n$ | - Security Features, including Security Characteristics and Authentication Capabilities<br>- Manufacturing History |

| Account Identifier | Security Profile | Account Information | Customer - Specific Information |
|---|---|---|---|
| PuK₁ | Security Features<br>Manufacturing History | User ID<br>Internet Hours Used,<br>Hours Remaining, etc... | Name,<br>Credit Card Information,<br>Billing Address, etc... |
| PuK₂ | Security Features<br>Manufacturing History | User ID<br>Internet Hours Used,<br>Hours Remaining, etc... | Name,<br>Credit Card Information,<br>Billing Address, etc... |
| PuK₃ | Security Features<br>Manufacturing History | User ID<br>Internet Hours Used,<br>Hours Remaining, etc... | Name,<br>Credit Card Information,<br>Billing Address, etc... |
| ... | ... | ... | ... |
| PuKₙ | Security Features<br>Manufacturing History | User ID<br>Internet Hours Used,<br>Hours Remaining, etc... | Name,<br>Credit Card Information,<br>Billing Address, etc... |

| Account Identifier | Security Profile | Account Information | Customer Specific Information |
|---|---|---|---|
| Account$_1$ | Security Features<br>Manufacturing History | PuK$_1$<br>Available Balance,<br>Register Balance,<br>Related Accounts,<br>IC Card Status | Name,<br>Social Security Number,<br>Mailing Address, etc... |
| Account$_2$ | Security Features<br>Manufacturing History | PuK$_2$<br>Available Balance,<br>Register Balance,<br>Related Accounts,<br>IC Card Status | Name,<br>Social Security Number,<br>Mailing Address, etc... |
| Account$_3$ | Security Features<br>Manufacturing History | PuK$_3$<br>Available Balance,<br>Register Balance,<br>Related Accounts,<br>IC Card Status | Name,<br>Social Security Number,<br>Mailing Address, etc... |
| ... | ... | ... | ... |
| Account$_n$ | Security Features<br>Manufacturing History | PuK$_n$<br>Available Balance,<br>Register Balance,<br>Related Accounts,<br>IC Card Status | Name,<br>Social Security Number,<br>Mailing Address, etc... |

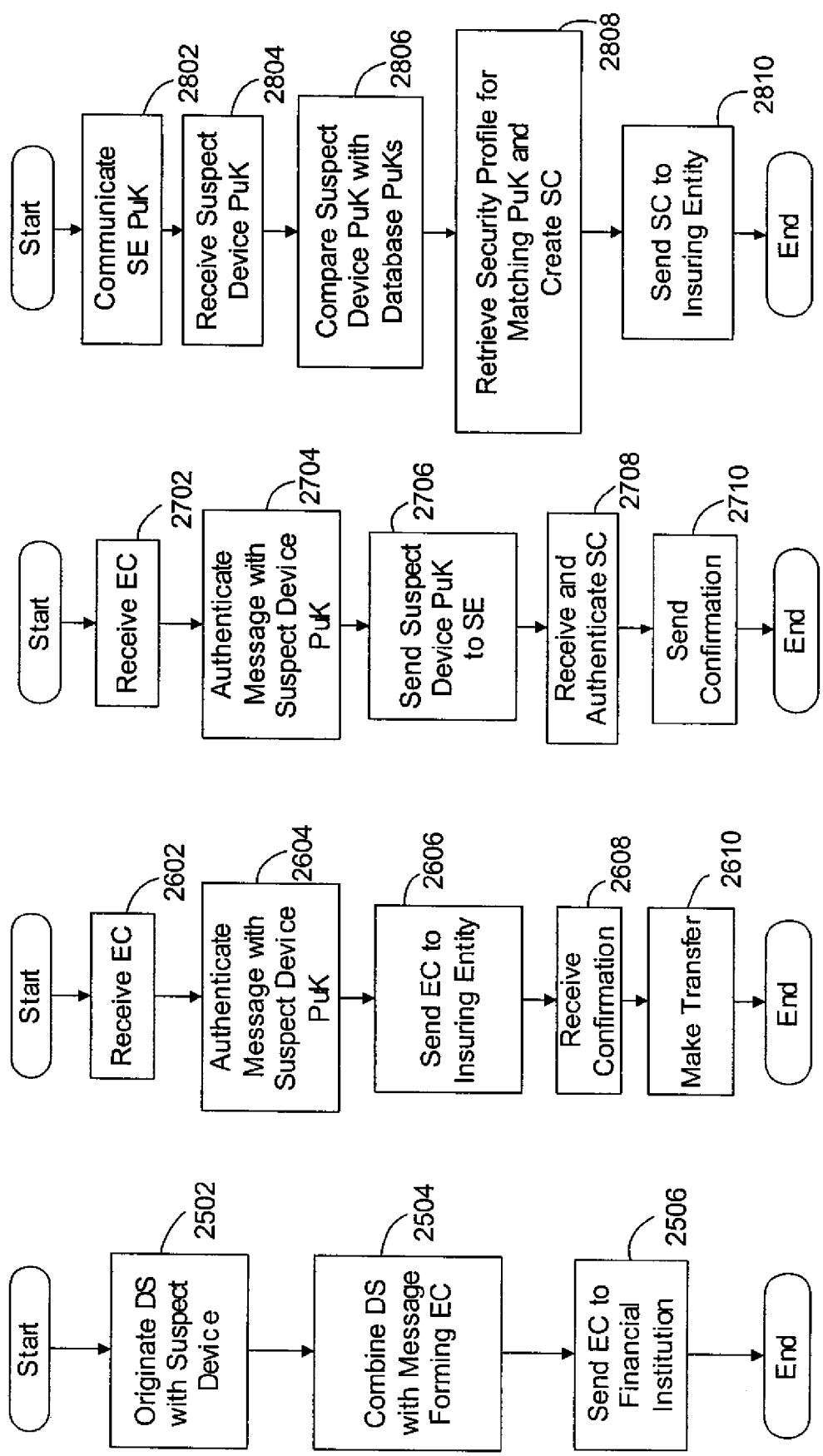

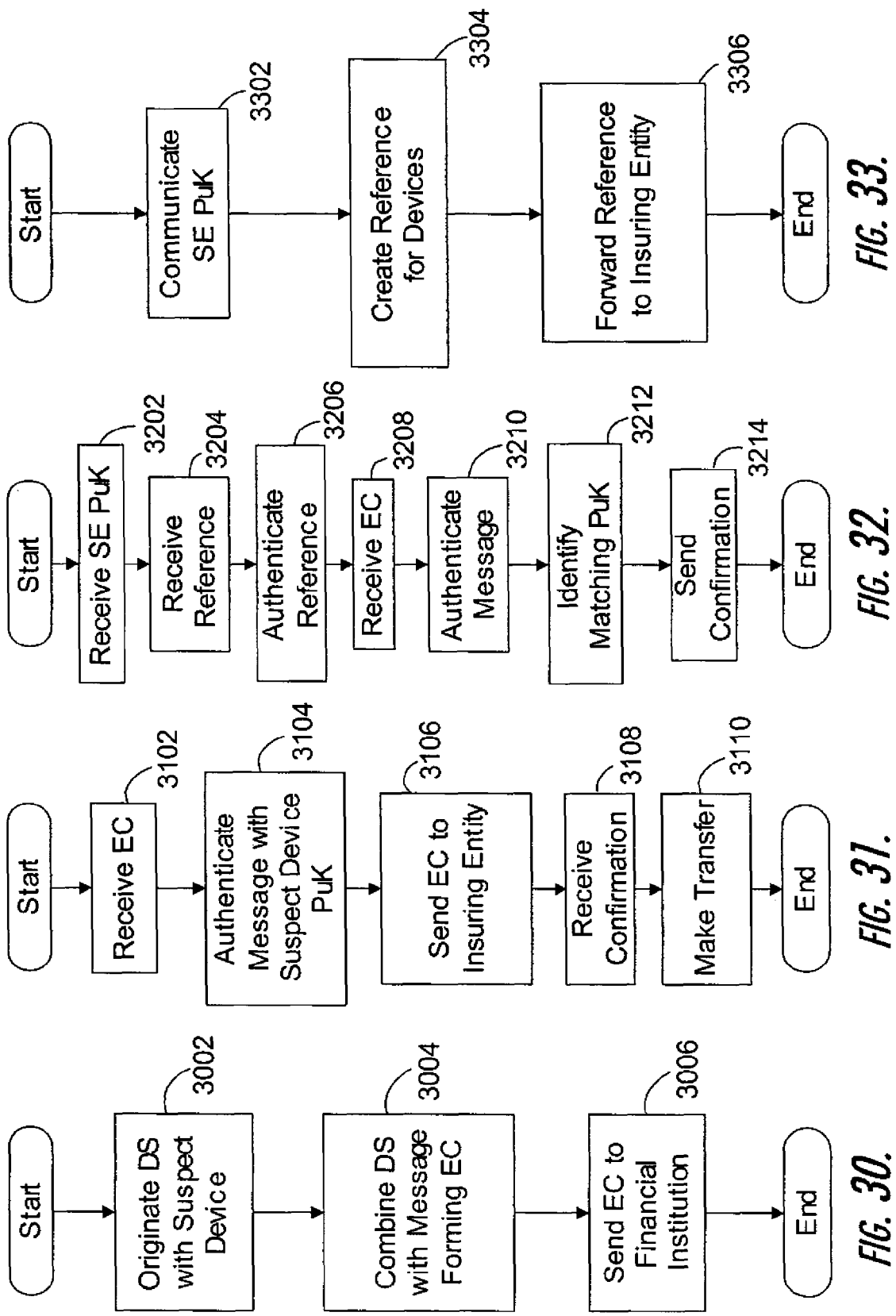

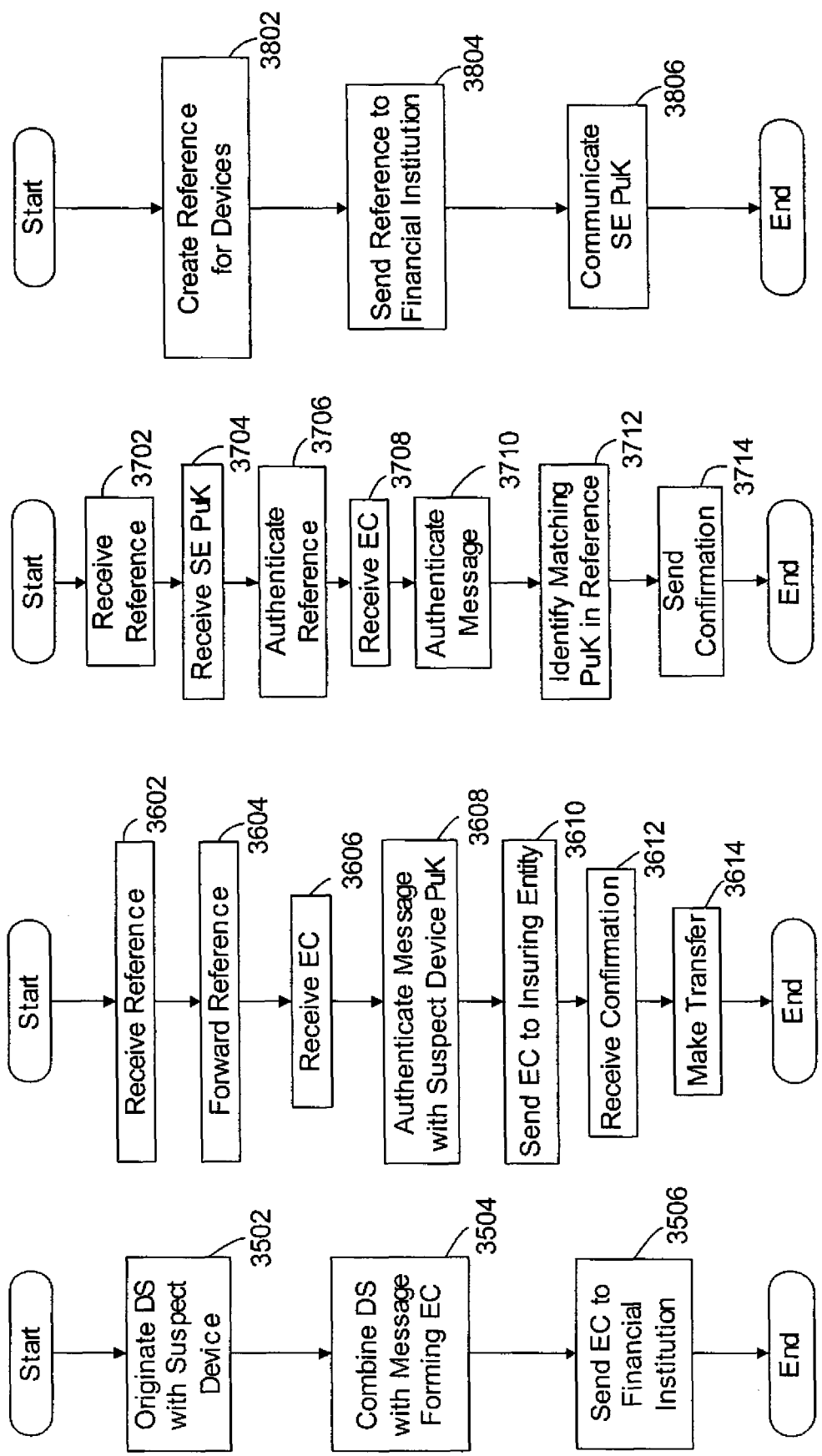

| Account Identifier | Risk Management Information | Account Information | Customer - Specific Information |
|---|---|---|---|
| Account$_1$ | Security Features<br>Manufacturing History<br>Transactional History<br>PuK$_1$-to-Account Authentication | PuK$_1$<br>Available Balance,<br>Register Balance,<br>Related Accounts,<br>IC Card Status | Name,<br>Social Security Number,<br>Mailing Address, etc... |
| Account$_2$ | Security Features<br>Manufacturing History<br>Transactional History<br>PuK$_2$-to-Account Authentication | PuK$_2$<br>Available Balance,<br>Register Balance,<br>Related Accounts,<br>IC Card Status | Name,<br>Social Security Number,<br>Mailing Address, etc... |
| Account$_3$ | Security Features<br>Manufacturing History<br>Transactional History<br>PuK$_3$-to-Account Authentication | PuK$_3$<br>Available Balance,<br>Register Balance,<br>Related Accounts,<br>IC Card Status | Name,<br>Social Security Number,<br>Mailing Address, etc... |
| ... | ... | ... | ... |
| Account$_n$ | Security Features<br>Manufacturing History<br>Transactional History<br>PuK$_n$-to-Account Authentication | PuK$_n$<br>Available Balance,<br>Register Balance,<br>Related Accounts,<br>IC Card Status | Name,<br>Social Security Number,<br>Mailing Address, etc... |

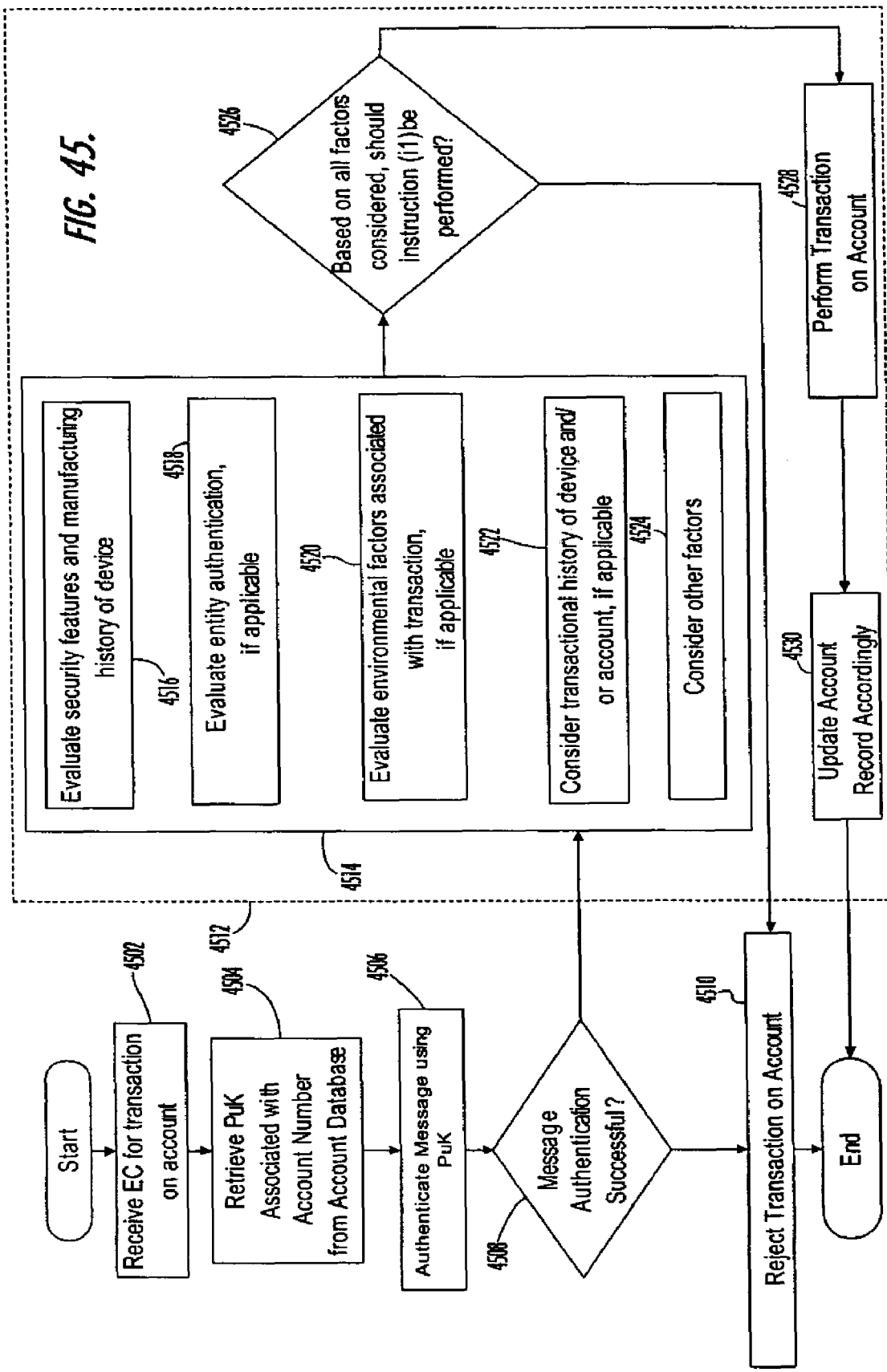

| CKA Account Identifier | PuK - Linked Information | Account Authority Information | User - Specific Information |
|---|---|---|---|
| CKA Account$_1$ | PuK$_1$<br>Security Features<br>Manufacturing History | Account Authority A<br>Account#<br>Account Authority B<br>Account# | Name, Mailing Address<br><br>Authentication techniques used to verify user-specific information |
| CKA Account$_2$ | PuK$_2$<br>Security Features<br>Manufacturing History | Account Authority C<br>Account#<br>Account Authority D<br>Account# | User ID, email address<br><br>Authentication techniques used to verify user-specific information |
| CKA Account$_3$ | PuK$_3$<br>Security Features<br>Manufacturing History | Account Authority A<br>Account#<br>Account Authority D<br>Account# | Name, Mailing Address,<br>User ID, email address<br>Authentication techniques used to verify user-specific information |
| ... | ... | ... | ... |
| CKA Account$_n$ | PuK$_n$<br>Security Features<br>Manufacturing History | Account Authority E<br>Account#<br>Account Authority F<br>Account# | Name, Age, Social Security Number, Driver's License Number and State<br>Authentication techniques used to verify user-specific information |

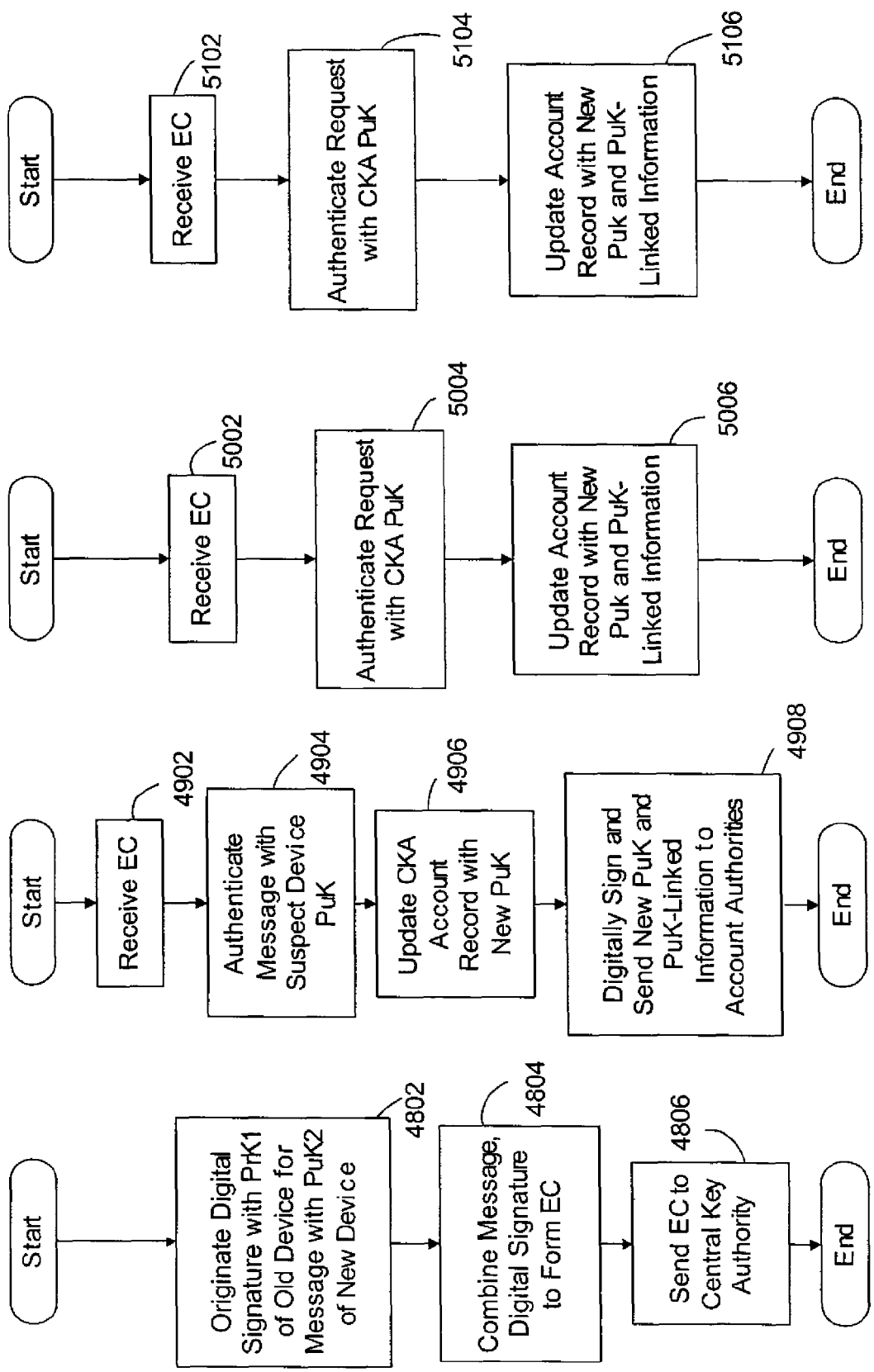

MANUFACTURING UNIQUE DEVICES THAT GENERATE DIGITAL SIGNATURES

CROSS-REFERENCE TO RELATED APPLICATIONS

This application is a divisional of U.S. application Ser. No. 09/923,213 filed Aug. 6, 2001, which in turn claims priority to U.S. Provisional Application No. 60/223,076 filed Aug. 4, 2000, both of which are incorporated herein by reference. This application also incorporates herein by reference each of four international patent applications and two U.S. patent application to Anne and Lynn Wheeler filed concurrently herewith on Aug. 6, 2001, in the U.S. Patent & Trademark Office and bearing Serial No. PCT/US01/41587 (entitled "Person-Centric Account-Based Digital Signature System"); U.S. application Ser. No. 09/923,179 (entitled "Account-Based Digital Signature (ABDS) System"); Serial No. PCT/US01/41562 (entitled "Entity Authentication in Electronic Communications by Providing Verification Status of Device"); U.S. application Ser. No. 09/923,075 (entitled "Modifying Message Data and Generating Random Number Digital Signature Within Computer Chip"); Serial No. PCT/US01/24572 (entitled "Linking Public Key of Device to Information During Manufacture; and Serial No. PCT/US01/24563 (entitled "Trusted Authentication Digital Signature (TADS) System").

FIELD OF THE PRESENT INVENTION

The present invention generally relates to electronic communications and, in particular, to devices that generate digital signatures associated with electronic communications.

BACKGROUND OF THE INVENTION

As used herein, an electronic communication ("EC") is considered to be any communication in electronic form. ECs have become an integral part of transacting business today, especially with the growth of the Internet and e-commerce. An EC can represent, for example, a request for access to information or a physical area, a financial transaction, such as an instruction to a bank to transfer funds, or a legal action, such as the delivery of an executed contract.

Over recent years, digital signatures also have become an important part of e-commerce. The origination of a digital signature generally comprises: (1) the calculation of a message digest—such as a hash value; and (2) the subsequent encryption of the message digest. The message digest is encrypted by an electronic device generally using a private key of a key pair used in public-private key cryptography (also known as asymmetric cryptography). The resulting ciphertext itself usually constitutes the digital signature, which typically is appended to the message to form the EC. The second part of originating the digital signature—encrypting with a private key—is referred to herein as "generating" the digital signature, and the combination of the two steps is referred to herein as "originating" the digital signature. Furthermore, while the generation of the digital signature is conventionally understood as the encryption of the message digest, it is contemplated herein that generating the digital signature also may include simply encrypting the message rather than the message digest. Digital signatures are important because any change whatsoever to the message in an EC is detectable from an analysis of the message and the digital signature. In this regard, the digital signature is used to "authenticate" a message contained within the EC (herein referred to as "Message Authentication").

For example, a message digest may be calculated by applying a hashing algorithm to the message. The hashing algorithm may be applied either within the device or external to the device with the resulting hash value then being transmitted to the device for generation of the digital signature. In order to perform the Message Authentication in this example, the recipient of the EC must know or be able to obtain both the identity of the hashing algorithm applied to the message as well as the public key ("PuK") corresponding to the private key used to encrypt the message digest. With this knowledge, the recipient applies the appropriate hashing algorithm to the message to calculate a hash value, and the recipient decrypts the digital signature using the public key. If the hash value calculated by the recipient equals the hash value of the decrypted digital signature, then the recipient determines that the content of the message contained in the EC was not altered in transmission, which necessarily would have changed the hash value.

In performing Message Authentication, the recipient also authenticates the sender of the EC, in so much as the recipient thereby confirms that the sender of the EC possessed the private key corresponding to the public key used successfully to authenticate the message. This is one type of entity authentication and is based on what the sender "has" (herein referred to as "Factor A Entity Authentication"). Factor A Entity Authentication is useful when the recipient of the EC has trusted information regarding the identity of the owner of the private key. Such trusted information may arise from a digital certificate issued by a trusted third-party that accompanies the EC and binds the identity of the private key owner with the public key. This trusted knowledge also may comprise actual knowledge of the identity of the private key owner, such as in the case where the recipient itself has issued the private key or the device containing the private key to the owner.

As will be appreciated, trust in the digital signature system depends upon the legitimate possession and use of the private key, i.e., upon the sender of the EC actually being the private key owner. A fraudulent use of a private key to generate a digital signature of an EC currently cannot be detected through the above-described Message Authentication and Factor A Entity Authentication procedures. The digital signature system therefore is susceptible to fraud if a private key of a device is stolen, either by physical theft of the device containing the private key, or by discovery of the private key therein and subsequent copying and use in another device capable of generating digital signatures.

To guard against fraudulent use of a device through theft of the device itself, a personal identification number (PIN), password, or passphrase (collectively referred to herein as "Secret") is typically prestored within the device and must be input into the device before it will operate to generate digital signatures. Alternatively, the Secret is shared with the recipient beforehand and, when the EC later is sent to the recipient, the Secret also is sent to the recipient in association with the message. In the first case, verification of the Secret authenticates the user of the device (herein "User Authentication"), and in the second case, verification of the Secret authenticates the sender of the EC (herein "Sender Authentication"). In either case, confirmation of the Secret represents entity authentication based on what the user or sender "knows" (herein "Factor B Entity Authentication"). Another security feature that guards against fraudulent use of the device through physical theft include the verification of a biometric characteristic—like a fingerprint—of the user of the device or sender of the EC. This type of authentication is based on what the user or sender "is" (herein "Factor C Entity Authentication"). As with the Secret, a biometric value is either maintained within the device for User Authentication, or is shared with the recipient beforehand for Sender Authentication by the recipient. To guard against discovery of a private key and subsequent copying and use in another device, devices are manufactured with electronic shielding, zeroization, auditing, tamper evidence and tamper response, and other security features that serve to safeguard the private key (and other protected data) contained therein.

Such security features of devices include hardware, software, and firmware, and are well known in the art of manufacturing secure computer chips and other devices having cryptographic modules. The requirements of such security features are specified, for example, in Federal Information Processing Standards Publication 140-1, Security Requirements for Cryptographic Modules, US DOC/NBS, Jan. 11, 1994 (herein "FIPS PUB 140-1"), which is incorporated herein by reference and which is available for download at http://csrc.nist.gov/publications/fips; and Federal Information Processing Standards Publication 140-2, Security Requirements for Cryptographic Modules, US DOC/NBS, May 25, 2001 (herein "FIPS PUB 140-2"), which is incorporated herein by reference and which is available for download at http://csrc.nist.gov/publications/fips. FIPS PUB 140-1 and 140-2 also define security levels that may be met by a device based on the device's security features, with each of these defined security levels generally representing a various level of difficulty—in terms of time and money—that would be encountered in attempting to discern a private key of a device. Currently, four security levels are defined with security level 4 being the highest level of security available.

Specifications for such security features also are set forth in Trusted Computing Platform Alliance Trusted Platform Module Protection Profile Version 0.45, TRUSTED COMPUTING PLATFORM ALLIANCE, September 2000; Trusted Platform Module (TPM) Security Policy Version 0.45, TRUSTED COMPUTING PLATFORM ALLIANCE, October 2000; and TCPA PC Implementations Specification Version 0.95, TRUSTED COMPUTING PLATFORM ALLIANCE, Jul. 4, 2001, which are incorporated herein by reference (collectively "TCPA Documents"), and which are available for download at http://www.trustedpc.com; and Common Criteria for Information Technology Security Evaluation, Smart Card Protection Profile, Draft Version 2.1d, SMART CARD SECURITY USER GROUP, Mar. 21, 2001, which is incorporated herein by reference (hereinafter "Smart Card Protection Profile"), and which is available for download at http://csrc.nist.gov.

The particular features of a device that safeguard against discovery of a private key and other protected data are referred to herein as "security characteristics" of the device. The particular features of a device that safeguard against unauthorized use of the device by authenticating the user are referred to herein as "authentication capabilities" of the device. The "security features" of a device (including a cryptographic module or TPM) comprise the security characteristics and authentication capabilities as well as other security features of the device, the requirements of which are specified in the above cited references.

Unfortunately, while the aforementioned security features generally reduce the risk of fraud within the digital signature system overall, a recipient of any one particular EC including a digital signature may be unfamiliar with the device used to generate the digital signature and, therefore, be unable to gauge the risk of whether the digital signature was generated fraudulently, either through theft of the device or discovery of the private key.

Of course, if the recipient possesses a shared secret or a biometric value of the sender for performing Sender Authentication, then the recipient may determine that the digital signature was not fraudulently generated assuming that the shared secret or biometric value was not stolen. However, this type of protection by the recipient has significant drawbacks and is not always used by the recipient. For example, if the Secret or biometric value is communicated to the recipient in association with a message for Sender Authentication by the recipient, then the Secret or biometric value first must have been shared with the recipient beforehand and safeguarded by the recipient as part of an established, preexisting relationship; consequently, a recipient having no prior existing relationship with the sender is unable to perform Sender Authentication.

Another drawback is that the sharing of the Secret or biometric value with the recipient exposes the recipient to liability and exposes the Secret or biometric value itself to a greater risk of theft and dissemination. The transmission of the Secret or biometric value for verification carries with it the risk of interception and discovery during transit. Upon receipt, the Secret or biometric value must be safeguarded by the recipient, which inherently gives rise to a risk of theft from the recipient. This is especially significant in the corporate context where a rogue employee may steal the safeguarded Secret or biometric value (insider fraud historically has been the greatest threat). The potential damages also are extensive when the Secret or biometric value is stolen. Since it is difficult for an individual to remember multiple Secrets for multiple recipients, it is common for the same Secret to be used with different recipients. The theft of the Secret from one recipient thereby compromises the Sender Authentication performed by all of the recipients, at least until the Secret is changed for each recipient. In the case of the theft of a biometric value, the damages are even more severe, as a sender's biometric characteristic cannot be changed and, once lost, potentially compromises any future Sender Authentication therewith.

Accordingly, a recipient generally is unable to gauge the risk of whether a digital signature was generated fraudulently when no secret or biometric value is shared between the sender and the recipient. Instead, a recipient must rely upon blind trust in accepting that the device used to generate the digital signature has not been stolen and in accepting that the device used to generate the digital signature has sufficient safeguards to protect its private key from discovery and use.

A need therefore exists for a method by which a recipient may reliably identify a risk of whether a digital signature has been generated fraudulently using a stolen private key (whether stolen by physical theft of the device or discovery of the private key itself), whereby the recipient may protect itself against fraud. In this regard, a need also exists for a method by which a recipient of an EC including a digital signature may reliably determine at any given time the current level of security of the device to which belongs the private key used to generate the digital signature. A need also exists for a method by which a recipient of an EC may reliably determine the safeguards of such device that protect against fraudulent use thereof.

SUMMARY OF PRESENT INVENTION

The present invention generally comprises the linking in a reliable manner of a public key of a device that generates digital signatures using asymmetric cryptography to other information regarding the device within an environment in which the device is manufactured. As used herein, the "other information" comprises at least one of security features and manufacturing history of the device, and preferably includes both security features and manufacturing history of the device (herein collectively referred to as "Security Profile").

As used herein, the "authentication capabilities" of the device include those components that perform either or both of Factors B and C Entity Authentication with regard to authentication of the user of the device. Furthermore, the "manufacturing history" of the device preferably includes a recording of manufacturing attributes of the device, such as the manufacturer of the device; all specifications applicable to the device; manufacture date of the device; location of manufacture; batch identifier of the device; serial number or part number of the device; security of the manufacturing facility; physical instantiation of the device regarding layout and process geometry; software identification and release date; operating parameters of the device, including voltage and frequency ranges; and identification of all enabled hardware and software security features of the device. The manufacturing history of the device also preferably includes the cryptographic characteristics, key generation characteristics, and random number generator characteristics of the device.

A. First Aspect of the Present Invention: Identifying PuK-Linked Information of Device Generating Digital Signatures A first aspect of the present invention includes the linking of a public key of a device with other information within the environment of its manufacture and then the later identifying of the other information regarding the device after the release of the device from the manufacturing environment based upon its public key. By considering such information later identified, a recipient is able to gauge a risk or likelihood of whether a digital signature using the private key belonging to the device was generated fraudulently.

In accordance with the preferred methods of the first aspect of the present invention, the device is manufactured in a secure environment (i.e., an environment having a sufficient security rating so as not to compromise the security level of any device manufactured in such environment). Furthermore, the information linked with the public key of the device comprises the Security Profile of the device. Accordingly, the recipient is able to determine a current security level of the device based on the identified security features of the device. The recipient also is able to gauge a risk of whether the private key of the device was compromised based on the identified security characteristics of the device, and the recipient is able to gauge a risk of whether the device containing the private key was fraudulently used based on the identified authentication capabilities of the device. Finally, the recipient is able to evaluate the stated security features of the device based upon the identified manufacturing history of the device.

In preferred methods of the first aspect of the present invention, before a manufactured device is removed from the secure environment, a public-private key pair is created within the device and the public key is exported and linked to the Security Profile of the device within one or more databases maintained within the secure environment (herein collectively "secure database"). In particular, one of the keys—the public key—is recorded in the secure database by the device manufacturer or other trustworthy entity ("Secure Entity"), and the other key—the private key—is preferably retained within the manufactured device and safeguarded against discovery. The public key also is retained within the device and is exportable upon demand. The Security Profile of the manufactured device is recorded in the secure database, and the record therefor is indexed or mapped to the corresponding public key, thereby reliably linking together both the public key and Security Profile of the device. In this case, the unique identifier is stored within the device and is exportable upon demand. Moreover, since each public key is unique—at least to a high degree of probability—the mapping in the secure database is one-to-one. Alternatively, the public key and Security Profile are indexed to a unique identifier of the device within the secure database, thereby reliably linking together the public key and Security Profile of the device, whereby an assurance level of the device may be determined.

Subsequently, when an EC is received by a recipient that includes a digital signature generated by a suspect device and the message is authenticated utilizing a suspect public key, the recipient identifies the Security Profile linked to the suspect public key as pertaining to the actual manufactured device to which belongs the private key used to generate the digital signature of the EC (herein "genuine device"). Then, whether the digital signature was generated fraudulently can be gauged by the recipient based upon the known Security Profile for the genuine device. Specifically, the risk of whether the private key retained within the manufactured device has been compromised—and thus whether the suspect device is the genuine device—can be gauged based on the identified security characteristics of the genuine device, and the risk of whether the genuine device has been fraudulently used can be gauged based on the identified authentication capabilities of the genuine device. These evaluations also can be qualified based on the identified manufacturing history of the device, as appropriate.

In alternative preferred methods of the first aspect of the present invention, a public-private key pair is created and the public key of the device is linked to the Security Profile of the device by combining the public key with the Security Profile into a record that then is digitally signed by the Secure Entity. The record and digital signature together form a "Security Certificate," which also is imported into the device for safekeeping with the private key. The digital signing of the record by the Secure Entity in the secure environment reliably links the Security Profile of the manufactured device and its public key.

Subsequently, when a digital signature is generated by the device for inclusion in an EC, the Security Certificate also is included in the EC. Upon receipt and successful authentication of the message using the suspect public key set forth in the Security Certificate, the recipient authenticates the Security Certificate in the EC utilizing a public key of the Secure Entity. Upon successful authentication thereof, the recipient reliably identifies the Security Profile of the genuine device to which belongs the private key used in generating the digital signature of the EC. Then, whether the digital signature was generated fraudulently can be gauged by the recipient based upon the known Security Profile for the genuine device. Specifically, the risk of whether the private key retained within the manufactured device has been compromised—and thus whether the suspect device is the genuine device—can be gauged based on the identified security characteristics of the genuine device, and the risk of whether the genuine device has been fraudulently used can be gauged based on the identified authentication capabilities of the genuine device. These evaluations also can be qualified based on the identified manufacturing history of the device, as appropriate.

B. Second Aspect of the Present Invention: Establishing PuK-Linked Account Database A second aspect of the present invention includes establishing an initial PuK-linked account database. A method in accordance with this aspect of the present invention includes manufacturing devices that generate digital signatures and, for each manufactured device before it is released from the environment of its manufacture: creating a pair of keys used in asymmetric cryptography; storing one of the keys within the manufactured device for utilization in generating a digital signature for an electronic message; and recording the other key and other information in a database maintained within the environment such that the information is linked with the key in the database. The manufactured devices then are distributed to a plurality of users. The users to which the manufactured devices are distributed may comprise existing customers as well as potential customers of a third-party. Thereafter, the database records of the distributed manufactured devices are identified to the third-party as the initial PuK-linked account database of the users.

In accordance with the preferred methods of this aspect of the present invention, the information with which each key of a device is linked comprises the Security Profile of the respective device, and the devices for which the Security Profiles are identified are manufactured in a secure environment. The database also preferably comprises a secure database. Furthermore, the keys of each device preferably are generated and are retained within the device, with the public key preferably being exportable on demand.

In preferred methods of this aspect of the present invention, the identifying of the database records includes communicating from the secure environment in a secure manner the database records for the distributed manufactured devices as the initial PuK-linked account database of the third-party. In this regard, the database records are communicated in a manner having a security rating greater than the security level of any manufactured device to which the database records pertain. Indeed, the security rating should be proportional to the aggregate risk presented by all of the individual devices to which the database records pertain. Such a manner includes generating a digital signature for the database records and then communicating the database records and digital signature to the third-party.

When the third-party receives the PuK-linked database as the initial PuK-linked account database of the users, it may be updated with specific information of the users that is provided by each user. In associating information specific to a user with a record of the initial PuK-linked account database, Factor A Entity Authentication preferably is used based on the user digitally signing a message with the private key of the manufactured device. Alternatively, the initial PuK-linked account database may be merged with a preexisting account database of the users maintained by the third-party that contains user-specific information, or the initial PuK-linked account database may be maintained separately from but indexed with such a preexisting account database of the users. In such case, the third-party preferably authenticates each user as being the correct user for the respective records of the user in the account databases before such association is made. Accordingly, Factor A Entity Authentication preferably is used with respect to the record of the user in the PuK-linked account database, and other entity authentication techniques are used for authenticating the user with respect to the record in the account database. Such other techniques may include questioning the user about specific-account information in the record or requiring the user to provide a Secret, such as the maiden name of the mother of the user.

C. Third Aspect of the Present Invention: Establishing Initial PuK-Linked Account Database Record A third aspect of the present invention includes establishing an initial PuK-linked account database record of a user with a plurality of accounts maintained by different third-parties. A method in accordance with this aspect of the present invention includes manufacturing devices that generate digital signatures and, for each manufactured device before it is released from the environment of its manufacture: creating a pair of keys used in asymmetric cryptography; storing one of the keys within the manufactured device for utilization in generating a digital signature for an electronic message; and recording the other key and other information in a database maintained within the environment such that the information is linked with the key in the database. One of the manufactured devices then is distributed to the user. Thereafter, the database record of the distributed device is identified to each of the third-parties as being the initial PuK-linked account database record of the user. The user may be a customer or potential customer of each third-party.

In accordance with the preferred methods of this aspect of the present invention, the information with which the key of the device is linked comprises the Security Profile of the device, and the device is manufactured in a secure environment. The database in which the key and Security Profile are linked also preferably comprises a secure database. Furthermore, the keys preferably are generated and are retained within the device, with the public key preferably being exportable on demand.

In preferred methods of this aspect of the present invention, the identifying of the initial PuK-linked database record includes communicating from the secure environment in a secure manner the database record for the device of the user to a third-party at which an account of the user is or will be maintained. In this regard, the database records are communicated in a manner having a security rating greater than the security level of the manufactured device to which the database record pertains. Such a manner includes generating a digital signature for the database record by the Secure Entity and then communicating the database record and digital signature to the third-party.

When the third-party receives the PuK-linked database record as the initial PuK-linked account database record of the user, it may be updated with specific information of the user as provided by the user. In associating user-specific information with the initial PuK-linked account database record of the user, Factor A Entity Authentication preferably is used for the initial PuK-linked account database record based on the user digitally signing a message with the private key of the manufactured device. Alternatively, the initial PuK-linked account database record may be merged with a preexisting account database record of the user maintained by the third-party that contains user-specific information, or the initial PuK-linked account database record may be maintained separately from but indexed with such a preexisting account database record of the user. In such case, the third-party preferably authenticates the user as being the correct user for both account records before such association. Accordingly, Factor A Entity Authentication preferably is used in conjunction with other entity authentication techniques for authenticating a user with respect to the account database record. Such other techniques may include questioning the user about specific-account information in the record or requiring the user to provide a Secret, such as the maiden name of the mother of the user.

D. Fourth Aspect of the Present Invention: Insuring EC for a Transaction Based on Identified PuK-Linked Information of Device Generating Digital Signatures Yet a fourth aspect of the present invention includes the insuring of a transaction based, at least in part, on the identified information of a manufactured device that generates digital signatures in accordance with the first aspect of the present invention. In particular, a preferred method in accordance with the fourth aspect of the present invention includes the steps of manufacturing devices in a secure environment and, for each manufactured device before it is released from the secure environment: creating a pair of keys used in asymmetric cryptography; storing one of the keys within the manufactured device for utilization in generating a digital signature for an electronic message; and linking together in a secure manner the other key and the Security Profile of the manufactured device. The manufactured devices then are released from the secure environment.

Thereafter, an electronic communication representing the transaction is sent with a digital signature generated with a suspect device. The electronic communication includes an electronic message and a digital signature generated for the electronic message utilizing the key stored in one of the manufactured devices. Upon receipt, the message is authenticated using a public key. The Security Profile linked to the public key successfully authenticating the message then is identified as the Security Profile of the genuine device to which belongs the private key used in generating the digital signature, and a monetary guarantee is provided that the digital signature for the electronic message was not generated fraudulently. The monetary guarantee, i.e., the insurance, is provided in exchange for a premium that is based, at least in part, upon an evaluation of the identified security features of the genuine device and further may be based on an evaluation of the manufacturing history of the device. In this regard, the preferred method further includes assigning a defined risk level to the EC based on the identified Security Profile, with each defined risk level corresponding to a different premium rate that is charged for the provision of the monetary guarantee.

E. Fifth Aspect of the Present Invention: Gauging Whether EC on Account is Fraudulent Based on PuK-Linked Information of Device Generating Digital Signatures A fifth aspect of the present invention includes gauging a risk of whether an EC including a digitally signed message representing a transaction on an account is fraudulent based not only on information linked with the public key of a device used to generate the digital signature, but also on a transactional history of the account as recorded by the recipient and, in particular, a history of transactions on the account that were digitally signed (herein "transactional history").

In a feature of this aspect of the present invention, a plurality of manufactured devices are distributed to or acquired by a user and the database record for each distributed device is provided to the recipient and associated with the account of the user. Subsequently, for ECs for transactions on the account that are received by the recipient and that include digital signatures generated by one of the devices, the recipient records the particular details regarding each such transaction in the account. However, rather than generally associating the transaction details with the overall account, the recipient associates the transaction details with the linked public key used to successfully authenticate the message of the EC. Accordingly, for each EC received, the recipient evaluates the potential for a fraudulent EC based not only on the information linked with the public key identified in accordance with the first aspect of the present invention, but also on the transactional history of digitals signatures authenticated using such key as recorded by the recipient. In yet an additional feature, the environment in which the digital signature of an EC is generated, if such information is discernable from the EC or otherwise obtainable, also preferably is considered in gauging a risk of whether the EC is fraudulent. For instance, an I/O support element may also digitally sign an EC, and information regarding the I/O support element linked to the public key of the I/O support element may be identified in accordance with the first aspect of the present invention. Furthermore, in another feature, the authentication techniques performed (if any) when a linked public key was associated with the account of the user are recorded in the account record and are considered in gauging a risk of whether a particular EC is fraudulent.

F. Sixth Aspect of the Present Invention: Service for Disseminating PuK-Linked Information of Device Generating Digital Signatures In accordance with a sixth aspect of the present invention, an entity (herein "Central Key Authority") maintains PuK-linked account registration information for a user (herein "Registration Information"). The Registration Information includes the public key and one or more of the following types of information relating to a particular device of the user that generates digital signatures: the identity of third-parties with which the user has PuK-linked accounts for the device; information linked with the public key of the device in accordance with the first aspect of the present invention; user-specific information; and, if applicable, the authentication techniques that were employed in verifying the user-specific information maintained by the Central Key Authority.

In accordance with this aspect of the present invention, the Central Key Authority disseminates some or all of the Registration Information, as appropriate, to a third-party. Registration Information is disseminated when the user has an account with a third-party—or desire to establish an account with a third-party—and desires to send ECs with messages representing transactions on the account that are digitally signed using the device. The dissemination of the Registration Information also occurs, for example, when Registration Information with a third-party has become outdated for a particular account. Furthermore, the dissemination of the Registration Information may be in accordance with the third aspect of the present invention.

BRIEF DESCRIPTION OF THE DRAWINGS

Further features and benefits of these aspects of the present invention will be apparent from a detailed description of preferred embodiments thereof taken in conjunction with the following drawings, wherein like references refer to like elements, and wherein:

FIG. 3 illustrates a communication sequence in identifying a Security Profile of a device in accordance with the first preferred method of the first aspect of the present invention;

FIG. 4 illustrates a flowchart of steps performed by a suspect device originating a digital signature in an EC in accordance with the first preferred method of the first aspect of the present invention;

FIG. 5 illustrates a flowchart of steps performed by a recipient in accordance with the first preferred method of the first aspect of the present invention;

FIG. 6 illustrates a flowchart of steps performed by a Secure Entity in accordance with the first preferred method of the first aspect of the present invention;

FIG. 9 illustrates a flowchart of steps performed by a suspect device originating a digital signature in an EC in accordance with the second preferred method of the first aspect of the present invention;

FIG. 10 illustrates a flowchart of steps performed by a recipient in accordance with the second preferred method of the first aspect of the present invention;

FIG. 11 illustrates a flowchart of steps performed by a Secure Entity in accordance with the second preferred method of the first aspect of the present invention;

FIG. 14 illustrates a flowchart of steps performed by a suspect device originating a digital signature in an EC in accordance with the third preferred method of the first aspect of the present invention;

FIG. 15 illustrates a flowchart of steps performed by a recipient in accordance with the third preferred method of the first aspect of the present invention;

FIG. 16 illustrates a flowchart of steps performed by a Secure Entity in accordance with the third preferred method of the first aspect of the present invention;

FIG. 19 illustrates database records of an initial PuK-linked account database in accordance with the preferred method of the second aspect of the present invention;

FIG. 20 illustrates a PuK-linked account database of customers comprising the database records of FIG. 19 after having been updated and/or merged by the third-party representing an Internet service provider;

FIG. 21 illustrates a PuK-linked account database of customers comprising the database records of FIG. 19 after having been updated and/or merged by the third-party representing a financial institution;

FIG. 25 illustrates a flowchart of steps performed by a suspect device originating a digital signature of an EC in accordance with the first preferred method of the fourth aspect of the present invention;

FIG. 26 illustrates a flowchart of steps performed by a Financial Institution in accordance with the first preferred method of the fourth aspect of the present invention;

FIG. 27 illustrates a flowchart of steps performed by an Insuring Entity in accordance with the first preferred method of the fourth aspect of the present invention;

FIG. 28 illustrates a flowchart of steps performed by a Secure Entity in accordance with the first preferred method of the fourth aspect of the present invention;

FIG. 30 illustrates a flowchart of steps performed by a suspect device originating a digital signature in an EC in accordance with the second preferred method of the fourth aspect of the present invention;

FIG. 31 illustrates a flowchart of steps performed by a Financial Institution in accordance with the second preferred method of the fourth aspect of the present invention;

FIG. 32 illustrates a flowchart of steps performed by an Insuring Entity in accordance with the second preferred method of the fourth aspect of the present invention;

FIG. 33 illustrates a flowchart of steps performed by a Secure Entity in accordance with the second preferred method of the fourth aspect of the present invention;

FIG. 35 illustrates a flowchart of steps performed by a suspect device originating a digital signature in an EC in accordance with the third preferred method of the fourth aspect of the present invention;

FIG. 36 illustrates a flowchart of steps performed by a Financial Institution in accordance with the second preferred method of the fourth aspect of the present invention;

FIG. 37 illustrates a flowchart of steps performed by an Insuring Entity in accordance with the second preferred method of the fourth aspect of the present invention;

FIG. 38 illustrates a flowchart of steps performed by a Secure Entity in accordance with the second preferred method of the fourth aspect of the present invention;

FIG. 44 illustrates an established PuK-linked account database of customers of a third-party representing a financial institution in accordance with a preferred method of a fifth aspect of the present invention;

FIG. 45 illustrates a flow chart for considering whether to perform a transaction on an account in accordance with a preferred method of the fifth aspect of the present invention;

FIG. 46 illustrates an account database of a Central Key Authority in accordance with a sixth aspect of the present invention;

FIG. 48 illustrates a flowchart of steps performed by a user in accordance with the preferred method of the sixth aspect of the present invention of FIG. 47;

FIG. 49 illustrates a flowchart of steps performed by a Central Key Authority in accordance with the preferred method of the sixth aspect of the present invention of FIG. 47;

FIG. 50 illustrates a flowchart of steps performed by a first Account Authority in accordance with the preferred method of the sixth aspect of the present invention of FIG. 47; and FIG. 51 illustrates a flowchart of steps performed by a second Account Authority in accordance with the preferred method of the sixth aspect of the present invention of FIG. 47.

DETAILED DESCRIPTION OF PREFERRED EMBODIMENTS

Figure 1:
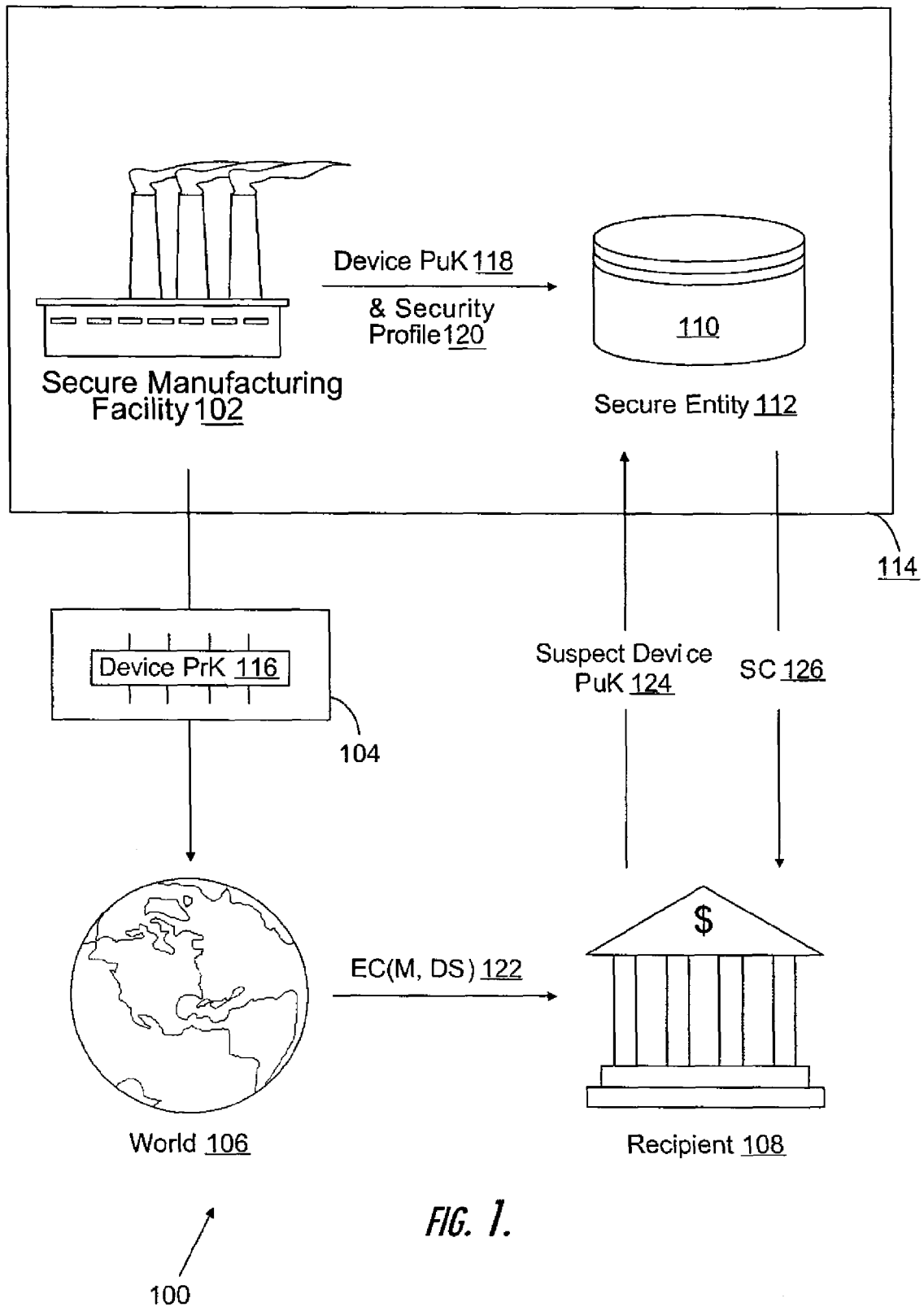
FIG. 1 illustrates a preferred system in which a first preferred method of the first aspect of the present invention is practiced.

As a preliminary matter, it readily will be understood by those persons skilled in the art that, in view of the following detailed description of the devices, systems, and methods of the present invention, the present invention is susceptible of broad utility and application. Many embodiments and adaptations of the present invention other than those herein described, as well as many variations, modifications, and equivalent arrangements, will be apparent from or reasonably suggested by the present invention and the following detailed description thereof, without departing from the substance or scope of the present invention. Furthermore, those of ordinary skill in the art will understand and appreciate that although steps of various processes may be shown and described in some instances as being carried out in a preferred sequence or temporal order, the steps of such processes are not necessarily to be limited to being carried out in such particular sequence or order. Rather, in many instances the steps of processes described herein may be carried out in various different sequences and orders, while still falling within the scope of the present invention. Accordingly, while the present invention is described herein in detail in relation to preferred embodiments, it is to be understood that this detailed description only is illustrative and exemplary of the present invention and is made merely for purposes of providing a full and enabling disclosure of the present invention. The detailed description set forth herein is not intended nor is to be construed to limit the present invention or otherwise to exclude any such other embodiments, adaptations, variations, modifications and equivalent arrangements of the present invention, the present invention being limited solely by the claims appended hereto and the equivalents thereof.

A. Overview of the Present Invention

The present invention generally comprises the linking in a reliable manner of a public key of a device that generates digital signatures using public-private key cryptography to other information regarding the device within an environment in which the device is manufactured. The public-private key pair preferably is generated within the device during its manufacture; thereafter, the private key is retained securely within the device and never exported, and the public key may be retained within the device and exportable upon demand whenever needed.

In accordance with all of the aspects of the present invention, the device comprises hardware or firmware and, specifically, comprises a computer chip, an integrated circuit, a computer-readable medium having suitable software therein, or a combination thereof. The device further may comprise a physical object such as a hardware token or an embedded token, the token containing such a computer chip, integrated circuitry, or software, or combination thereof. If the device is a hardware token, it preferably takes the form of a ring or other jewelry; a dongle; an electronic key; a card, such as an IC card, smart card, debit card, credit card, ID badge, security badge, parking card, or transit card; or the like. If the device is an embedded token, it preferably takes the form of a cell phone; a telephone; a television; a personal digital assistant (PDA); a watch; a computer; computer hardware; or the like. The device preferably includes a device interface comprising a port—including a wireless communications port, a serial port, a USB port, a parallel port, or an infrared port—or some other physical interface for communicating with an external electronic apparatus, whether contact or contactless. The device also may include a trusted platform module (TPM) comprising hardware and software components providing increased trust in a platform, as set forth and described in the TCPA Documents cited above.

Some of these devices require use of an I/O support element to enable the device to receive data representing a message, a Secret, or a biometric characteristic. Some of the devices require an I/O support element to receive specific types of data but not others. Some of the devices require use of an I/O support element to transmit information including digital signatures and messages to recipients. Some of the devices are self-contained and can generate and transmit messages and digital signatures without the use external apparatuses; some devices, although self-contained, are capable of interacting with such external apparatuses, such as an I/O support element, if desired. An I/O support element may take the form of any number of different apparatuses, depending upon the particular application in which it is used and depending upon the type of device with which interacts.

For applications of a device requiring high security, the device—or the device in combination with an I/O support element—preferably includes the following components: a keypad (alphanumeric), interactive display, or other type of user data entry mechanism (collectively referred to herein as "User Interface") that allows a user to compose or modify a message; a User Interface for inputting data representing a Secret (it should be noted that the User Interface for generating or modifying a message may, but does not have to, be the same as the User Interface for the entry of the data representing a Secret); a display for showing the message and/or Secret to the user; a scanner or reader for receiving at least one type of biometric data for a biometric characteristic of the user; memory for securely storing the Secret of the authorized user, biometric data of the authorized user, and the private key; a processor or circuitry for verifying input of the Secret of biometric data as being that of the authorized user; a processor or circuitry for generating or originating digital signatures; and a means for outputting from the device and transmitting information including the message and digital signature therefor. Preferably, the device also includes memory for storing and exporting the public key associated with the particular private key, and for storing types of user information such as account information, user ID, and the like. For lower security applications, not all of the above elements are necessary.

The public key linked information in the preferred embodiments of the present invention includes the Security Profile of the device. As defined above, the Security Profile preferably includes the security features of the device (including characteristics and authentication capabilities), as well as the manufacturing history of the device. It is important to know the security features of a device—rather than simply a stated security level of the device—as technologies are developed over time that reduce the effectiveness of such security features and, consequently, result in the decrease of the actual security level of the device. Unless upgrades are made, the security features of a device are permanent while the security level of the device eventually will decrease over time. By knowing the security features, the appropriate security level of a device may be determined at any given time. Furthermore, by knowing the security characteristics of the device, a recipient is able to gauge a likelihood of whether the private key of the device has been compromised, and by knowing the authentication capabilities of the device (or lack thereof), a recipient is able to gauge a likelihood of whether someone other than the authorized user utilized the device to generate a digital signature. Finally, by knowing the manufacturing history of a device, the security features of the device may be revised as errors, omissions, flaws, security breaches, or possible improprieties and the like are discovered as having occurred during the manufacturing of the device.

B. Identifying PuK-Linked Information of Device Generating Digital Signatures

1. First Preferred Embodiment

In accordance with the first aspect of the present invention, and with reference to FIG. 1, a first preferred embodiment is practiced within a first preferred system 100 that includes a secure manufacturing facility 102, devices manufactured at the facility 102 as represented by device 104, the world 106, a recipient 108, and a secure database 110 maintained by a Secure Entity 112. The facility 102 and the secure database 110 are located within a secure environment 114, which represents any and all locations having a sufficient security rating so as not to compromise the security level of the device 104 manufactured in the facility 102. As will be apparent, the facility 102 and the secure database 110 need not be co-located at the same physical location in order to be within the secure environment 114. Nor must the manufacturer of the device 102 be the Secure Entity 112 that maintains the secure database 110, although such possibility is within the scope of the present invention.

Figure 2:
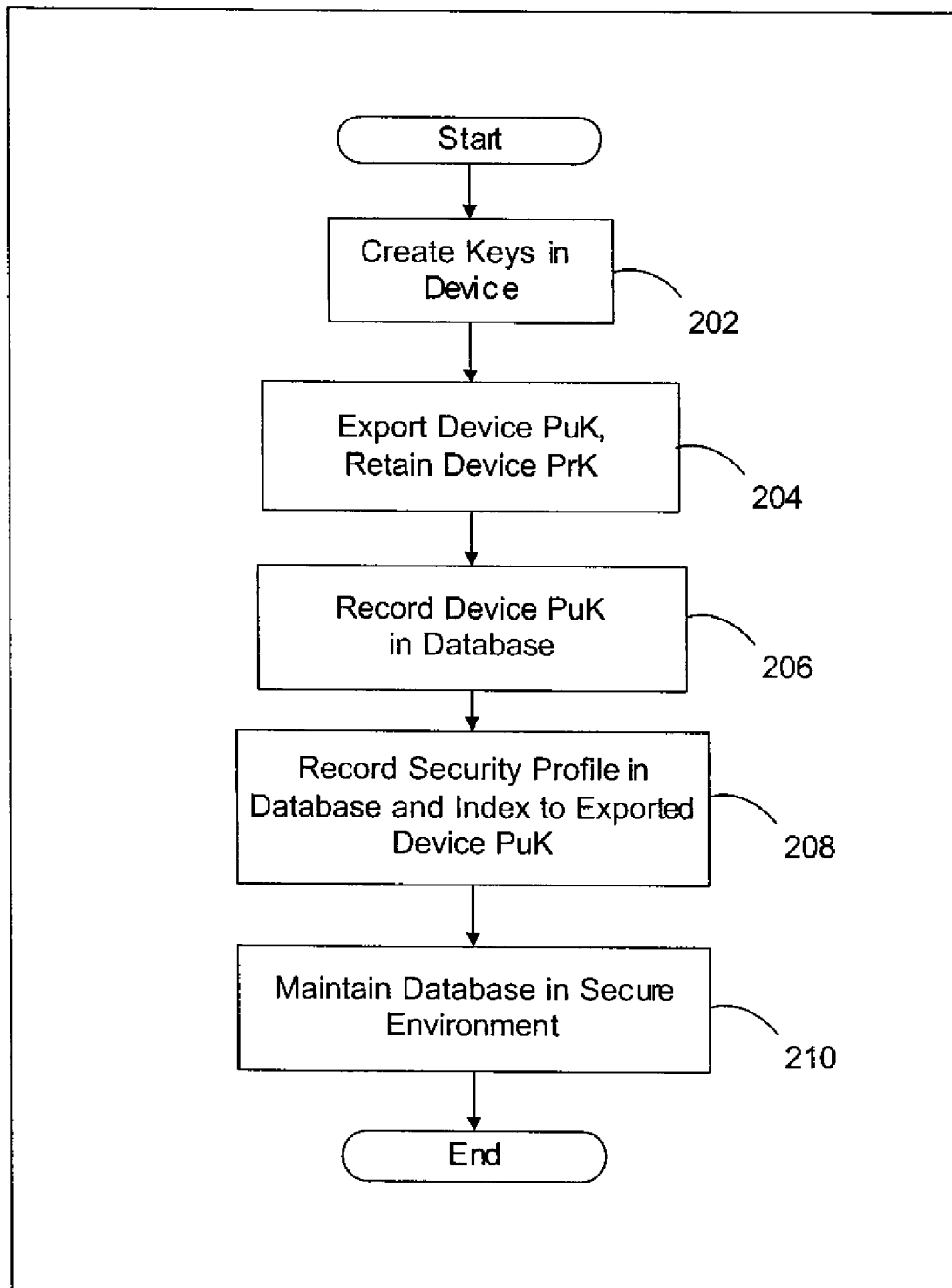
FIG. 2 illustrates a flowchart of steps performed within a secure environment in accordance with the first preferred method of the first aspect of the present invention.

The relevant manufacturing steps that are performed within the secure environment 114 are set forth in FIG. 2. With reference to both FIGS. 1 and 2, a public-private key pair is generated (Step 202) within the device 104 during its manufacture in the facility 102 and before the device 104 is released from the secure environment 114. Preferably the public-private key pair is created with a random number generator disposed within the device 104 itself. The private key 116 (PrK) is retained within the device 104, while the corresponding public key (PuK) 118 is exported (Step 204) from the device 104 and recorded (Step 206) in the secure database 110 before the device 104 is released from the secure environment 114. If desired, the public key 118 also may be retained (not shown) within the device 104 for later export upon demand after release of the device 104 from the secure environment 114. The private key 116 is utilized, for example, in generating a digital signature (DS) for a message (M) that is communicated to the recipient 108. In addition to the public key 118, a Security Profile 120 of the device 104 is compiled and recorded (Step 208) in the secure database 110 and indexed to the public key 118, whereby the Security Profile 120 is retrievable from the secure database 110 based on knowledge of the public key 118. The public key 118 and Security Profile 120 are thereby securely linked together.

Following population of the secure database 110 with the public key 118 and Security Profile 120 of the device 104, the device 104 is released from the secure environment 114 into the world 106. The secure database 110, however, is maintained (Step 210) in the secure environment 114 to preserve the integrity of the data recorded therein. Furthermore, following manufacture the security rating of the secured environment 114 is maintained at a level that is at least as comparable to, and preferably greater than, the security level of each device 104 manufactured at the facility 102 for which the public key 118 and Security Profile 120 are maintained in the secure database 110.

With reference now to FIGS. 3-6, a digital signature (DS) is originated (Step 402) for a message (M) somewhere in the world 106 with a suspect device. The suspect device may be the genuine device 104 manufactured at the facility 102 of FIG. 1 that is legitimately used, the genuine device 104 that is fraudulently used, or a counterfeit device having a replica of the private key 116 of the genuine device 104. The digital signature then is combined (Step 404) with the message to form an EC 122, which is sent (Step 406) to the recipient 108 over any conventional secure or insecure electronic communications network, such as the Internet or a private network.

The recipient 108 receives the EC 122 (Step 502) and attempts to authenticate (Step 504) the message using a suspect device public key 124. The suspect device public key 124 is provided to the recipient 108 and, preferably, is included within the EC 122 that is received by the recipient 108, whereby the recipient 108 may readily attempt authentication of the message. Alternatively, the suspect device public key 124 is identified to the recipient 108 before or after receipt of the EC 122 in such a manner that the recipient 108 is able to associate the suspect device public key 124 with the EC 122.

In any event, if the message successfully authenticates using the suspect device public key 124, and if the message is the first message authenticated using the suspect device public key 124, then the recipient 108 sends (Step 506) the suspect device public key 124 to the Secure Entity 112 that manages the secure database 110 and requests a Security Profile associated with that public key 124. Communications between the recipient 108 and the Secure Entity 112 are by way of any conventional secure or insecure electronic communications network, such as the Internet or a private network.

When the Secure Entity 112 receives (Step 604) the suspect device public key 124 from the recipient 108, the Secure Entity 112 compares (Step 606) the suspect device public key 124 against the exported public keys maintained in the secure database 110 to determine if there is a match. If a match is found, then the Security Profile associated with the matching exported public key is retrieved and, for the purpose of maintaining the integrity of the information during transit, digitally signed (Step 608) by the Secure Entity 112. The Security Profile and digital signature therefor create a "Security Certificate" (SC) 126 that then is forwarded (Step 610) to the recipient 108. Preferably, the public key 118 of the manufactured device 104 matching the suspect device public key 124 is included in the Security Certificate 126 for confirmation by the recipient 108 of the public key 118 to which the Security Certificate 126 pertains.

Upon receipt (Step 508) of the Security Certificate 126 from the Secure Entity 112, the authenticity of the Security Certificate 126 is checked (Step 510) using a public key 128 (SE PuK) of the Secure Entity 112, which preferably has been communicated (Step 602) to the recipient 108 beforehand. Subsequently, upon a successful authentication, the Security Profile contained in the authenticated Security Certificate 126 is identified as the Security Profile 120 of the genuine device 104 to which belongs the private key 116 used to digitally sign the message of the EC 122.

Thereafter, the recipient 108 gauges the risk of whether the use of the private key 116 of the genuine device 104 to digitally sign the message of the EC 122 was fraudulent based on the identified Security Profile. The Security Certificate 126 also is recorded by the recipient 108 in an "in-house" database maintained by the recipient 108, whereby the same suspect device public key 124 used to authenticate future ECs may be referenced against this in-house database for identifying the appropriate Security Profile, rather than again sending a request for the Security Profile to the Secure Entity 112. Accordingly, another request need not be made unless and until the Security Profile has been updated by the Secure Entity 112.

2. Second Preferred Embodiment

Briefly described, in a second preferred embodiment of the first aspect of the present invention a Secure Entity generates a reference containing device public keys and corresponding Security Profiles linked thereto for a plurality of devices manufactured at a secure manufacturing facility and communicates the reference to a recipient. The reference is embodied in print or electronic media and includes a list of Security Profiles of manufactured devices indexed by their respective public keys. Furthermore, the reference preferably is digitally signed by the Secure Entity, whereby the recipient may securely rely upon the information contained in the reference when successfully authenticated with a public key of the Secure Entity. Thereafter, the recipient only need compare each suspect device public key that successfully authenticates a message against the device public keys included in the reference, rather than actually send each suspect device public key to the Secure Entity for a Security Profile, The recipient thereby is readily able to identify the Security Profile of the genuine device to which belongs the private key used to digitally sign the message.

Figure 7:
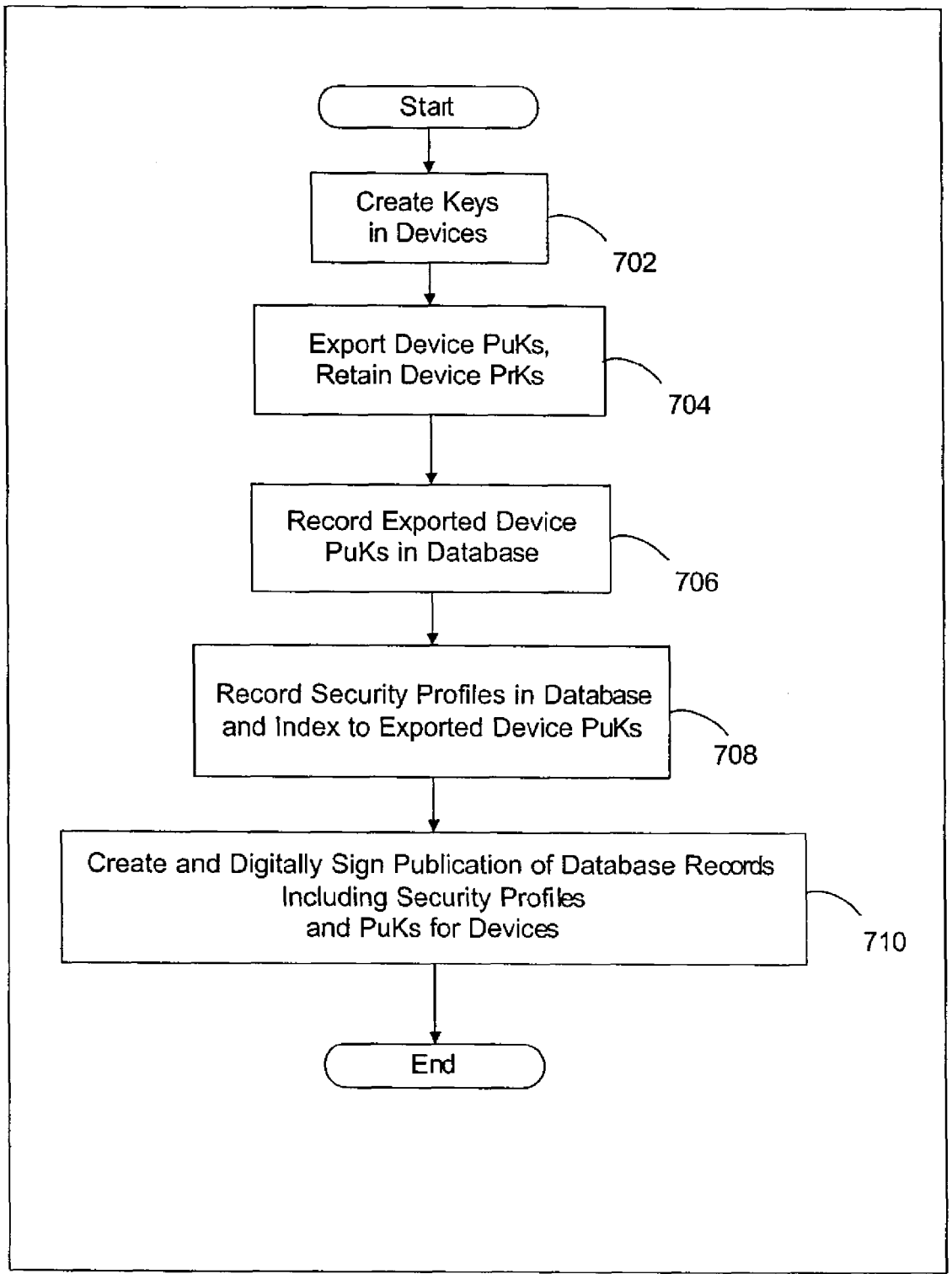
FIG. 7 illustrates a flowchart of steps performed within the secure environment in accordance with a second preferred method of the first aspect of the present invention.
Figure 8:
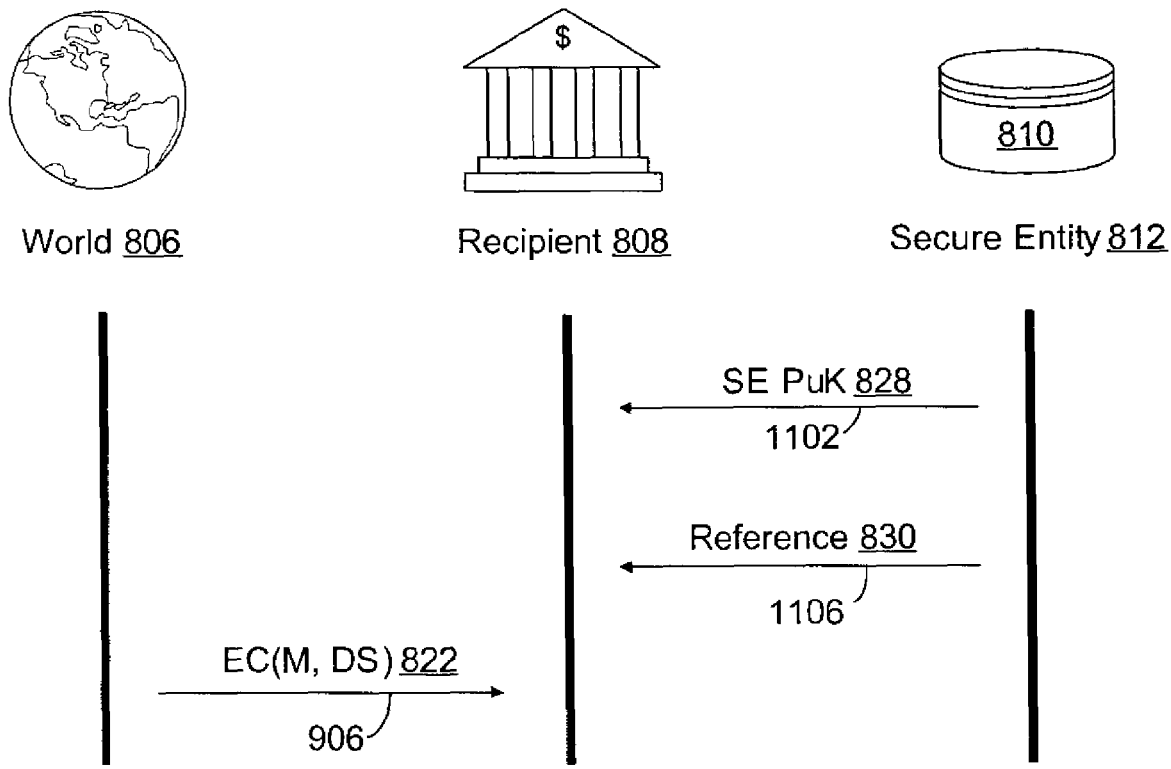
FIG. 8 illustrates a communication sequence in identifying a Security Profile of a device in accordance with the second preferred method of the first aspect of the present invention.

With particular reference to FIG. 7, and in accordance with this second preferred embodiment, a public-private key pair is created (Step 702) within each device during its manufacture and before the devices are removed from a secure environment 714. The respective private key of each device is retained securely within the device, and the respective public key is exported from each device (Step 704) and recorded (Step 706) in a secure database together with the respective Security Profile of each device. The respective public key may also be retained within each device and be exportable upon demand. Each Security Profile is indexed with the exported public key (Step 708) of the respective device, whereby the Security Profile of the device is retrievable from the secure database based on the public key. Following population of the secure database with the public key and Security Profile of the device, the Secure Entity creates and preferably digitally signs (Step 710) a reference including the Security Profiles and public keys linked therewith for the respective devices. As will be appreciated by one of ordinary skill in the art, all of the Steps 702-710 occur within the secure environment 714.

Following release of the devices from the secure environment 714, and with reference now to FIGS. 8-11, a digital signature is originated (Step 902) for a message (M) somewhere in the world 806 with a suspect device, and the digital signature is combined (Step 904) with the message to form an EC 822, which is then sent (Step 906) to the recipient 808. The recipient 808 receives the EC 822 (Step 1004) and attempts to authenticate (Step 1006) the message using a suspect device public key sent within the EC 822 or otherwise provided to the recipient 808.

Upon successful authentication of the message, the recipient 808 compares the suspect device public key against the public keys included in the reference 830 created by the Secure Entity 812. The reference 830 is forwarded (Step 1106) to the recipient 808 and received and authenticated (Step 1002) by the recipient 808 preferably before the receipt of the EC 822. Also, in order that the recipient 808 may authenticate the reference 830, the public key 828 (SE PuK) of the Secure Entity 812 also preferably is communicated (Step 1102) in a secure manner beforehand. Then, if the suspect device public key matches a public key in the reference 830, the Security Profile of the genuine device to which belongs the private key used to digitally sign the message is identified. Subsequently, the recipient 808 is able to gauge, based on the identified Security Profile, a risk that the private key of the genuine device was fraudulently used to digitally sign the message of the EC 822.

3. Third Preferred Embodiment

Figure 12:
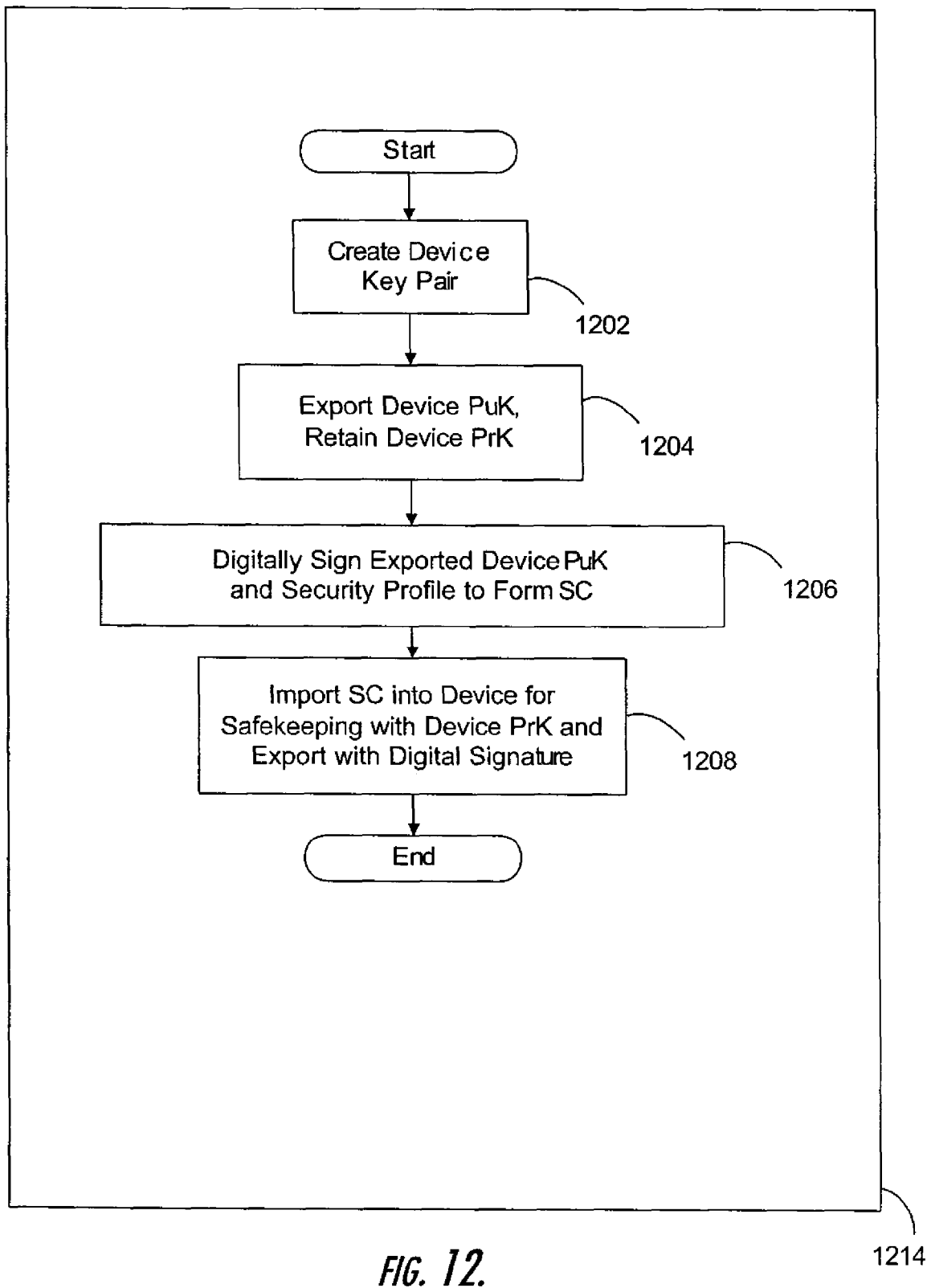
FIG. 12 illustrates a flowchart of steps performed within the secure environment in accordance with a third preferred method of the first aspect of the present invention.
Figure 13:
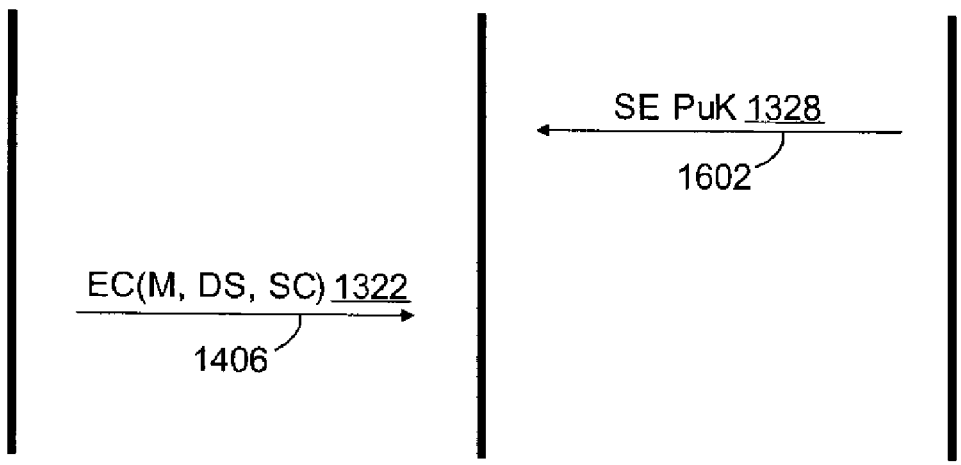
FIG. 13 illustrates a communication sequence in identifying a Security Profile of a device in accordance with the third preferred method of the first aspect of the present invention.

In a third preferred method, a Security Certificate is incorporated into a manufactured device itself prior to its release from the secure environment of its manufacture. In this regard, and with reference to FIG. 12, a pair of keys are created (Step 1202) within the device during its manufacture and before its release from a secure environment 1214. The private key is securely retained within the device, and the public key is exported (Step 1204) from the device and may also be retained within the device and be exportable upon demand. The exported public key is combined with a Security Profile of the device and digitally signed (Step 1206) by the Secure Entity to form the Security Certificate. The Security Certificate then is imported (Step 1208) into the device itself and is exportable from the device with a digital signature for inclusion in an EC.

Thereafter, with reference to FIGS. 13-16, a suspect device originates (Step 1402) a digital signature for a message (M) somewhere in the world 1306. The digital signature and Security Certificate of the device are then exported from the device and combined (Step 1404) with the message to form an EC 1322, which then is sent (Step 1406) to the recipient 1308. Upon receipt (Step 1504) of the EC 1322 by the recipient 1308, the suspect device public key identified in the Security Certificate is used to authenticate (Step 1506) the message, and the Secure Entity's public key 1328—which preferably is communicated (Step 1602) by the Secure Entity 1312 and received (Step 1502) by the recipient 1308 beforehand—is used to authenticate (Step 1508) the Security Certificate. Upon successful authentication, the Security Profile of a genuine device to which belongs the private key used to generate the digital signature is thereby identified to the recipient 1308. Based on the identified Security Profile, the recipient 1308 is able to gauge the risk that the private key of the genuine device was fraudulently used to digitally sign the message of the EC 1322. Furthermore, because the public key is bound with the Security Profile in the Security Certificate during the manufacture of the device in the secure environment, the recipient 1308 is able to rely upon the Security Certificate corresponding, in fact, to the genuine device.

Benefits of the third preferred embodiment of the first aspect of the present invention include the elimination of the requirement that the recipient 1308 transmit a suspect device public key to the Secure Entity 1312, and the elimination of the requirement that the Secure Entity 1312 transmit the a Security Profile directly to the recipient 1308. Of course, a disadvantage to this preferred method is that the entire system is compromised if the Secure Entity's private key used to digitally sign Security Certificates is compromised.

4. Variations of the Preferred Embodiments

In the first and second preferred embodiments of the first aspect of the present invention set forth above, the Security Profile of each device is indexed in the secure database to the public key of the device and is retrievable from the secure database based on the public key. In a variation of these two preferred embodiments (not shown), the Security Profile and public key of each device is recorded in the secure database and are indexed to a unique device identifier, which may comprise, for example, an account number written into the device during its manufacture, a serial number manufactured within the device during its manufacture, or the like. The device identifier is exportable from the device for inclusion with each digital signature generated by the device. Upon receipt of an EC including the digital signature and device identifier, a recipient then obtains the suspect device public key by cross-referencing the device identifier with a known database or reference for public keys and Security Profiles linked therewith. In this regard, the recipient forwards the device identifier to a Secure Entity for identifying the suspect device public key and Security Profile therefor, or the recipient compares the device identifier in a reference published by the Secure Entity that includes public keys and linked Security Profiles indexed by device identifiers. The methodology is similar to that described above for the first and second preferred embodiments, the primary difference being that the recipient must contact the Secure Entity or check a reference prior to attempting to authenticate a received message. In the first and second preferred embodiments in which the Security Profile of each device is indexed to its public key, the recipient only need contact the Secure Entity or check a reference if the message first authenticates using the suspect device public key included with the message.

In a variation of the first, second, and third preferred embodiments of this aspect of the present invention, the Secure Entity receives the EC and, itself, identifies the Security Profile of the genuine device to which belongs the private key used to digitally sign the message. Furthermore, the EC in this case either may be sent directly to the Secure Entity or may be forwarded to the Secure Entity by a recipient for gauging of the risk that the private key of the genuine device was fraudulently used to digitally sign the message.

Preferably, the steps set forth above with regard to FIGS. 5-6; FIGS. 10-11; and FIGS. 15-16 are computer automated, and the entire sequence of events of each respective group of FIGS. occurs within a small time interval on the order of magnitude of minutes, if not seconds.

In view of the foregoing detailed description of preferred embodiments of the first aspect of the present invention, it will be apparent to those having ordinary skill in the art that by: creating the respective public-private key pair of each device within the device itself before release from the secure environment of its manufacture; exporting only the public key from the device and retaining the private key within the device against the possibility of export; and securely linking the exported public key of the device with other information within the secure environment of manufacture of the device, each device is thereby rendered unique with respect to all of the other devices. Moreover, because of the secure environment in which the devices are manufactured and the secure linking of the public key with the other information, the uniqueness of the devices may be relied upon by third-parties—such as future Account Authorities—even though such third-parties may not have had any control or involvement in the actual manufacturing of the devices. The secure binding of the public key with each device within the environment of the manufacture of the device provides the required trust for relying upon the uniqueness of the devices, as each device may be authenticated based upon the private key retained therein, and only therein. Accordingly, the present invention further includes this manufacturing process for devices.

A benefit this manufacturing process is that it provides the ability to transport devices from their place of manufacture to additional processing facilities where the devices are initialized with regard to particular Account Authorities without high levels of security otherwise conventionally utilized. For example, armored cars and guards are routinely used to protect the delivery of credit card and IC card supplies to a processing facility for initialization for a particular financial institution. Indeed, as a result of the manufacturing process of the present invention, a facility at which additional processing takes place on behalf of a particular Account Authority now may authenticate each device prior to its initialization and independent of the transport of the device from the manufacturing facility. Moreover, because of the ability to authenticate a particular device immediately following its manufacture and thereafter, the system of using of a single device for making transactions on multiple accounts maintained with different Account Authorities is now enabled with higher levels of trust not otherwise found in the conventional art.

C. Establishing Initial PuK-Linked Account Database

The second aspect of the present invention includes establishing an initial PuK-linked account database and is based partially upon the first aspect of the present invention. In this regard, the establishment of a database for a plurality of manufactured devices as described above—wherein each device has a unique record including its public key and other information regarding the device—represents a database that may be built upon in creating an initial PuK-linked account database for a plurality of customers and/or consumers (generically referred to herein as "customers") of a third-party.

Figure 17:
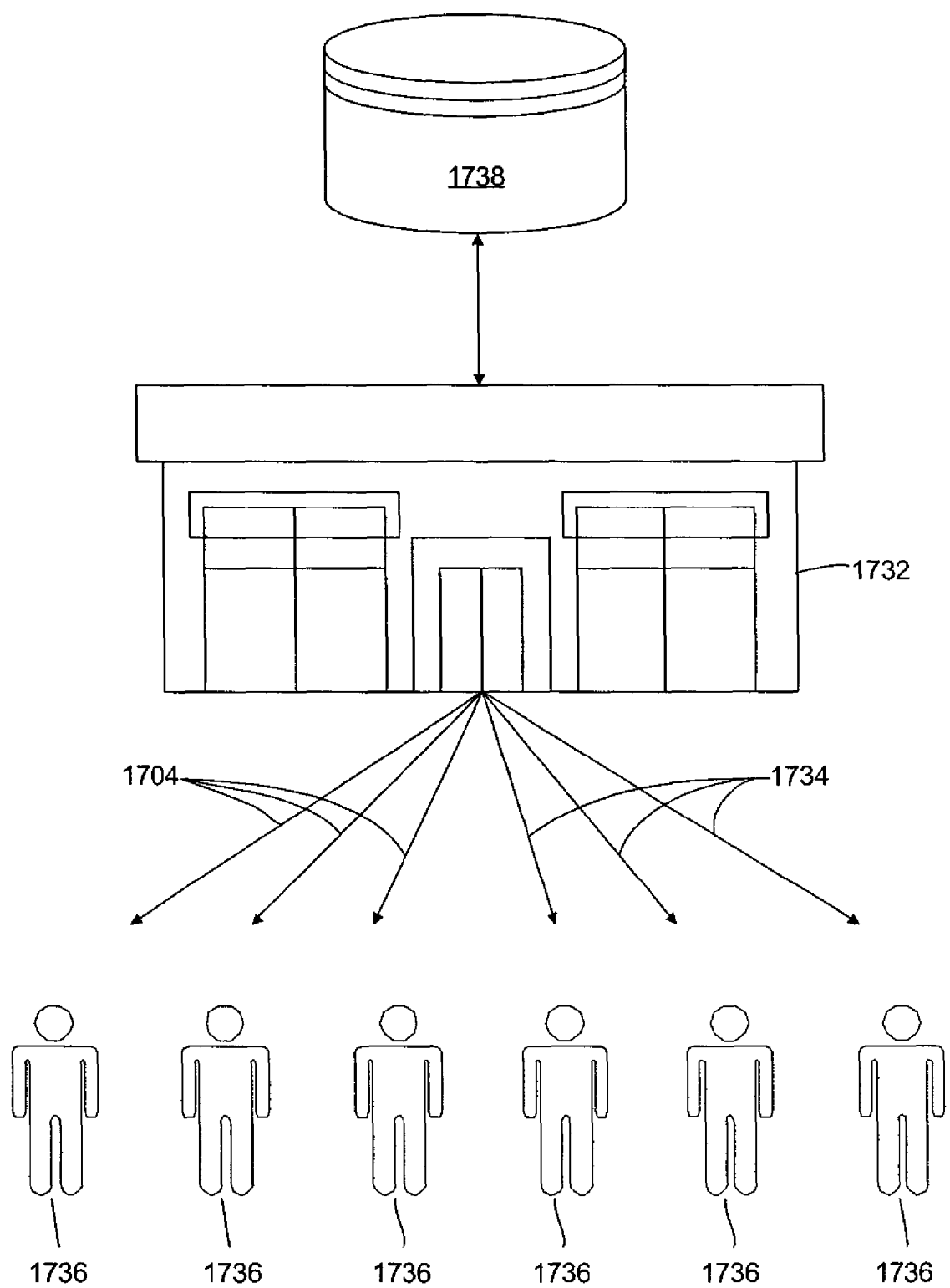
FIG. 17 illustrates a system related to the second aspect of the present invention in which a third-party provides goods and/or services to customers and maintains a customer account database in conjunction therewith.

Specifically, with reference to FIG. 17, a third-party 1732 provides services and/or goods 1734 to each of a plurality of customers 1736 and, in connection therewith, maintains a database 1738 of account records for the customers 1736. For example, and without limitation, the third-party 1732 (herein referred to as an "Account Authority") may be a financial institution including a bank, finance company, or insurance company; merchant; Internet service provider; telecommunication provider; medical provider; government entity; or utility company. The account database 1738 typically is established one account at a time on a per customer basis as each customer 1736 engages the Account Authority 1732, and each database record for the customer 1736 typically is indexed within the database 1738 by a unique account number.

Figure 18:
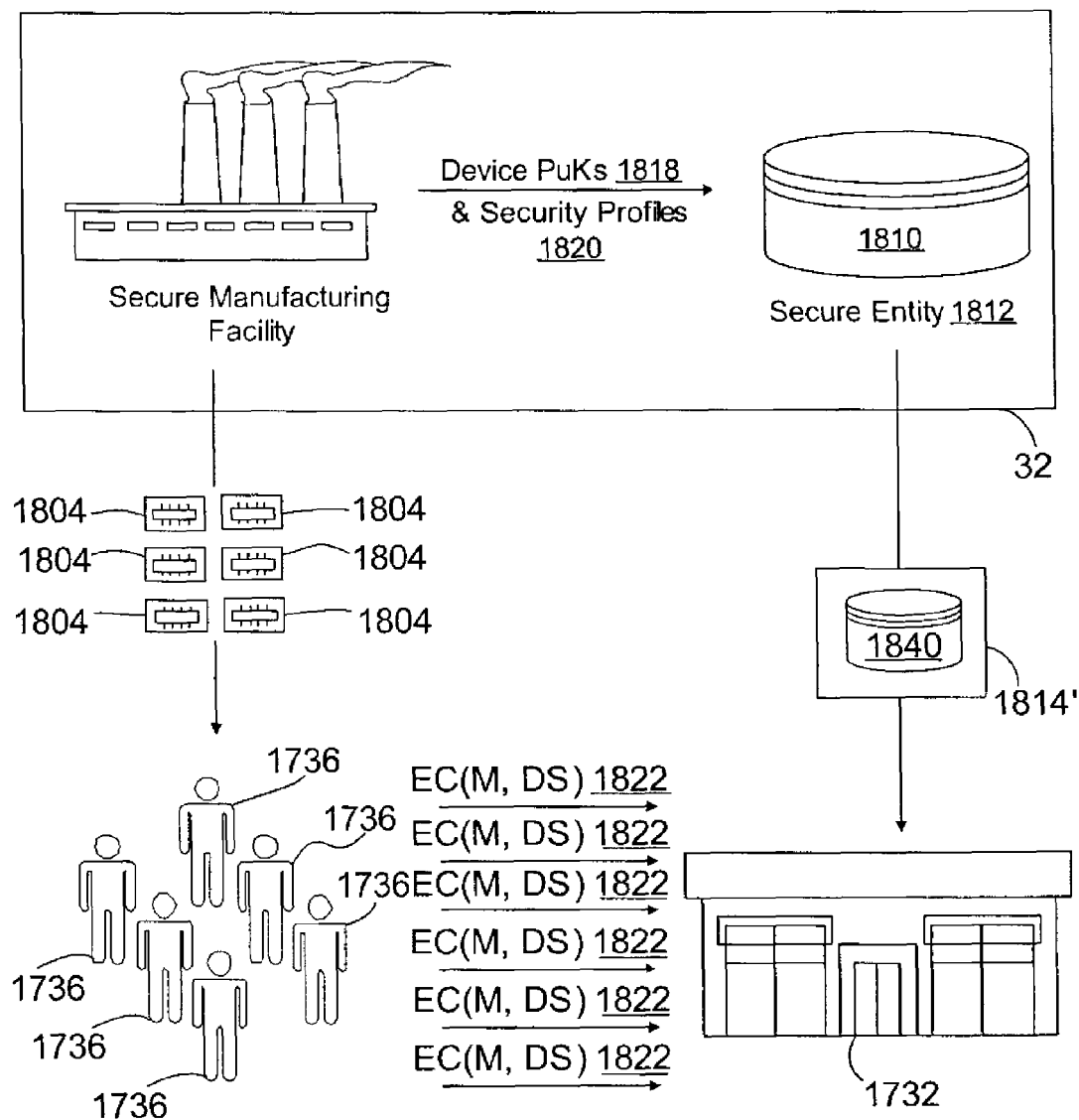
FIG. 18 illustrates a preferred system in which a preferred method of the second aspect of the present invention is practiced.

In accordance with the second aspect of the present invention, and with reference to FIG. 18, a predetermined number of devices 1804 are manufactured in a secure environment 1814 in accordance with the first and second preferred embodiments of the first aspect of the present invention. In accordance with the second aspect of the present invention, the devices 1804 are earmarked for the Account Authority 1732, and database records 1840 in the secure database 1810 corresponding to the devices 1804 are communicated in a secure manner 1814=40=0 to the Account Authority 1732. The earmarked devices 1804 also are distributed to the customers 1736 of the Account Authority 1732.

Upon receipt of the PuK-linked database records 18440 by the Account Authority 1732, the database records 1840 represent an initial PuK-linked account database for the Account Authority 1732. The database records 1840 preferably include the public keys 1818 of the devices 1804 and the Security Profiles 1820 of the devices 1804 as described above with respect to the first and second preferred embodiments of the first aspect of the present invention. Moreover, the database records 1840 are preferably digitally signed by the Secure Entity 1812 for security in transit from the Secure Entity 1812 to the Account Authority 1732.

An example of the preferred database records 1840 are shown in FIG. 19. As set forth in the background section above, the Security Profile includes security features of the device—specifications for which are set forth for example in FIPS PUBS 140-1 and 140-2—as well as a manufacturing history of the device as specified, for example, in Smart Card Protection Profile. Moreover, in accordance with the preferred embodiments of the present invention the security features of the Security Profile include security characteristics and authentication capabilities of the device.

Once received, the Account Authority 1732 updates the PuK-linked account database records with specific information of the customers 1736 and their accounts. However, before such an association is made between a particular customer's account and a record of the initial PuK-linked account database, the particular customer 1736 preferably is authenticated to the Account Authority 1732 with respect to that customer's account. Accordingly, entity authentication techniques are used for authenticating the customer 1736 with respect to a record in the account database. Such authentication techniques may include questioning the particular customer 1736 about specific-account associated information in the record or requiring the particular customer 1736 to provide a Secret or other entity information, such as the maiden name of the mother of the customer (Factor B Entity Authentication).

Additionally, the Account Authority 1732 preferably verifies that a customer 1736 has received the correct device 1804. The device 1804 received by a customer 1736 is identified by having the customer 1736 digitally sign a message with the private key of the device 1804 and transmit the message and digital signature in a respective EC 1822 that is sent to the Account Authority 1732 for Factor A Entity Authentication. The Account Authority 1732 authenticates the message using a public key of the device 1804 that preferably is included in the EC 1822. Furthermore, upon a successful authentication of the message, the Account Authority 1732 identifies the record in the initial PuK-linked account database corresponding to the public key successfully authenticating the message for association with the account of the customer 1736.

If additional security is required, each device may include an initialization PIN that first must be entered by a customer before functioning. Upon the correct entry of the initialization PIN, each customer preferably then enters a personalization PIN that must be entered, for example, each time the device is used thereafter. The initialization PINs preferably are distributed to the customers separately from the devices. Moreover, the use of an initialization PIN and a personalization Pin in each device preferably is included in each database record as part of the authentication capabilities of the respective device.

A number of alternative techniques for verifying that the customers received the correct cards also could be used. For example, each customer could be required to call a particular number from his or her home and input over the telephone a number printed on each respective device in order to effect association of the device with the customer's account.

Once sufficient authentication is completed, the customer-specific information may be associated with the PuK-linked account database record in various ways. First, the initial PuK-linked account database record may be merged with a preexisting account database of the customer maintained by the Account Authority, which contains the customer-specific information. Second, the initial PuK-linked account database may be maintained separately from but indexed by an identifier with a preexisting account database of the customer containing the customer-specific information. Third, the Account Authority simply may obtain the customer-specific information from the customer following authentication and update the PuK-linked account database record accordingly.

This second aspect of the present invention also is useful in establishing accounts for new customers of the Account Authority. In this regard, devices are distributed in the same manner as set forth in FIG. 18, but to potential customers of the Account Authority rather than to existing customers. However, in this scenario entity authentication with respect to preexisting accounts is not required, as new accounts are established by the potential customers. Nevertheless, Factor A Entity Authentication remains important in associating a customer with one of the particular PuK-linked records.

With respect to the establishment of new accounts, under an "anonymous" framework the manufactured devices are distributed to the customers, and the goods and/or services are provided to the customers without regard to any customer-specific information, i.e., the goods and/or services are provided on a per device basis as identified by the public key of the device, and are not necessarily on a per customer basis. Thus, upon successful authentication with a public key of a message digitally signed by one of the devices, the account identified by the public key is activated and nothing further is required.

On the other hand, under a "personalized" framework each new customer provides customer-specific information to the Account Authority, and the Account Authority updates the initial PuK-linked account database by associating the customer-specific information with the respective PuK-linked database record of that customer's device (as identified by the public key of that device). Again, the Account Authority in this situation does not need to authenticate the new customer with respect to any existing account.

An example of a new business method of establishing a initial PuK-linked account database in accordance with the second aspect of the present invention comprises establishing new customers for an Internet service provider (ISP). First, a number of manufactured devices such as dongles, for instance, are manufactured in accordance with the first aspect of the present invention and mailed to a plurality of prospective customers of the ISP. Each dongle is packaged with a CD-ROM including software for setting up and connecting to the ISP and the Internet from a potential customer's computer. The dongle and CD-ROM also may be distributed as an insert in a magazine, for example. Upon receipt, the prospective customer installs the software in his or her computer and attaches the dongle to an appropriate port of the computer. Then, when the computer connects with the ISP, an EC is communicated to the ISP that includes a digital signature generated utilizing a private key retained within the dongle as well as a public key retained within and exported from the dongle. Upon receipt of the EC, the ISP authenticates the message using the public key included with the message. Upon authentication, then the ISP compares for a match the public key received with the linked public keys in the initial PuK-linked account database and activates the account having the matching public key. The account record may include a credit of 100 hours of free internet surfing, for example, as a promotional introduction to the ISP. In this example, no customer-specific information is required and the account is setup under an anonymous framework.

Alternatively, the ISP may require customer-specific information in order to activate the new account, including billing and credit card information from the customer. Upon receipt thereof, the identified record in the PuK-linked account database is updated with this customer-specific information and the account is activated. A resulting updated PuK-linked account database 2040 of the ISP after activation of several accounts might resemble, for instance, that of FIG. 20.

Upon activation of the account, the account preferably is assigned a unique account identifier that is included with each message sent to the ISP for identifying the account to which the message relates. A User ID or account number may serve as the account identifier. The public key is recorded in the PuK-linked account database whereby, upon identifying the appropriate account record with the account identifier, the digitally signed message is authenticated with the associated public key. Alternatively, the public key itself may serves as the account identifier. In either case, access is granted to its network and the Internet by the ISP upon a successful authentication of a digitally signed message (Factor A Entity Authentication).

Another example of a new business method utilizing the aforementioned establishment of a initial PuK-linked account database of this second aspect of the present invention comprises setting up existing customers of a financial institution with IC cards to be used as check cards. In this example, a number of IC cards are manufactured in accordance with the first aspect of the present invention and mailed to a plurality of existing customers of the financial institution who have requested the IC cards. Each manufactured IC card includes a respective initialization PIN that must be sent to the financial institution for activation of the IC card for use on the account. The respective initialization PIN is mailed to each customer separately from the corresponding IC card. Furthermore, each IC card includes recorded therein the account number of the customer to which it is mailed.

The database records of the IC cards recorded in the secure database are transmitted to the financial institution in a secure manner. Upon receipt, the database records represent the initial PuK-linked account database which then are updated and/or merged with the records of the customers in a preexisting account database maintained by the financial institution, the resulting database being a PuK-linked account database. A resulting PuK-linked account database 2140 might resemble, for instance, that of FIG. 21.

Upon separate receipt by each customer of the IC card and initialization PIN, the customer first uses the IC card at an ATM machine of the financial institution by entering the initialization PIN and then communicating to the financial institution an EC including the PIN from the customer and account number from the IC Card digitally signed with the IC card. Upon receipt of the EC, the financial institution authenticates the sender of the EC by retrieving the authorized PIN from the identified account number in the EC and comparing the authorized PIN with the PIN transmitted in the EC. The financial institution similarly authenticates the message with the public key associated with the identified account number. Upon successful verification of the PIN and successful message authentication, the financial institution activates the IC card within the record for use as a check card on the account. Furthermore, after activation of the IC card, messages in ECs representing transactions on the account need only be digitally signed with the IC card and include the account number of the customer. Such ECs need not include any personal information of the customer, such as the customer's name, billing address, a PIN, etc.

D. Establishing Multiple Third-Party Accounts with PuK-Linked Database Record

Figure 22:
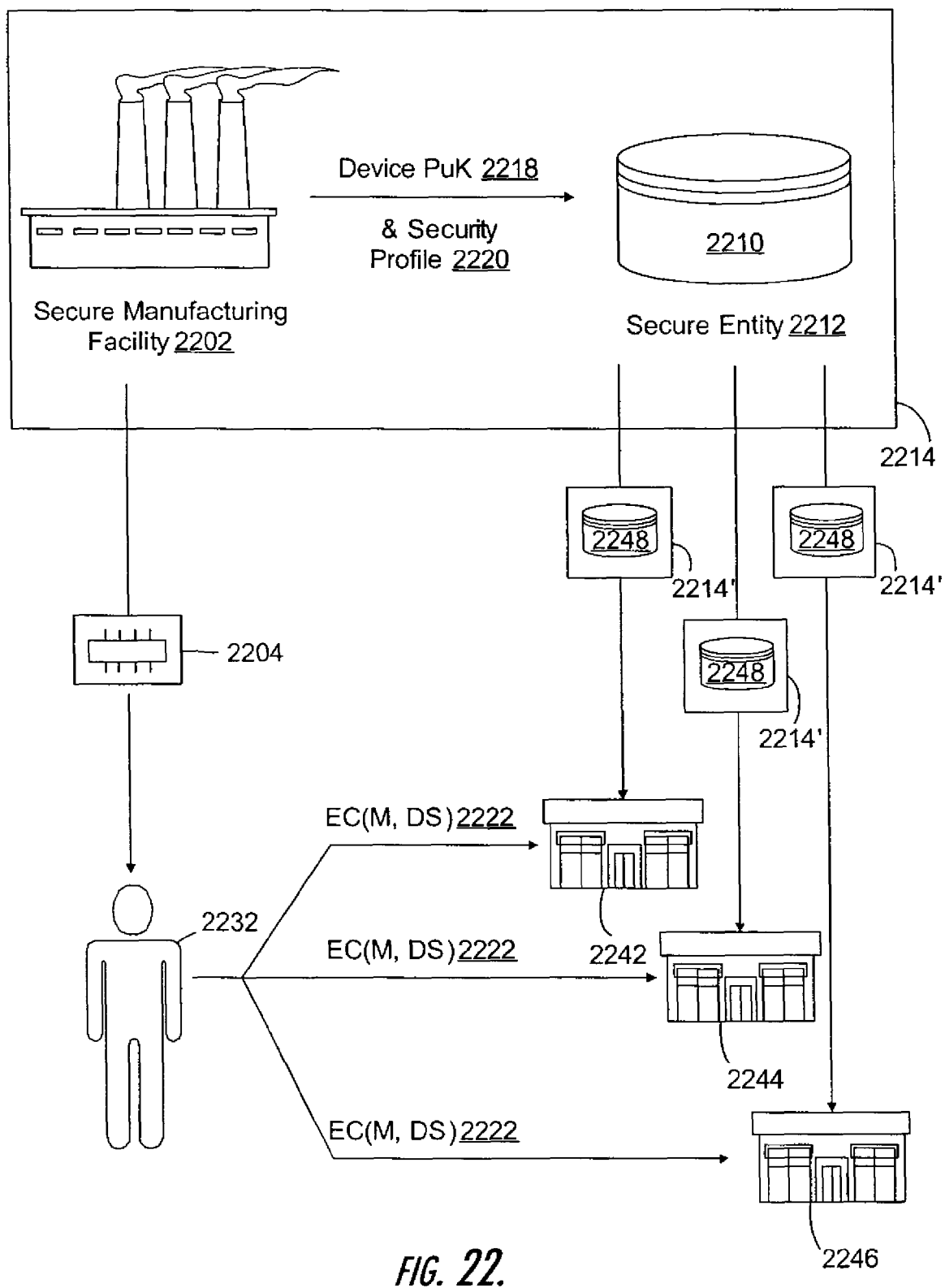
FIG. 22 illustrates a preferred system in which a preferred method of the third aspect of the present invention is practiced.

The third aspect of the present invention includes establishing multiple third-party accounts with a PuK-linked database record and is based partially upon the first and second preferred embodiments of the first aspect of the present invention. In this regard, and with reference to FIG. 22, a device 2204 that generates digital signatures is manufactured within a secure environment 2214. Before the device 2204 is released from the secure environment 2214, the public key 2218 of the device 2204 plus some other information is recorded as a database record 2275 in a secure database 2210; preferably, the other information includes the Security Profile 2220 of the device 2204, as described above with respect to the first aspect of the present invention. The device 2204 then is distributed to a customer 2232 and the customer 2232 establishes a respective account with each one of a plurality of desired Account Authorities 2242, 2244, 2246.

In accordance with the third aspect of the present invention, each PuK-linked account of the customer 2232 is established based upon, at least in part, a communication of the PuK-linked database record 2248 from the secure database 2210 to each of the desired Account Authorities 2242, 2244, 2246. As set forth above, the PuK-linked database record 2248 preferably includes the public key 2218 and Security Profile 2220 of the device 2204 linked thereto by the Secured Entity 2212. Furthermore, the database record 2248 is communicated in a secure manner 2214' so as to preserve the integrity of the database record 2248.

When received by a respective Account Authority 2242, 2244, 2246, the public key 2218 linked to the Security Profile 2220 of the database record 2248 represents an initial PuK-linked account database record of the customer 2232 with the respective Account Authority and, if the customer 2232 is an existing customer of the respective Account Authority, then the initial PuK-linked account database record 2248 preferably is associated with the existing account database record of the customer 2232. However, the association of the PuK-linked account database record 2248 received from the Secure Entity 2212 with the existing account database record of the customer 2232 preferably is performed only after the receipt of the correct device 2204 by the customer 2232 has been verified through one or more of the aforementioned authentication techniques with regard to the second aspect of the present invention.

If the initial PuK-linked account database record represents the only account database record for the customer 2232 (i.e., if the customer is new to an Account Authority), then under a personalized framework the customer 2232 supplies customer-specific information to the Account Authority for recording with the initial PuK-linked account database record of the customer 2232. Under an anonymous framework, no customer-specific information need be provided.

Also under the personalized framework, the device 2204 is activated for use on each account when the customer 2232 sends a message digitally signed using the device 2204 in a respective EC 2222 to each Account Authority 2242, 2244, 2246, and when the digitally signed message is authenticated by the respective Account Authority 2242, 2244, 2246 using the public key associated with the respective PuK-linked account database record 2248.

Under the anonymous framework, each respective account established with an Account Authority 2242, 2244, 2246 is activated when the customer 2232 sends a message digitally signed using the device 2204 in a respective EC 2222 to each Account Authority 2242, 2244, 2246, and when the digitally signed message is authenticated by the respective Account Authority 2242, 2244, 2246 using the public key associated with the respective PuK-linked account database record 2248.

E. Insuring Transactions Based on Identified Security Characteristics of a Device that Generates Digital Signatures The fourth aspect of the present invention includes the insuring of a transaction represented by an EC that is digitally signed. Furthermore, the insurance preferably is provided on a per transaction basis. For instance, a recipient represented for example by a financial institution that receives an EC instructing it to make a wire transfer of $250,000 out of an account of one of its customers, and that is authenticated, nevertheless may desire to insure that the EC is not fraudulent.

Reliable knowledge of security features of the device to which belongs the private key used to generate the digital signature of the EC conventionally has been lacking when such a transaction is insured. An entity insuring the transaction ("Insuring Entity"), which gauges the risk that the EC was fraudulently sent and which calculates the premium to be charged based on such risk, therefore would be forced to err on the high side in insuring such transaction.

Now, in view of the first aspect of the present invention, security features of the device to which belongs the private key used to generate the digital signature of the EC can be reliably identified. Moreover, the manufacturing history of the device also can be reliably identified at the same time. Accordingly, the risk that a particular digitally signed EC has been fraudulently sent can be gauged with greater accuracy, and it is believed that the premium charged for such insurance may be lowered based on this greater knowledge and the consequent reduced risk of the transaction. Additionally, this greater knowledge gives rise to a more targeted premium structure for insuring a plurality of transactions, wherein different rates are based, at least in part, on the varying identified security features of devices generating digital signatures.

Figure 23:
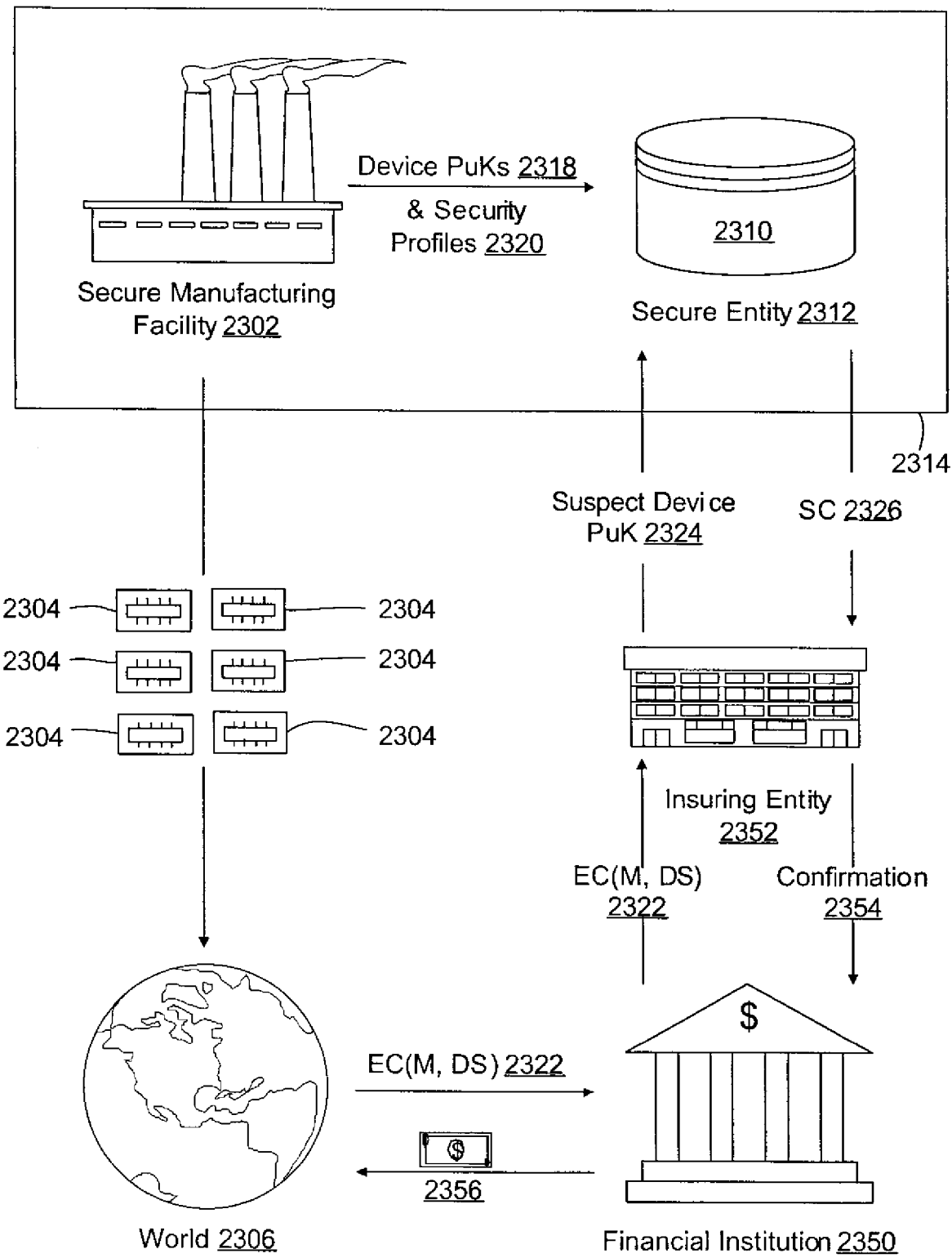
FIG. 23 illustrates a preferred system in which a first preferred method of the fourth aspect of the present invention is practiced.
Figure 24:
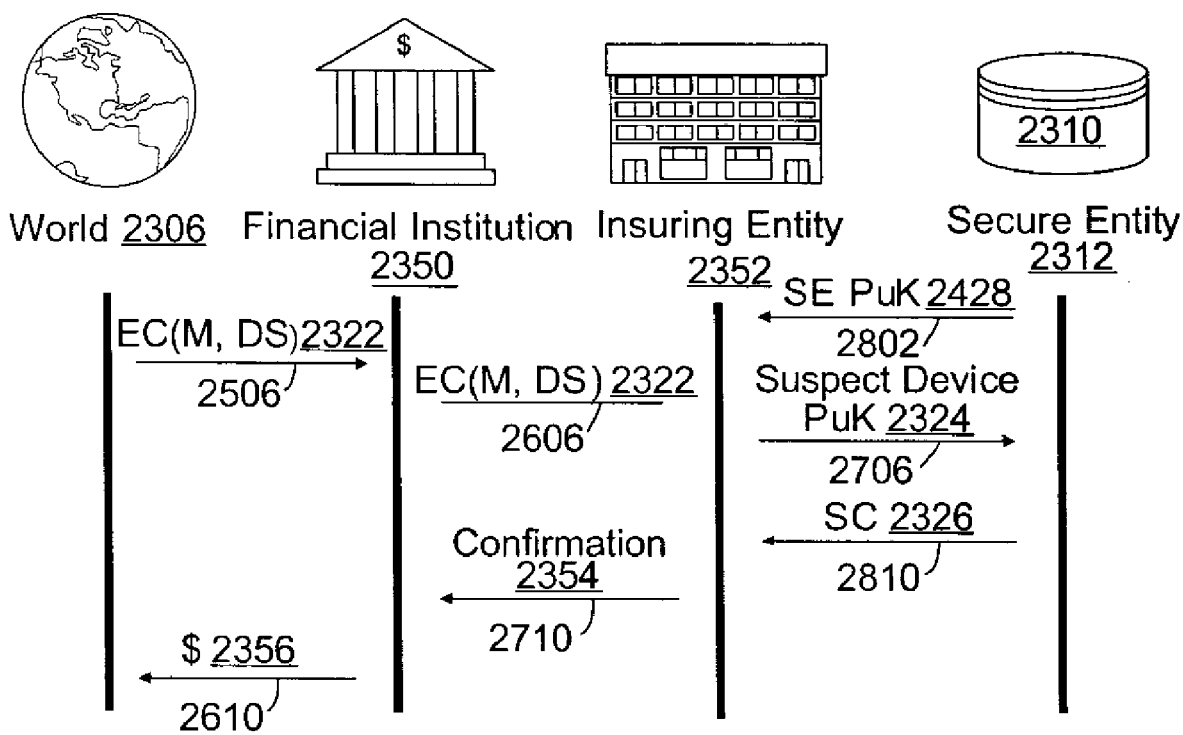
FIG. 24 illustrates a communication sequence in accordance with the first preferred method of the fourth aspect of the present invention.
Figure 29:
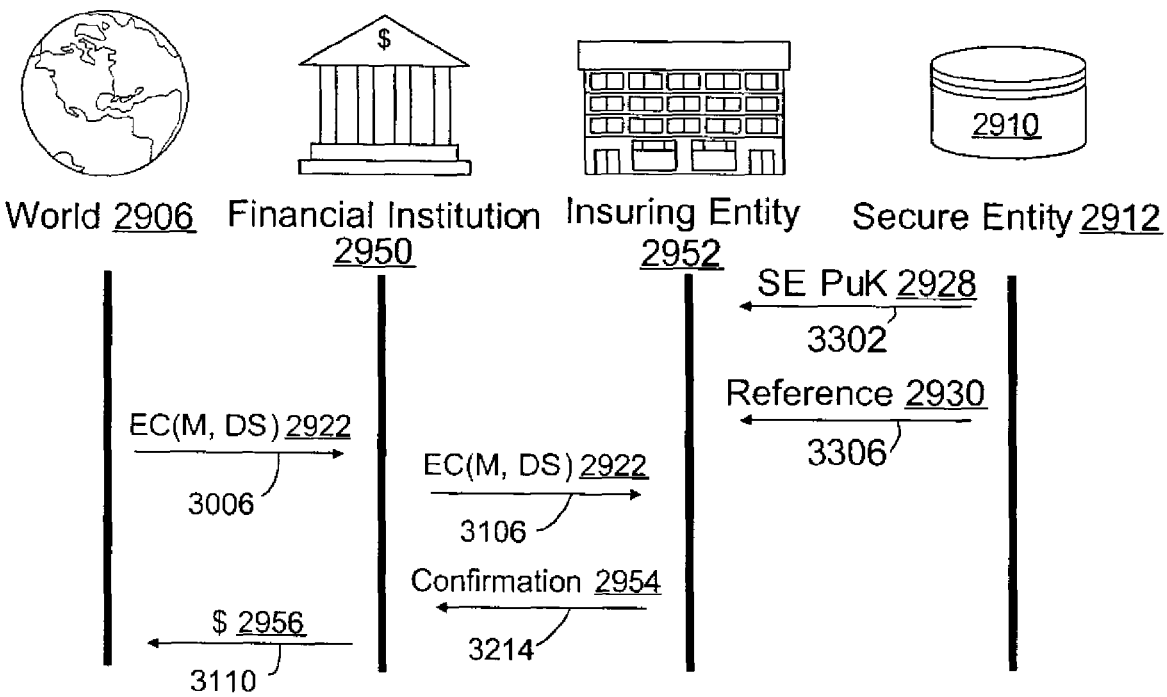
FIG. 29 illustrates a communication sequence in accordance with a second preferred method of the fourth aspect of the present invention.
Figure 34:
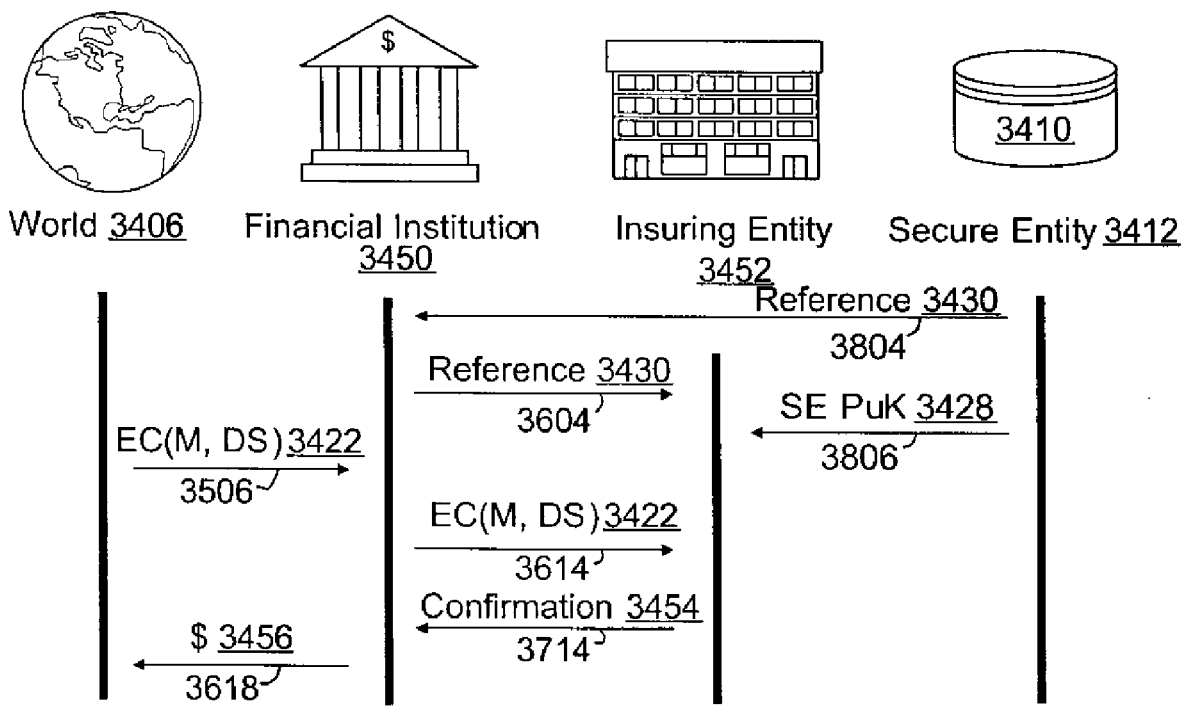
FIG. 34 illustrates a communication sequence in accordance with a third preferred method of the fourth aspect of the present invention.
Figure 39:
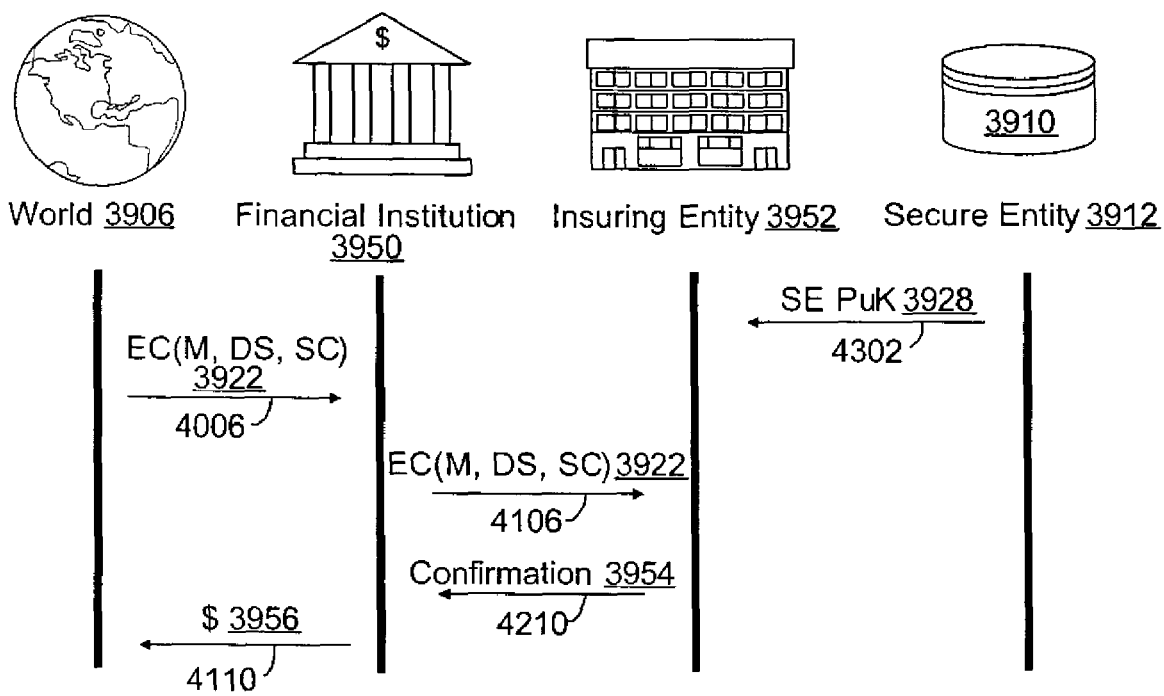
FIG. 39 illustrates a communication sequence in accordance with a fourth preferred method of the fourth aspect of the present invention.

A system in which preferred embodiments of this fourth aspect of the present invention are implemented is illustrated in FIG. 23, wherein a plurality of devices 2304 are manufactured at a secure manufacturing facility 2302 in a secure environment 2314 in accordance with the first aspect of the present invention. Each of the devices 2304 includes a private key retained therein for which a public key 2318 corresponding thereto is linked with a Security Profile 2320 thereof in a secure database 2310 maintained by a Secure Entity 2312. After manufacture, the devices 2304 are released from the secure environment 2314 into the world 2306, with one of the devices ultimately reaching a customer of a Financial Institution 2350 and becoming associated with an account of the customer maintained at the Financial Institution 2350.

In accordance with a first preferred embodiment of this fourth aspect of the present invention, and as illustrated in FIGS. 24-28, a digital signature is generated (Step 2502) for a message including a request for a wire transfer of $250,000 from the account of the customer maintained at the financial institution 2350. The digital signature is combined (Step 2504) with the message for the wire transfer to form an EC 2322 that is then sent (Step 2506) from somewhere in the world 2306 to the Financial Institution 2350. The EC 2322 preferably includes the number for the account from which the transfer is to be made.

Upon receipt (Step 2602) of the EC 2322, the Financial Institution 2350 authenticates (Step 2604) the message of the EC 2322 using the public key associated with the account identified in the EC 2322, and then determines whether to honor the instruction contained in the EC 2322 and, if so, whether to insure the transaction represented by the EC 2322. The determination of whether to honor the instruction preferably is based, at least in part, upon the security features and manufacturing history identified in accordance with the first aspect of the present invention.

Upon an affirmative determination to insure the transaction represented by the EC 2322, the Financial Institution 2350 forwards (Step 2606) the EC 2322 to the Insuring Entity 2352 together with the public key. Upon receipt (Step 2702), the Insuring Entity 2352 authenticates (Step 2704) the message of the EC 2322 with the public key to confirm authentication of the message and, upon successful authentication, the Insuring Entity 2352 sends (Step 2706) the public key to the Secure Entity 2312.

Upon receipt (Step 2804) of the public key, the Secure Entity 2312 compares (Step 2806) for a match the public key against the linked public keys maintained in the secure database 2310. If a match is found, then the Security Profile linked with the matching public key is retrieved (Step 2808) and, for the purpose of maintaining the integrity of the information during transit, digitally signed (also in Step 2808) by the Secure Entity 2312 to form a Security Certificate 2326. The Security Certificate 2326 then is sent (Step 2810) to the Insuring Entity 2352. Preferably, the matching public key is included in the Security Certificate 2326 for confirmation by the Insuring Entity 2352 of the public key to which the Security Certificate 2326 pertains. Upon receipt (Step 2708) of the Security Certificate 2326 by the Insuring Entity 2352, the authenticity of the Security Certificate 2326 is confirmed (also Step 2708) using a public key 2428 (SE PuK) of the Secure Entity 2321, which preferably is communicated (Step 2802) to the Insuring Entity 2352 beforehand. Subsequently, the Security Profile contained in the authenticated Security Certificate 2326 is identified by the Insuring Entity 2352 as the Security Profile of the manufactured device to which belongs the private key used in digitally signing the message of the EC 2322.

Based on the identified Security Profile, the Insuring Entity 2352 is able to gauge a risk that the private key of the manufactured device was fraudulently used in digitally signing the message of the EC 2322 and, in turn, the Insuring Entity 2352 is able to classify the transaction thereof for a corresponding premium rate. The corresponding premium rate for the particular classification of the transaction then is applied to the monetary value of the transaction for which insurance is sought (i.e., to the $250,000 in the present wire transfer example), and the actual premium to be charged for the particular transaction in question is calculated. Confirmation 2354 of insurance coverage then is sent (Step 2710) by the Insuring Entity 2352 to the Financial Institution 2350. The coverage confirmation 2354 preferably includes the identified Security Profile, applicable premium rate, and calculated premium to be charged to the Financial Institution 2350 for the particular transaction represented by the EC 2322. The coverage confirmation 2354 also is preferably digitally signed by the Insuring Entity 2352 to preserve the integrity of the coverage confirmation 2354 during transit. Upon receipt and authentication (Step 2608) of the coverage confirmation 2354, the Financial Institution 2350 makes (Step 2610) the requested wire transfer 2356.

As in the first preferred embodiment, in the second preferred embodiment of the fourth aspect of the present invention, a plurality of devices are manufactured at a secure manufacturing facility in a secure environment. Each of the devices includes a private key retained therein for which a public key corresponding thereto is linked with a Security Profile thereof in a secure database maintained by a Secure Entity. After manufacture, the devices are released from the secure environment into the world, with one of the devices ultimately reaching a customer of a Financial Institution and becoming associated with an account of the customer maintained at the Financial Institution.

Unlike the first preferred embodiment, and as illustrated in FIGS. 29-33, the second preferred embodiment differs from the first preferred embodiment of the fourth aspect of the present invention in that the Secure Entity 2912 creates and communicates a reference 2930 containing public keys and corresponding Security Profiles of manufactured devices to the Insuring Entity 2952, rather than sending a Security Certificate for a particular one of the manufactured devices as in the first preferred embodiment of FIGS. 24-28. Nor does the Insuring Entity 2952 send a public key to the Secure Entity 2912 for identifying a Security Profile from a secure database 2910.

With particular regard to the sequence of events, the Secure Entity 2912 generates (Step 3304) the reference 2930 containing public keys and linked security features for all of the devices associated with the accounts of the Financial Institution 2950, and then forwards (Step 3306) the reference 2930 to the Insuring Entity 2952. The information regarding which devices are associated with the accounts of the Financial Institution 2950 is known by the Secure Entity 2912 in the second and third aspects of the present invention and, alternatively, is identified to the Secure Entity 2912 by either the Financial Institution 2950 or by the Insuring Entity 2952. The reference 2930 preferably is compiled in accordance with the first aspect of the present invention as illustrated in FIGS. 7-11, and preferably is digitally signed by the Secure Entity 2912 to preserve the integrity of the information therein during transit and storage. A public key 2928 of the Secure Entity 2912 is preferably communicated (Step 3302) in a secure manner to the Insuring Entity 2952 beforehand. Upon receipt thereof (Steps 3202 and 3204), the Insuring Entity 2952 authenticates (Step 3206) the reference 2930 with the public key 2928 of the Secure Entity 2912.

Thereafter, a digital signature is originated (Step 3002) for and combined (Step 3004) with a message that includes a wire transfer request for a particular account number maintained at the Financial Institution 2950 to form an EC 2922. The EC 2922 then is sent (Step 3006) to the Financial Institution 2950. Upon receipt (Step 3102) of the EC 2922, the Financial Institution 2950 authenticates (Step 3104) the message of the EC 2922 using the public key associated with the account identified in the EC 2922, and then determines whether to honor the instruction contained in the EC 2922 and, if so, whether to insure the transaction represented by the EC 2922. The determination of whether to honor the instruction preferably is based, at least in part, upon the security features and manufacturing history identified in accordance with the first aspect of the present invention.

Upon an affirmative determination to insure the transaction represented by the EC 2922, the Financial Institution 2950 forwards (Step 3106) the EC 2922 to the Insuring Entity 2952 together with the public key. Upon receipt (Step 3208) of the EC 2922, the Insuring Entity 2952 authenticates (Step 3210) the message of the EC 2922 with the public key to confirm authentication of the message and, upon successful authentication, the Insuring Entity 2952 compares for a match the public key against the linked public keys in the reference 2930 to identify (Step 3212) a matching public key and the Security Profile linked therewith. The Security Profile thereby identified represents the Security Profile of the manufactured device to which belongs the private key used in digitally signing the message of the EC 2922.

Based on the identified Security Profile, the Insuring Entity 2952 is able to gauge a risk that the private key of the manufactured device was fraudulently used in digitally signing the message of the EC 2922 and, in turn, the Insuring Entity 2952 is able to classify the transaction thereof for a corresponding premium rate. The corresponding premium rate for the particular classification of the transaction then is applied to the monetary value of the transaction for which insurance is sought (i.e., to the $250,000 in the present wire transfer example), and the actual premium to be charged for the particular transaction in question is calculated. Confirmation 2954 of insurance coverage is then sent (Step 3214) by the Insuring Entity 2952 to the Financial Institution 2950. The coverage confirmation 2954 preferably includes the identified Security Profile, applicable premium rate, and premium to be charged to the Financial Institution 2950 for the particular transaction of the EC 2922. The coverage confirmation 2954 also is preferably digitally signed by the Insuring Entity 2952 to preserve the integrity of the coverage confirmation 2954 during transit. Upon receipt and authentication (Step 3108) of the coverage confirmation 2954, the Financial Institution 2950 makes (Step 3110) the requested wire transfer 2956.

In a variation of this second preferred method of the fourth aspect of the present invention, as illustrated in FIGS. 34-38, a Secure Entity 3412 communicates a reference 3430 to a Financial Institution 3450 rather than to an Insuring Entity 3452. The reference 3430 then is forwarded to the Insuring Entity 3452 by the Financial Institution 3450. Otherwise, the steps are the same as those described with reference to the second method of the fourth aspect of the present invention illustrated in FIGS. 29-33.

In particular, the Secure Entity 3412 creates (Step 3802) the reference 3430 including the public keys and linked security features for all of the devices associated with the accounts of the Financial Institution 3450, and then sends (Step 3804) the reference 3430 to the Financial Institution 3450. Upon receipt (Step 3602), the Financial Institution 3450 sends (Step 3604) the reference 3430 to the Insuring Entity 3452 and, in turn, the Secure Entity 3412 sends (Step 3806) its public key 3428 to the Insuring Entity 3452 in a reliable manner. Upon receipt of the reference 3430 (Step 3702) and the public key 3428 of the Secure Entity 3412 (Step 3704), the Insuring Entity 3452 authenticates (Step 3706) the reference 3430.

Thereafter, a digital signature is originated (Step 3502) for and combined (Step 3504) with a message regarding the wire transfer to form an EC 3422. The EC 3422 is then sent (Step 3506) to the Financial Institution 3450. Upon receipt (Step 3606) of the EC 3422, the Financial Institution 3450 authenticates (Step 3608) the message of the EC 3422 using the public key associated with the account identified in the EC 3422 from which the transfer is to be made, and then determines whether to honor the instruction contained in the EC 3422 and, if so, whether to insure the transaction represented by the EC 3422. The determination of whether to honor the instruction preferably is based, at least in part, upon the security features and manufacturing history identified in accordance with the first aspect of the present invention.

Upon an affirmative determination to insure the transaction represented by the EC 3422, the Financial Institution 3450 forwards (Step 3610) the EC 3422 to the Insuring Entity 3452 together with the public key. Upon receipt (Step 3708) of the EC 3422, the Insuring Entity 3452 authenticates (Step 3710) the message of the EC 3422 with the public key to confirm authentication of the message and, upon successful authentication, the Insuring Entity 3452 compares for a match the public key against the linked public keys in the reference 3430 to identify (Step 3712) a matching public key and the Security Profile linked therewith. The Security Profile thereby identified represents the Security Profile of the manufactured device to which belongs the private key used in digitally signing the message of the EC 3422.

Based on the identified Security Profile, the Insuring Entity 3452 is able to gauge a risk that the private key of the manufactured device was fraudulently used in digitally signing the message of the EC 3422 and, in turn, the Insuring Entity 3452 is able to classify the transaction thereof for a corresponding premium rate. The corresponding premium rate for the classification of the transaction then is applied to the monetary value of the transaction for which insurance is sought (i.e., to the $250,000 in the present wire transfer example), and the actual premium to be charged for the particular transaction at question is calculated. Confirmation 3454 of insurance coverage then is sent (Step 3714) by the Insuring Entity 3452 to the Financial Institution 3450. The coverage confirmation 3454 preferably includes the identified Security Profile, applicable premium rate, and premium to be charged to the Financial Institution 3450 for the particular transaction of the EC 3422. The coverage confirmation 3454 also is preferably digitally signed by the Insuring Entity 3452 to preserve the integrity of the coverage confirmation 3454 during transit. Upon receipt and authentication (Step 3612) of the coverage confirmation 3454, the Financial Institution 3450 makes (Step 3614) the requested wire transfer 3456.

In a third preferred method of the fourth aspect of the present invention, a Security Certificate is incorporated into the manufactured device itself prior to the release of the device from the secure environment in accordance with the third preferred embodiment of the first aspect of the present invention. Accordingly, as illustrated in FIGS. 39-43, when a suspect device originates (Step 4002) a digital signature somewhere in the world 3906, the Security Certificate is included (Step 4004) with the digital signature and message in an EC 3922, which then is sent (Step 4006) to a Financial Institution 3950. Upon receipt (Step 4102) of the EC 3922 by the Financial Institution 3950, the public key identified in the Security Certificate is used to authenticate (Step 4104) the message. Thereafter, if insurance is desired for the transaction, the Financial Institution 3950 forwards (Step 4106) the EC 3922 to the Insuring Entity 3952. The determination of whether to honor the instruction preferably is based, at least in part, upon the security features and manufacturing history identified in the Security Certificate in accordance with the first aspect of the present invention.

Upon receipt (Step 4204), the Insuring Entity 3952 authenticates (Step 4206) the message with the public key set forth in the Security Certificate to confirm authentication of the message. The Insuring Entity 3952 also authenticates (Step 4208) the Security Certificate with the public key 3928 of the Secure Entity 3912, which preferably is communicated (Step 4302) by the Secure Entity 3912 and received (Step 4202) by the Insuring Entity 3952 beforehand. The Security Profile of the manufactured device to which properly belongs the private key used in generating the digital signature for the message of the EC 3922 thereby is identified to the Insuring Entity 3952.

Based on the identified Security Profile, the Insuring Entity 3952 is able to gauge a risk that the private key of the manufactured device was fraudulently used in digitally signing the message of the EC 3922 and, in turn, the Insuring Entity 3952 is able to classify the transaction thereof for a corresponding premium rate. The corresponding premium rate for the classification of the transaction then is applied to the monetary value of the transaction for which insurance is sought (i.e., to the $250,000 in the present wire transfer example), and the actual premium to be charged for the particular transaction at question is calculated. Confirmation 3954 of insurance coverage then is sent (Step 3714) by the Insuring Entity 3952 to the Financial Institution 3950. The coverage confirmation 3954 preferably includes the identified Security Profile, applicable premium rate, and premium to be charged to the Financial Institution 3950 for the particular transaction of the EC 3922. The coverage confirmation 3954 also is preferably digitally signed by the Insuring Entity 3952 to preserve the integrity of the coverage confirmation 3954 during transit. Upon receipt and authentication (Step 3612) of the coverage confirmation 3954, the Financial Institution 3950 makes (Step 3614) the requested wire transfer 3956.

Under any of the preferred methods of the fourth aspect of the present invention, the actual billing of the premium by an insuring entity to a Financial Institution preferably is performed on a regularly scheduled period, such as monthly. Furthermore, the premium rates for each transaction classification preferably are determined in accordance with a prearranged insurance contract entered into between the Financial Institution and Insuring Entity. In this regard, the greater the security level met by a device at the time of the transaction, the lower the premium rate should be. Furthermore, the coverage confirmations of all insured transactions for a time period received by the Financial Institution readily may be utilized by the Financial Institution to keep a running tab on the amount of the premium to be billed by the Insuring Entity for such time period.

Figure 43:
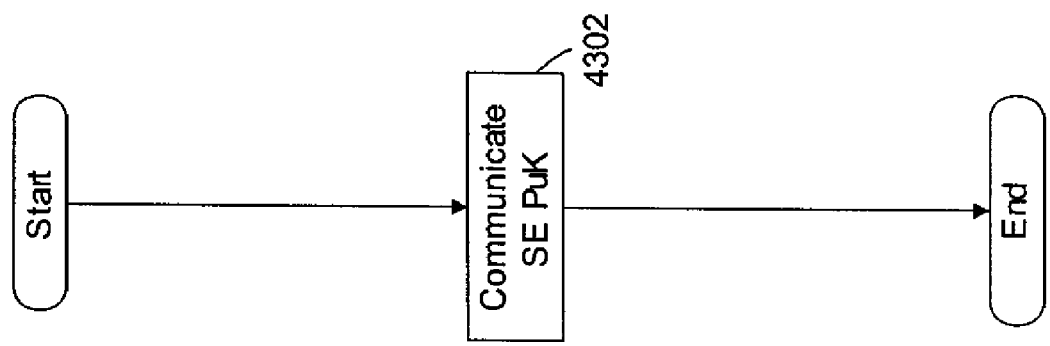
FIG. 43 illustrates a flowchart of steps performed by a Secure Entity in accordance with the fourth preferred method of the fourth aspect of the present invention.
Figure 42:
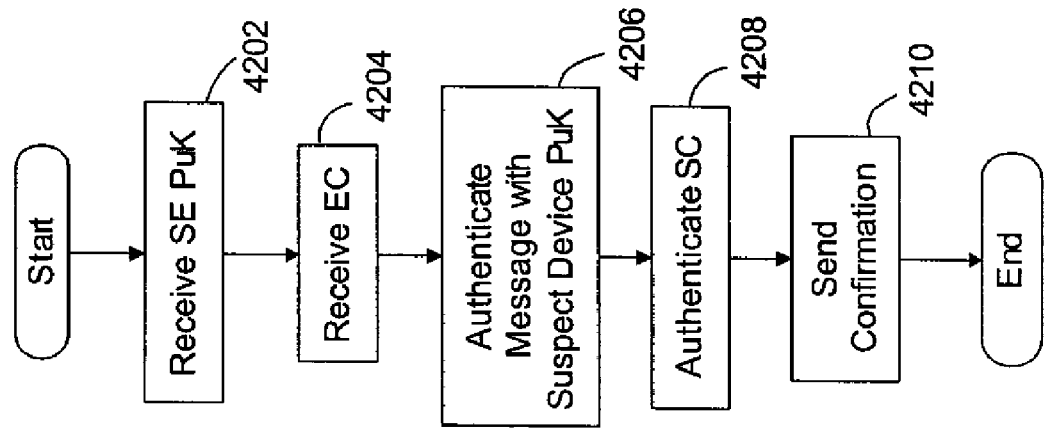
FIG. 42 illustrates a flowchart of steps performed by an Insuring Entity in accordance with the fourth preferred method of the fourth aspect of the present invention.
Figure 41:
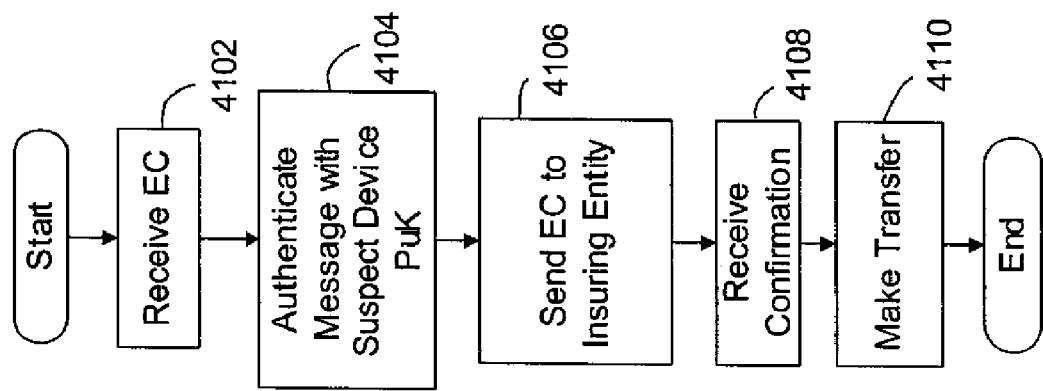
FIG. 41 illustrates a flowchart of steps performed by a Financial Institution in accordance with the fourth preferred method of the fourth aspect of the present invention.
Figure 40:
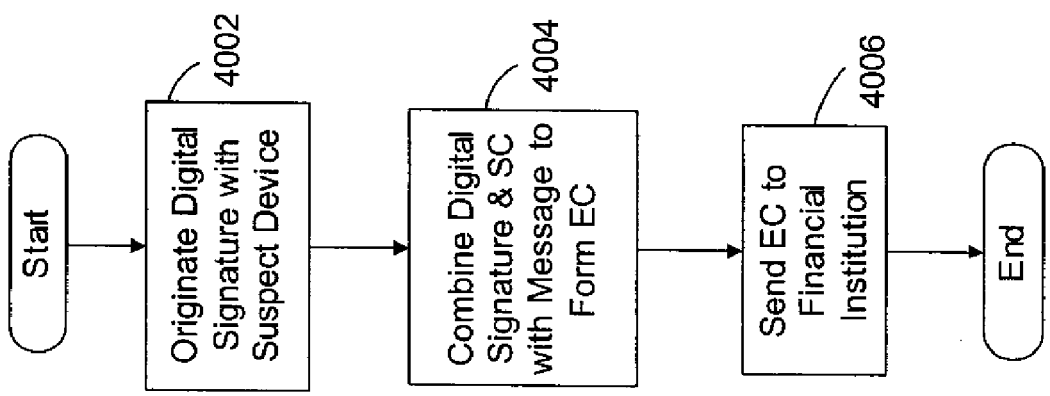
FIG. 40 illustrates a flowchart of steps performed by a suspect device originating a digital signature in an EC in accordance with the fourth preferred method of the fourth aspect of the present invention.
Figure 47:
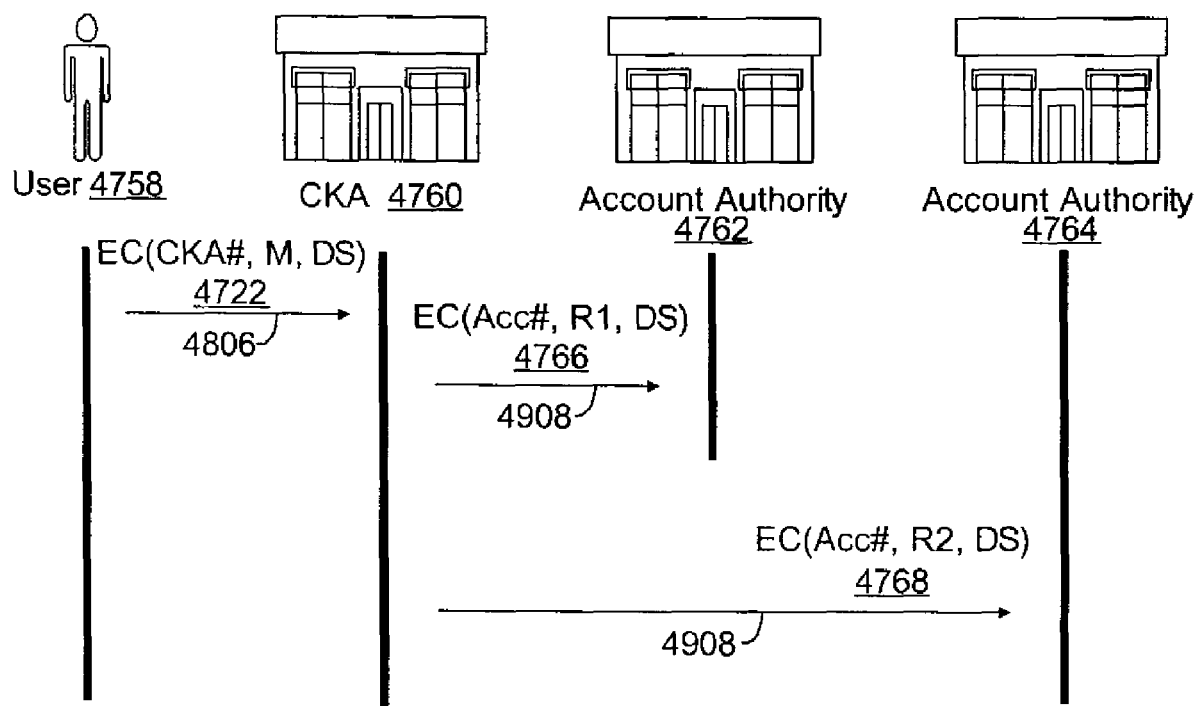
FIG. 47 illustrates a communication sequence in accordance with a preferred method of the sixth aspect of the present invention.

Preferably, the steps set forth above with regard to FIGS. 26-28; FIGS. 31-33; FIGS. 36-38; and FIGS. 41-43 are computer automated, and the entire sequence of steps for each respective group of FIGS. occurs within a small time interval on the order of magnitude of at least minutes, if not seconds.

As opposed to insurance provided on a per transaction basis, insurance also may be provided on a per device basis, possibly subject to certain limits. In this case, each EC would not be sent to the Insuring Entity as in the preferred methods in which insurance is provided on a per transaction basis. Rather, under this scenario insurance preferably is provided to an Account Authority (such as a financial institution) for transactions of the Account Authority's customers who send digitally signed messages. In accordance with the fourth aspect of the present invention, each message is digitally signed with a retained private key of a device manufactured in accordance with the first aspect of the present invention, i.e., a manufactured device for which information preferably such as the Security Profile reliably is identified. For example, a financial institution that maintains a PuK-linked account database of its customers that is established under either of the second or third aspects of the present invention, and which includes the identified Security Profiles in the PuK-linked account database records, may obtain insurance for all devices of its customers in accordance with the fourth aspect of the present invention. The insurance is provided for each device at a premium that is based, at least in part, on the identified Security Profile of the device to which the device's public key is linked. The ability reliably to know the Security Profile of each device as provided by the first aspect of the present invention permits differentiation in premiums charged as between the devices to reflect the different levels of risk that may be associated with the devices.

F. Gauging Whether EC on Account is Fraudulent Based on PuK-Linked Information of Device Generating Digital Signatures A fifth aspect of the present invention includes gauging the risk of whether a message of an EC representing a transaction on an account and digitally signed with a device is fraudulent and, based thereon, determining whether to perform the transaction. Gauging of the risk is based on identified information that was securely linked with a public key of the device at the time of its manufacture, including the security features and manufacturing history of the device, and preferably incorporates the first aspect of the present invention. Gauging of the risk also is based on additional factors, including the transactional account history of digital signatures authenticated using the public key, the environment in which the digital signature for the EC was originated, and other account or business-specific factors, such as whether the transaction is even capable of being performed on the account.

An example of an account database maintained by an Account Authority for a plurality of user accounts in accordance with the fifth aspect of the present invention is illustrated in FIG. 44. This account database corresponds with that of FIG. 21 with "Transactional History" and "PuK-to-Account Authentication" information for each account being added to the account records in conjunction with the Security Profile to form "Risk Management Information." The security features and manufacturing history of the device, as well as the public key linked therewith, are associated with the account and may be obtained by an Account Authority as set forth above with respect to the first, second, or third aspects of the present invention, or through any other process considered trustworthy by the Account Authority.

The transactional account history is recorded on the account by the Account Authority, preferably as digitally signed ECs are received. In particular, the Account Authority records the transaction details of each EC in a record of the account. The transactional history may include such factors as the geographic locations of use, amounts of transaction, and frequency of transactions, all of which may be tracked and evaluated by the Account Authority in monitoring for possible fraud. Information such as the number of incorrect entries of data representing a Secret or biometric characteristic used to authenticate a user of the device also may be monitored by the Account Authority, which also may serve to indicate possible fraud.

The PuK-to-Account Authentication is the authentication technique employed when the public key and PuK-linked information were associated with the account maintained by the Account Authority. This information is important in evaluating the risk to be accorded the initial association of the public key and PuK-linked information with the account.

Also in accordance with the fifth aspect of the present invention, the Account Authority notes any factors known about the environment in which the digital signature for the message was originated. Indeed, the environment in which the device is used often is communicated within the EC itself. For example, in financial transactions involving credit charges, an Account Authority—such as an issuing bank—is able to determine whether a card was present at a point of sale for a transaction, or whether the charge occurred otherwise, such as over the Internet. The former scenario is believed to involve a risk of fraud that is substantially less than that of the later scenario. In another example, when an external apparatus such as an I/O support element is used in conjunction with a device to compose a message and originate a digital signature, information regarding the I/O support element is preferably included in the environmental information communicated in the EC. For instance, an I/O support element also may digitally sign an EC, and information regarding the I/O support element linked to the public key of the I/O support element preferably is identified in accordance with the first aspect of the present invention. Indeed, the device may include a card reader comprising hardware and software components designed in accordance with the technical specifications published by CEN/ISSS as a result of the well-known Financial Transactional IC Card Reader Project (known commonly as "FINREAD").

A preferred embodiment in accordance with this aspect of the present invention is illustrated in FIG. 45, wherein an Account Authority receives (Step 4502) an EC including a message and a digital signature therefor. The digitally signed message includes an instruction therein representing a transaction on a particular account as identified in the EC by a unique account number. Upon receipt, the Account Authority retrieves (Step 4504) a public key associated with the particular account and then attempts to authenticate (Step 4506) the message of the EC using the public key. If the message does not authenticate in Step 4508, then the Account Authority rejects (Step 4510) the message. If the message authenticates in Step 4508, then the Account Authority further processes (Step 4512) the message.

Further processing (Step 4512) of the message includes consideration (Step 4514) of numerous factors that are used by the Account Authority to gauge the risk that the digital signature was fraudulently generated and, ultimately, to determine whether to perform the transaction on the account. The consideration (Step 4514) includes an evaluation (Step 4516) of the security features and manufacturing history of the device linked with the public key of the device within the environment of the manufacturing of the device and, as applicable: an evaluation (Step 4518) of entity authentication provided by the sender of the EC or user of the device; an evaluation (Step 4520) of environmental factors surrounding the origination of the EC; an evaluation (Step 4522) of the transactional history of the device on the account; and an evaluation (Step 4524) of other account or business-specific factors. At a more fundamental level, the PuK-to-Account Authentication also may be considered in gauging the risk of fraud.

Whether the Account Authority considers some or all of the above factors, how much weight the Account Authority applies to any particular factor, and what order the Account Authority makes these evaluations may vary, and the Account Authority uses its own business rules and judgment to determine (Step 4526), based on its own considerations in Step 4514, whether to perform the transaction on the account. If the determination in Step 4526 is negative, then the Account Authority rejects (Step 4510) the message. If the determination in Step 4526 is positive, then the Account Authority performs (Step 4528) the transaction on the account and updates (Step 4530) the account record accordingly. Alternatively, the Account Authority may choose to execute only a limited portion of the instruction (not shown) based on its considerations (Step 4514), or the Account Authority may require additional information from the sender of the EC prior to performing the transaction (not shown).

In a feature of the present invention, a plurality of different devices are associated with the same user account maintained with the Account Authority. In this situation, the risk of a fraudulent transaction preferably is gauged not on an overall account basis, but rather, on a device-by-device basis for each account. Specifically, the transactional history of digital signatures on the account preferably is recorded and later considered on a device-by-device basis.

Of course, the actual rule base or business logic used by each Account Authority is subjective and necessarily will vary as between Account Authorities. Nevertheless, the reliable identification of the security features and manufacturing history of a device—when combined with evaluations of the transactional account history of digital signatures generated by the device, environmental factors in which the digital signature is originated, and other account or business-specific factors—provides added security against fraudulent transactions not otherwise realized.

G. Disseminating PuK-Linked Information of Device Generating Digital Signatures

In accordance with a sixth aspect of the present invention, an entity (herein "Central Key Authority") maintains certain PuK-linked account information of a user (herein "Registration Information") for disseminating to one or more Account Authorities. The Registration Information includes the public key (PuK) of a device of the user that generates digital signatures and one or more of the following types of information: the identity of Account Authorities with which the user has PuK-linked accounts for the device and respective account identifiers that identify each PuK-linked account of the user to the respective Account Authority; information linked with the public key of the device in accordance with the first aspect of the present invention; user-specific information, such as the user's mailing address, credit card information, age, etc.; and, as desired, the authentication techniques that were employed in verifying the user-specific information maintained by the Central Key Authority. Furthermore, the Central Key Authority preferably indexes the Registration Information of the user to a unique account identifier such that the Registration Information may be retrieved based on the account identifier. In this regard, but not shown, the public key may serve as the unique account identifier. An example of a PuK-linked account database 4640 of a Central Key Authority is illustrated in FIG. 46.

In accordance with this aspect of the present invention, the Central Key Authority disseminates some or all of the Registration Information, as appropriate, to Account Authorities. Registration Information is disseminated when the user has an account with an Account Authority—or desires to establish an account with an Account Authority—and desires to send ECs with messages each containing an instruction that represents a transaction on the account, each such message being digitally signed using the device. The dissemination of the Registration Information occurs, for example, when Registration Information maintained by an Account Authority has become outdated for a particular account. Furthermore, the dissemination of the Registration Information may be in accordance with the third aspect of the present invention wherein the PuK-linked account database record is obtained from the Central Key Authority if the Central Key Authority is considered to have sufficient security measures and protocols so as to qualify to be a Secure Entity.

The Registration Information maintained by the Central Key Authority is obtained in various ways. For example, the public key and information linked therewith preferably is obtained from a Secure Entity in accordance with the first, second, or third aspects of the present invention. The identity of the Account Authorities with which the user has PuK-linked accounts for the device, and the account identifier that identifies the PuK-linked account of the user to each such Account Authority, preferably is obtained from the user, and is obtained when the user registers with the Central Key Authority; when, at the instruction of the user, the Central Key Authority establishes an account on behalf of the user with an Account Authority; or when the third-party, at the instruction of the user, acquires Registration Information from the Central Key Authority.

An example of efficiency and convenience that may be provided by the Central Key Authority in accordance with this sixth aspect of the present invention comprises the updating of PuK-linked accounts of a user with a new device of the user in place of the user's old (and possibly outdated) device as represented by the respective public keys of the devices. With reference to FIGS. 47-51, such an update preferably is accomplished by a user 4758 by the mere sending (Step 4806) of an EC 4722 to a Central Key Authority 4760 with which the user 4758 has previously registered with an old device as represented by the old public key (PuK1).

The EC 4722 includes a message (M) having an instruction to associate a new public key (PuK2) included in the message with accounts of the user 4758 maintained by certain Account Authorities 4762,4764, which preferably are on register with the Central Key Authority 4760. The message is digitally signed (Step 4802) using the private key (PrK1), and the digital signature (DS) therefor is included (Step 4804) with the message in the EC 4722. The EC 4722 also includes the account identifier (CKA#) for the account maintained by the Central Key Authority 4760.

Upon receipt (Step 4902) of the EC 4722, the Central Key Authority 4760 authenticates (Step 4904) the message (M) of the EC 4722 using the public key (PuK1) associated with the account of the user 4758 maintained by the Central Key Authority 4760 as identified by the unique account identifier (CKA#).

Upon successful authentication, the Central Key Authority 4760 updates (Step 4906) the Registration Information with the new public key (PuK2) and sends (Step 4908) a respective EC 4766,4768 to each of the Account Authorities 4762,4764 identified by the user 4758. Each EC 4762,4764 includes a respective request of the Account Authorities 4762,4764 to associate the new public key (PuK2) with the accounts of the user 4758. The Central Key Authority 4760 also preferably obtains the Security Profile linked with the new public key (PuK2) in accordance with the first aspect of the present invention, and includes the Security Profile with the new public key (PuK2) in the respective request sent to the Account Authorities 4762,4764.

The request preferably is digitally signed (Step 4908) using a private key of the Central Key Authority 4760 for authentication of the request and information therein by each Account Authority 4762,4764, and may include the original EC 4722 received by the Central Key Authority 4760 from the user 4758. Each respective request also preferably includes the appropriate account identifier for the account that is to be updated by each Account Authority 4762,4764, which information is part of the Registration Information maintained by the Central Key Authority 4760.

Upon receipt (Step 5002) of the EC 4766 by Account Authority 4762, the request (R1) is authenticated (Step 5004) using a public key of the Central Key Authority 4760, which preferably is obtained by the Account Authority 4762 beforehand. The Account Authority 4762 also may authenticate the original message (M) in EC 4722, as desired. Upon successful authentication, the Account Authority 4762 updates (Step 5006) the account identified by the account identifier (Acc#) in the EC 4766 by associating the new public key (PuK2) with the account.

Similarly, upon receipt (Step 5102) of the EC 4768 by Account Authority 4764, the request (R2) is authenticated (Step 5104) using the public key of the Central Key Authority 4760, which preferably is obtained by the Account Authority 4764 beforehand. The Account Authority 4764 also may authenticate the original message (M) in EC 4722, as desired. Upon successful authentication, the Account Authority 4764 updates (Step 5106) the account identified by the account identifier (Acc#) in the EC 4768 by associating the new public key (PuK2) with the account.

As will be appreciated by those having ordinary skill in the art, while two Account Authorities have been illustrated in the preferred method of FIGS. 47-51, any number of Account Authorities may be sent a respective EC by the Central Key Authority as appropriate and desired. Indeed, the more Account Authorities that are contacted, the more efficient and convenient the preferred method in accordance with the sixth aspect of the present invention.

Accordingly, it readily will be understood by those persons skilled in the art that, in view of the above detailed description of preferred embodiments, devices, and methods of the present invention, the present invention is susceptible of broad utility and application. Many methods, embodiments, and adaptations of the present invention other than those herein described, as well as many variations, modifications, and equivalent arrangements, will be apparent from or reasonably suggested by the present invention and the following detailed description thereof, without departing from the substance or scope of the present invention. Furthermore, those of ordinary skill in the art will understand and appreciate that although steps of various processes may be shown and described in some instances as being carried out in a preferred sequence or temporal order, the steps of such processes are not necessarily to be limited to being carried out in such particular sequence or order. Rather, in many instances the steps of processes described herein may be carried out in various different sequences and orders, while still falling within the scope of the present invention. Accordingly, while the present invention is described herein in detail in relation to preferred methods and devices, it is to be understood that this detailed description only is illustrative and exemplary of the present invention and is made merely for purposes of providing a full and enabling disclosure of the invention. The detailed description set forth herein is not intended nor is to be construed to limit the present invention or otherwise to exclude any such other embodiments, adaptations, variations, modifications and equivalent arrangements of the present invention, the present invention being limited solely by the claims appended hereto and the equivalents thereof.

For instance, the roles set forth above with respect to the Secure Manufacturing Facility, the Secure Entity, the Account Authority, the Financial Institution, the Insuring Entity, and the Central Key Authority, may all be performed by a single entity or affiliated entities, or any combination thereof in accordance with the present invention. Moreover, any of the aforementioned entities also may be a recipient of an EC.

Additionally, it should be apparent that the devices described above with regard to the present invention encompass, for example, devices of merchants and other commercial entities that generate digital signatures, and are not limited to devices of individual consumers that generate digital signatures. For instance, a device in accordance with the present invention includes an I/O support element comprising, for example, an IC card reader used to read IC cards of individual consumers in establishing secure financial transactions if such IC card reader itself generates digital signatures. In this regard, such device may include a trusted platform module. From the foregoing, it also will be appreciated that the present invention allows superior risk management in an authentication infrastructure. Part of this risk management, of course, arises from the use of secure chip technology for manufacturing digital signature devices, which represents a significant improvement in the determination of assurance levels of card-based authentication mechanisms, especially compared to existing magnetic stripe card infrastructures. This emerging secure chip technology assurance level is so high that issues of counterfeit chips start to become an important factor. One of the issues that the disclosed secure database will address is the issue of counterfeit devices, especially counterfeits that have backdoors introduced.

The disclosed secure database system and methods may be viewed as a layered set of features that meet a range of business requirements. The business operations include: 1) trusted anonymous devices, e.g. chip-cards; 2) trusted personalized devices; and 3) trusted personalized devices with activation. These devices preferably include the common characteristics of being: a) tempested; b) immune to all known smartcard attacks; PIN-activated (migrating to on-card biometrics); tamper-evident with zeroization; public/private key generated on the card; private key is never divulged; public key can be exported; and only function supported is EC/DSS (elliptical curve version of FIPS PUB 186).

It is believed that a chip-level device constructed in accordance with the present invention can be fabricated with as few as 20,000 circuits. By comparison, the Intel 486 microprocessor possessed over four million circuits; more recent chips are significantly larger. Furthermore, with present chip technology both ECC public/private key generation and EC/DSS signature signing can be effected on the order of 10 milliseconds or less.

A basic function of the disclosed secure database is establishing the binding between a public key and one or more characteristics. As has been discussed above, this requires a secure audit trail of a device and the associated assurance characteristics of that device. A public/private key-pair are generated in a controlled, preferably secure environment and the public key is registered with the secure audit trail of the device and the associated device assurance characteristics. In effect this basic function can be viewed as establishing the initial device public key as the device's serial number. In other words, in addition to various cryptographic operations using the public key in the known manner, the public key can be used as if it were the device's serial number. Operations that might be associated with correlating a device serial number with a device manufacturing history or the chip's assurance level are driven using the device's public key (and/or cryptographic operations involving the device's private and/or public key). Moreover, the mapping of public key and serial numbers allows the implementation of invention embodiments such as:

Chip Card Mailers, for example, CD-ROM inserts that allow consumers to establish accounts with an Internet service provider (ISP). The card can be used for establishing an ISP account and then used for subsequent authentication for use of that same account, by merely using the card that was used to setup the account.

Anti-counterfeit Conventional Semiconductor Products, wherein chip manufacturers desire an inexpensive method to address the copied chip and chip gray market problem. In accordance with this aspect, the digital signature circuit components as described herein may be included in a secure portion of a standard chip product and operate in the manner as described herein to generate a public key/private key pair. The public key is exported as a serial number. In effect, the public key becomes the serial number of the chip and the manufacturer accesses the secure database to validate a chip.

Anonymous Payment Devices, for example, an "anonymous" card for mail inserts for which the assurance level of the authentication mechanism can be validated without having to validate the identity of the person holding the device.

Preferably, a secure database constructed in accordance with the invention includes pointers to device (or chip) part number, device (or chip) lot/batch number, device (or chip) lot/batch processing audit trail, and ECC algorithm. The device (or chip) part number, device (or chip) lot/batch information, and ECC algorithm information is used in establishing the device (or chip) assurance level characteristics. This is also part of the support for parameterized risk management since as various new exploits or attacks appear, they can be evaluated against specific chips and/or algorithms and the associated assurance level can be adjusted as needed.

Preferably, an "anonymous" device or chip card has an uninitialized PIN capability. The person receiving the card will first initialize the PIN and then use the card in an online registration process (for instance establishing an account with an ISP and registering the card's public key as the authentication mechanism for the account).

From the foregoing description of the secure database, the significance of the personalization functions of a device and their relationship to the secure database will now be more greatly appreciated. This is particularly applicable for device applications wherein an entity such as a bank obtains a batch of devices, personalizes them with a PIN, and distributes them to consumers. The personalization functions, as described in greater detail elsewhere, and requirements build on the basic functions of a device. For example, a) basic and personalization functions are preferably combined in a single operation, and b) a personalization function receives a batch of devices (e.g. chips) from a foundry along with information from the foundry secure database (e.g., the device's public key and security characteristics), and enters the information into its database.

In the case of a), the basic function still needs to be executable independently without requiring the personalization function (e.g., for support of "anonymous" devices as part of mailers and inserts). Preferred personalization operations include: correlating the personalization process with the device's "serial number" (e.g., a regular serial number, or alternatively the device's public key); potentially embossing in a combination device/magnetic stripe card; establishing the device's PIN activation number; mailing/delivering the device to a consumer; under separate cover, mailing/delivering the device's PIN; delivering the device's public key and personalization information to the entity initiating the personalization request.

The party receiving the device may use an online "card" or device activation process in a manner similar to the known ISP registration technique to indicate that they have received the card and can activate it. The online card or device activation process can be as simple as digitally signing a dummy message containing the device's public key. The activation process might also contain the transmittal of additional authentication information via an encrypted channel, e.g., web browser SSL or IPSEC. The device activation event also is preferably transmitted to the entity initiating the personalization request.

Some additional optional device operational characteristics include the following. For non-anonymous PIN activated devices, there may be a function to change the device's PIN activation code under controlled circumstances, for example, using the existing PIN code to enable the function to change the PIN. For the anonymous PIN device, a one-time PIN definition process preferably is executed before the digital signature function is rendered active.

For devices that have been built with biometric activation, an initial PIN code might used to activate the biometric initialization function. Once the biometric initialization function is performed, the initial PIN code may be rendered unusable and biometric card activation required for subsequent operations. This is analogous to a process where a card owner can change the PIN-activation code, making the previous PIN-code invalid.

Those skilled in the art will further appreciate that, at a very high level, the secure database combines some of the characteristics of magnetic stripe card PIN processing with some of the characteristics of online ISP account registration, with additional features to track and record the assurance level of the device and create associated audit trails. Given that one of the objectives of the present invention is to be able to provide an auditable trail as to the assurance level of a device (and that in fact it is not a copied chip with built in back doors), the integrity and auditability of the design, development, and implementation of all the processes and components preferably are at the highest assurance level practical.

Important exemplary components of the secure database include recording information corresponding to: the assurance level of the design and manufacturing of the device; the handling of the device between the time the device is manufactured and the time its public key is established (as the device serial number) and recorded; an audit trail tying device batch/lot number, device design, manufacturing information until the time the device has its public/private key generated and the public key registered in the database (along with pointers to the audit trail); the device public key (and/or other device serial number, if provided) and mapping the public key to the characteristics of the device; any associated information that is added to the record (for instance identity information that may occur as part of the personalization process); the security and integrity of the secure database(s); the security and integrity of the operations updating the secure database(s); and the availability of the secure database(s).

Those skilled in the art will appreciate that, for the secure database, there are a number of database sizing and performance considerations that should be taken into account, one with the initial public key registration as a separate function from the personalization information, and one where the functions are combined. In the first case, the separate public key registration handles high burst transactions from test & burn-in assemblies that are also activating the key generation function. The key generation time is preferably approximately 10 milliseconds or less. The transaction insert rate is proportional to the test, burn-in and key generation elapsed time per chip, times the number of chips that are processed simultaneously. As is known, devices in the form of semiconductor chips are typically manufactured in wafers. There is a possibility of manufacturing between 300 and 3000 chips per wafer with known lithography and wafer densities. The test, burn-in and key generation is likely to be in the multiple minute range, so bursty transactions could be in tens per minute or in the single digits per second.

It is initially believed that combined personalization processes (with embossing and other characteristics) may have bursty transaction rates that are lower than the separate manufacturing process.

For personalization, any personalization database is preferably configured to accept a batch load of all keys that come in with a device (or chip-card) shipment, along with the batch/lot numbers in the shipment and the associated assurance characteristics and handling audit trail. For an actual personalization phase, the personalization database might expect a batch load of all the requested personalization information. As individual devices are personalized, the public key and assurance information is preferably tied to the personalization information.

For an online device activation phase, it is desirable to provide an online web server that can interact with a customer browser applet that verifies the device information and appropriately executes the device activation validation and processing function.

It is believed that there are three possible design points for the secure database: 10 million chips, 100 million chips, and a billion chips. Given these design points, and that the expected peak card activation load on the web server has yet to be estimated, it is believed that the transaction load on the secure database will only be on the order of a few transactions per second.

Based on the foregoing, it will be appreciated that the transaction functions supported by the secure database preferably include the following: key, assurance, and audit trail input transaction (both batch and "interactive"); personalization information input transaction (both batch and "interactive"); possible cross-connecting the key and personalization transaction (primarily "interactive"); web server device activation transactions (primarily "interactive"); personalization, key, assurance and card status export (both batch and "interactive"); and individual personalization, key, assurance, and device status query transactions.

The invention claimed is:

1. A method of maintaining a Central Key Authority (CKA) database in a secure environment, comprising:

storing, in the CKA database, a public key of a public key-private key pair, wherein the public key is associated with a user device of a user, wherein the user device is configured to generate digital signatures using a private key of the public-private key pair, wherein the private key is maintained securely within the user device;

securely linking, in the CKA database, the public key associated with the user device with other information during manufacturing of the user device in the secure environment; and associating, in the CKA database, one or more third-party account identifiers with the public key, wherein each third-party account identifier identifies to a third-party an account of a respective user that is maintained with the third-party, wherein the third-party uses the public key and other information to authenticate a message.

2. The method of claim 1, wherein the other information linked with the public key comprises security features and a manufacturing history of the device.

3. The method of claim 1, wherein the public key and the other information linked therewith is obtained from a Secure Entity.

4. The method of claim 1, wherein the public key, other information, and third party account identifier are stored in the CKA database as PuK linked account information of a user.

5. The method of claim 4, wherein the PuK-linked account information maintained in the CKA database of the user further includes the identity of each third-party with which a third-party account is maintained that is identified by one of the third-party account identifiers.

6. The method of claim 4, wherein the PuK-linked account information of the user is indexed in the CKA database by a unique CKA account identifier such that the PuK-linked account information for the user is retrievable from the CKA database based on the unique CKA account identifier.

7. The method of claim 6, wherein the public key is the unique account identifier.

8. The method of claim 4, wherein the PuK-linked account information maintained in the CKA database of the user further includes user-specific information, and further comprising the step of verifying the user-specific information.

9. The method of claim 8, wherein the PuK-linked account information maintained in the CKA database of the user further includes a record of the techniques that were employed in verifying the user-specific information.

10. The method of claim 8, wherein the user-specific information includes the name and address of the user.

11. The method of claim 8, wherein the user-specific information includes the age and gender of the user.

12. The method of claim 4, further comprising updating the PuK-linked account of a user with a new public key of the user, comprising the steps of:

receiving an EC, the EC including a message including the new public key and a digital signature therefor, authenticating the message of the EC using the public key associated with the PuK-linked account in the CKA database, and upon successful authentication thereof, sending an EC to the third-party, the EC including the new public key and the third-party account identifier for the respective third-party maintained in the CKA database and associated with the PuK-linked account.

13. The method of claim 12, further comprising digitally signing the new public key of the user and third-party account identifier.

14. The method of claim 12, further comprising sending the EC received from the user to each of the third-parties.

15. The method of claim 1, further comprising establishing an account on behalf of a user with a third-party by communicating the public key of the user and information linked with the public key from the CKA database to the third-party.

16. The method of claim 15, wherein the public key of the user and information linked with the public key is communicated upon the request of the third-party to which it is communicated.

* * * * *